(12) United States Patent
Callaghan et al.

(10) Patent No.: US 7,139,591 B2
(45) Date of Patent: **\*Nov. 21, 2006**

(54) HAND HELD TELECOMMUNICATIONS AND DATA ENTRY DEVICE

(75) Inventors: Francis John Callaghan, St. Helier (GB); Paul Marshall Doran, St Helier (GB); Gary Douglas Robb, St Brelades (GB)

(73) Assignee: Dataquill Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 10/869,215

(22) Filed: Jun. 15, 2004

(65) Prior Publication Data

US 2005/0020305 A1 Jan. 27, 2005

Related U.S. Application Data

(63) Continuation of application No. 09/548,565, filed on Apr. 13, 2000, now abandoned, which is a continuation of application No. 08/619,682, filed as application No. PCT/GB94/02101 on Sep. 27, 1994, now Pat. No. 6,058,304.

(30) Foreign Application Priority Data

Oct. 13, 1993 (GB) ................................ 9321133.2

(51) Int. Cl.
*H04B 1/38* (2006.01)
(52) U.S. Cl. ................ 455/557; 455/556.1; 455/422.1; 235/462.46; 235/472.02
(58) Field of Classification Search ............ 455/422.1, 455/556, 403, 406, 408; 235/462.46, 472.02, 235/375, 480; 379/93.12, 93.25, 100.02, 379/100.12
See application file for complete search history.

(56) References Cited

U.S. PATENT DOCUMENTS

| | | | |
|---|---|---|---|
| 3,906,166 A | 9/1975 | Cooper | |
| 3,956,740 A | 5/1976 | Jones et al. | |
| 4,004,133 A | 1/1977 | Hannan et al. | |
| 4,071,697 A | 1/1978 | Bushnell et al. | |
| 4,153,937 A | 5/1979 | Poland | |

(Continued)

FOREIGN PATENT DOCUMENTS

DE 2739157 A1 3/1979

(Continued)

OTHER PUBLICATIONS

"Always in Touch: The EO Personal Computer 440", undated, Bates Stamped p. HSD0004018.

(Continued)

*Primary Examiner*—Jean Gelin
(74) *Attorney, Agent, or Firm*—Mintz Levin Cohn Ferris Glovsky and Popeo PC

(57) ABSTRACT

A data entry system includes a hand held data entry unit having a reading sensor for sensing commands and/or data, rewritable storage for storing information relating to selectable items, a controller (a microprocessor or other processing circuitry) and a display screen for displaying a user readable representation of the commands and/or stored information for a selected item, and a telecommunication interface for the telephonic transmission of information relating to a selected item or items from the storage to a remote processing center and for the telephonic information relating to selectable items from the remote processing center to the storage. Preferably a telecommunications interface is provided in the hand held unit for cellular or other wireless telephony systems. The hand held unit can be configured to combine the data entry functions with those of audio telephony.

62 Claims, 11 Drawing Sheets

U.S. PATENT DOCUMENTS

| | | |
|---|---|---|
| 4,241,409 A | 12/1980 | Nolf |
| RE30,671 E | 7/1981 | Poland |
| 4,279,021 A | 7/1981 | See et al. |
| 4,295,181 A | 10/1981 | Chang et al. |
| RE31,141 E | 2/1983 | Bartels |
| 4,399,331 A | 8/1983 | Brown et al. |
| 4,415,065 A | 11/1983 | Sandstedt |
| 4,482,802 A | 11/1984 | Aizawa et al. |
| 4,490,853 A | 12/1984 | Nally et al. |
| 4,503,288 A | 3/1985 | Kessler |
| 4,545,023 A | 10/1985 | Mizzi et al. |
| 4,569,421 A | 2/1986 | Sandstedt |
| 4,575,621 A | 3/1986 | Dreifus et al. |
| 4,587,630 A | 5/1986 | Straton et al. |
| 4,591,974 A | 5/1986 | Dornbush et al. |
| 4,622,437 A | 11/1986 | Bloom et al. |
| 4,653,086 A | 3/1987 | Keltern et al. |
| 4,654,482 A | 3/1987 | DeAngelis |
| 4,654,514 A | 3/1987 | Watson et al. |
| 4,654,867 A | 3/1987 | Labedz et al. |
| 4,697,281 A | 9/1987 | O'Sullivan |
| 4,706,090 A | 11/1987 | Hasiguchi et al. |
| 4,712,242 A | 12/1987 | Rajasekaran et al. |
| 4,724,521 A | 2/1988 | Carron et al. |
| 4,725,694 A | 2/1988 | Auer et al. |
| 4,725,977 A | 2/1988 | Izumi et al. |
| 4,760,387 A | 7/1988 | Ishii |
| 4,775,928 A | 10/1988 | Kendall et al. |
| 4,776,003 A | 10/1988 | Harris |
| 4,777,646 A | 10/1988 | Harris |
| 4,785,420 A | 11/1988 | Little |
| 4,800,255 A | 1/1989 | Imran |
| 4,800,505 A | 1/1989 | Axelrod et al. |
| 4,803,652 A | 2/1989 | Maeser et al. |
| 4,805,134 A | 2/1989 | Calo et al. |
| 4,812,843 A | 3/1989 | Champion et al. |
| 4,823,311 A | 4/1989 | Hunter et al. |
| 4,831,647 A | 5/1989 | D'Avello et al. |
| 4,837,800 A | 6/1989 | Freeburg et al. |
| 4,845,658 A | 7/1989 | Gifford |
| 4,845,740 A | 7/1989 | Tokuyama et al. |
| 4,850,003 A | 7/1989 | Huebeck et al. |
| 4,850,009 A | 7/1989 | Zook et al. |
| 4,857,713 A | 8/1989 | Brown |
| 4,882,757 A | 11/1989 | Fisher et al. |
| 4,885,574 A | 12/1989 | Negishi et al. |
| 4,885,580 A | 12/1989 | Noto et al. |
| 4,887,265 A | 12/1989 | Felix |
| 4,907,264 A | 3/1990 | Seiler et al. |
| 4,916,411 A | 4/1990 | Lymer |
| 4,916,441 A | 4/1990 | Gombrich |
| 4,927,986 A | 5/1990 | Daly |
| 4,947,028 A | 8/1990 | Gorog |
| 4,969,830 A | 11/1990 | Daly et al. |
| 4,972,457 A | 11/1990 | O'Sullivan |
| 4,983,318 A | 1/1991 | Matsumoto et al. |
| 4,991,197 A | 2/1991 | Morris |
| 4,991,199 A | 2/1991 | Parekh et al. |
| 5,008,927 A | 4/1991 | Weiss et al. |
| 5,008,952 A | 4/1991 | Davis et al. |
| 5,020,090 A | 5/1991 | Morris |
| 5,021,640 A | 6/1991 | Muroi |
| 5,023,438 A | 6/1991 | Wakatsuki et al. |
| D317,910 S | 7/1991 | Hawkins et al. |
| 5,029,183 A | 7/1991 | Tymes |
| 5,031,119 A | 7/1991 | Dulaney et al. |
| 5,046,082 A | 9/1991 | Zicker et al. |
| 5,046,084 A | 9/1991 | Barrett et al. |
| 5,067,164 A | 11/1991 | Denker et al. |
| 5,095,503 A | 3/1992 | Kowalski |
| 5,095,538 A | 3/1992 | Durboraw |
| 5,100,098 A | 3/1992 | Hawkins |
| 5,101,439 A | 3/1992 | Kiang |
| 5,107,100 A | 4/1992 | Shepard et al. |
| 5,125,039 A | 6/1992 | Hawkins |
| 5,127,041 A | 6/1992 | O'Sullivan |
| 5,128,776 A | 7/1992 | Scorse et al. |
| 5,133,076 A | 7/1992 | Hawkins et al. |
| RE34,034 E | 8/1992 | O'Sullivan |
| 5,142,550 A | 8/1992 | Tymes |
| 5,157,687 A | 10/1992 | Tymes |
| 5,161,248 A | 11/1992 | Bertiger et al. |
| 5,171,977 A | 12/1992 | Morrison |
| 5,184,314 A | 2/1993 | Kelly et al. |
| 5,187,805 A | 2/1993 | Bertiger et al. |
| 5,189,287 A | 2/1993 | Parienti |
| 5,189,632 A | 2/1993 | Paajanen et al. |
| 5,195,130 A | 3/1993 | Weiss et al. |
| 5,200,913 A | 4/1993 | Hawkins et al. |
| 5,201,067 A | 4/1993 | Grube et al. |
| 5,208,446 A | 5/1993 | Martinez |
| 5,212,628 A | 5/1993 | Bradbury |
| 5,218,187 A | 6/1993 | Koenck et al. |
| 5,218,188 A | 6/1993 | Harrison |
| 5,221,838 A | 6/1993 | Gutman et al. |
| 5,222,138 A | 6/1993 | Balabon et al. |
| 5,225,822 A | 7/1993 | Shiraishi |
| 5,227,614 A | 7/1993 | Danielson et al. |
| 5,227,802 A | 7/1993 | Pullman et al. |
| 5,227,863 A | 7/1993 | Bilbrey |
| 5,233,502 A | 8/1993 | Beatty et al. |
| 5,243,452 A | 9/1993 | Baur |
| 5,248,929 A | 9/1993 | Burke |
| 5,249,218 A | 9/1993 | Sainton |
| 5,260,697 A | 11/1993 | Barrett et al. |
| 5,280,498 A | 1/1994 | Tymes et al. |
| 5,297,216 A | 3/1994 | Sklarew |
| 5,303,288 A | 4/1994 | Duffy et al. |
| 5,309,500 A | 5/1994 | Koma et al. |
| 5,313,051 A | 5/1994 | Brigida et al. |
| 5,319,548 A | 6/1994 | Germain |
| 5,322,991 A | 6/1994 | Harrison |
| 5,324,922 A | 6/1994 | Roberts |
| 5,324,925 A | 6/1994 | Koenck et al. |
| 5,331,136 A | 7/1994 | Koenck et al. |
| 5,333,116 A | 7/1994 | Hawkins et al. |
| 5,333,176 A | 7/1994 | Burke et al. |
| 5,334,824 A | 8/1994 | Martinez |
| 5,335,170 A | 8/1994 | Petteruti et al. |
| 5,335,276 A | 8/1994 | Thompson et al. |
| 5,337,346 A | 8/1994 | Uchikura |
| 5,337,358 A | 8/1994 | Axelrod et al. |
| 5,339,239 A | 8/1994 | Manabe et al. |
| 5,345,071 A | 9/1994 | Dumont |
| 5,347,632 A | 9/1994 | Filepp et al. |
| 5,353,331 A | 10/1994 | Emery et al. |
| 5,353,334 A | 10/1994 | O'Sullivan |
| 5,359,182 A | 10/1994 | Schilling |
| 5,367,563 A | 11/1994 | Sainton |
| 5,368,562 A | 11/1994 | Blomquist et al. |
| 5,371,348 A | 12/1994 | Kumar et al. |
| 5,379,057 A | 1/1995 | Clough et al. |
| 5,392,447 A | 2/1995 | Schlack et al. |
| 5,408,250 A | 4/1995 | Bier |
| 5,410,141 A | 4/1995 | Koenck et al. |
| 5,424,524 A | 6/1995 | Ruppert et al. |
| 5,425,077 A | 6/1995 | Tsoi |
| 5,426,594 A | 6/1995 | Wright et al. |
| 5,436,954 A | 7/1995 | Nishiyama et al. |
| 5,442,541 A | 8/1995 | Hube et al. |
| 5,442,783 A | 8/1995 | Oswald et al. |
| 5,465,401 A | 11/1995 | Thompson |
| 5,468,947 A | 11/1995 | Danielson et al. |
| 5,475,375 A | 12/1995 | Barrett et al. |

| | | |
|---|---|---|
| 5,479,441 A | 12/1995 | Tymes |
| 5,485,370 A | 1/1996 | Moss et al. |
| 5,491,507 A | 2/1996 | Umezawa et al. |
| 5,522,089 A | 5/1996 | Kikinis et al. |
| 5,528,266 A | 6/1996 | Arbeitman et al. |
| 5,528,621 A | 6/1996 | Heiman et al. |
| 5,537,608 A | 7/1996 | Beatty et al. |
| 5,541,398 A | 7/1996 | Hanson |
| 5,543,588 A | 8/1996 | Bisset et al. |
| 5,550,646 A | 8/1996 | Hassan et al. |
| 5,550,715 A | 8/1996 | Hawkins |
| 5,568,536 A | 10/1996 | Tiller et al. |
| 5,579,489 A | 11/1996 | Dornier et al. |
| 5,584,054 A | 12/1996 | Tyneski et al. |
| 5,585,789 A | 12/1996 | Haneda |
| 5,602,963 A | 2/1997 | Bissonnette et al. |
| 5,640,444 A | 6/1997 | O'Sullivan |
| 5,666,530 A | 9/1997 | Clark et al. |
| 5,680,633 A | 10/1997 | Koenck et al. |
| 5,729,591 A | 3/1998 | Bailey |
| 5,745,559 A | 4/1998 | Weir |
| 5,754,655 A | 5/1998 | Hughes et al. |
| 5,761,621 A | 6/1998 | Sainton et al. |
| 5,793,957 A | 8/1998 | Kikinis et al. |
| D397,679 S | 9/1998 | Hawkins et al. |
| 5,850,358 A | 12/1998 | Danielson et al. |
| 5,854,985 A | 12/1998 | Sainton et al. |
| 5,870,561 A | 2/1999 | Jarvis et al. |
| 5,884,323 A | 3/1999 | Hawkins et al. |
| 5,900,875 A | 5/1999 | Haitani et al. |
| 5,952,998 A | 9/1999 | Clancy et al. |
| 6,000,000 A | 12/1999 | Hawkins et al. |
| 6,006,274 A | 12/1999 | Hawkins et al. |
| 6,058,304 A | 5/2000 | Callaghan et al. |
| 6,118,939 A | 9/2000 | Nack et al. |
| 6,134,453 A | 10/2000 | Sainton et al. |
| 6,177,950 B1 | 1/2001 | Robb |
| D440,542 S | 4/2001 | Hawkins et al. |
| 6,219,681 B1 | 4/2001 | Hawkins et al. |
| 6,295,372 B1 | 9/2001 | Hawkins et al. |
| D449,283 S | 10/2001 | Sipher et al. |
| 6,300,946 B1 | 10/2001 | Lincke et al. |
| 6,317,797 B1 | 11/2001 | Clark et al. |
| 6,330,618 B1 | 12/2001 | Hawkins et al. |
| 6,343,318 B1 | 1/2002 | Hawkins et al. |
| 6,366,935 B1 | 4/2002 | Hawkins et al. |
| 6,371,081 B1 | 4/2002 | Hawkins et al. |
| D457,162 S | 5/2002 | Hawkins et al. |
| D457,526 S | 5/2002 | Hawkins et al. |
| 6,388,870 B1 | 5/2002 | Canova, Jr. et al. |
| 6,388,877 B1 | 5/2002 | Canova, Jr. et al. |
| 6,397,259 B1 | 5/2002 | Lincke et al. |
| 6,442,637 B1 | 8/2002 | Hawkins et al. |
| 6,448,988 B1 | 9/2002 | Haitani et al. |
| D466,115 S | 11/2002 | Hawkins et al. |
| D466,502 S | 12/2002 | Hawkins et al. |
| D466,877 S | 12/2002 | Hawkins et al. |
| D467,235 S | 12/2002 | Hawkins et al. |
| 6,493,464 B1 | 12/2002 | Hawkins et al. |
| 6,516,202 B1 | 2/2003 | Hawkins et al. |
| 6,539,476 B1 | 3/2003 | Marianetti et al. |
| 6,601,111 B1 | 7/2003 | Peacock et al. |
| 6,671,389 B1 | 12/2003 | Marzke et al. |
| 6,687,345 B1 | 2/2004 | Swartz et al. |
| 6,728,786 B1 | 4/2004 | Hawkins et al. |
| 6,755,946 B1 | 6/2004 | Patton et al. |

FOREIGN PATENT DOCUMENTS

| | | | |
|---|---|---|---|
| DE | A-3814728 A1 | 11/1989 | |
| DE | A-4109482 A1 | 9/1992 | |
| EP | 0094571 A3 | 11/1983 | |
| EP | 0149762 A2 | 7/1986 | |
| EP | 0536481 A2 | 4/1993 | |
| EP | 0 378 775 | 4/1995 | |
| EP | 0 531 645 | 3/1997 | |
| GB | 2183071 A | 5/1987 | |
| GB | 2202664 A | 9/1988 | |
| GB | 2229562 A | 9/1990 | |
| GB | 2 246 491 A | 9/1994 | |
| JP | 59 198034 | 11/1984 | |
| JP | 63311563 | 12/1988 | |
| JP | 1173262 | 7/1989 | |
| JP | 1 314462 | 12/1989 | |
| JP | 02144681 | 6/1990 | |
| JP | 3-109891 | 5/1991 | |
| JP | 04024149 | 2/1992 | |
| JP | 04348463 | 12/1992 | |
| JP | 05241994 | 9/1993 | |
| JP | 06 090309 | 3/1994 | |
| WO | WO 8707106 A1 | 11/1987 | |
| WO | WO 8904016 A1 | 5/1989 | |
| WO | WO 9100574 A1 | 1/1991 | |
| WO | WO 92/14329 A1 | 8/1992 | |
| WO | WO 93/16550 A1 | 8/1993 | |
| WO | WO 94/11967 A1 | 5/1994 | |

OTHER PUBLICATIONS

EO, Inc, Letter to D. Beaufait, California Wireless, Inc., Mar. 22, 1993, "Own Your Own Personal Communicator 440", Bates Stamped pp. HSD0004019-4020.

GO Corporation, "Penpoint Communications Technology Benefits Study", Draft Discussion Outline, Nov. 12, 1992, Bates Stamped pp. HSD0004021-4066.

EO, Inc., "Industry Briefing EO, AT&T, Matsushita and Marubeni" Oct. 1, 1992, Bates Stamped pp. HSD004067-4116.

EO, Inc., "Personal Communicators At-a-Glance", undated, Bates Stamped pp. HSD0004117-4119.

EO, Inc., "Software Vendors Rally Around EO Personal Communicators", Nov. 4, 1992, Bates Stamped pp. HSD0004120-4122.

"AT&T Easylink Services", undated, Bates Stamped pp. HSD0004123-4124.

GO Corporation, "GO Corp. Announces PenPoint for Hobbitt, GO Message Center, and GO Faz on will be available on EO Personal Communicator", Nov. 4, 1992, Bates Stamped pp. HSD0004125-4126.

Pensoft Corporation, "Pensoft Corporation Announces Personal Perspective built into every EO Personal Communicator", Nov. 4, 1992, Bates Stamped pp. HSD0004127-4128.

Notable Technologies, Inc., "Notable Technologies Announces Support for EO: will Produce Applications for Personal Communicators", Nov. 4, 1992, Bates Stamped pp. HSD0004129-4130.

Sitka Corporation, "EO Selects Sitka's Mobile Networking Solutions for New Line of Personal Communicators", Nov. 4, 1992, Bates Stamped pp. HSD0004131-4133.

Penmagic Software Inc., "PenMagic Announces Support for EO Personal Communicators and Hobbit Platform", Nov. 4, 1992, Bates Stamped pp. HSD0004134-4135.

Ink Development Corporation, "Ink Development Announces InkWare™ NoteTaker for EO Personal Communicators", Marked "For Release Nov. 4, 1992", Bates Stamped pp. HSD0004136-4137.

Slate Corporation, Slate Announces Port of PenApps™, Nov. 4, 1992, Bates Stamped pp. HSD0004138-4139.

EO, "Market Convergence", undated, Bates Stamped p. HSD0004140.

EO, "Market Evolution for Personal Communicators", undated, Bates Stamped p. HSD0004141.

EO, Inc., "EO Unveils World's First Personal Communicator's", Nov. 4, 1992, Bates Stamped pp. HSD0004142-4145.

"Introducing the EO Personal Communicator", undated, oversize page, Bates Stamped p. HSD0004146.

American Programmer, Inc., "American Programmer", Dec. 1991, Bates Stamped pp. HSD0004147-0004178.

EO Inc., "AT&T EO Personal Communicator", "Third Party Product and Services Catalog", Fall 1993, Bates Stamped pp. HSD0004179-0004204.
EO, Inc., "Exactly what is an EO", pamphlet, oversized pages, Bates Stamped pp. HSD0004205-4206.
"Communication-Anytime, Anywhere", undated, Bates Stamped p. HSD0004207.
EO, Inc., "Lookup Guide to the EO Personal Communicator", Copyright 1992, 1993, Bates Stamped pp. HSD0004208-4532.
EO, Inc., "Connecting With Your EO Cellular Module", Copyright 1992, 1993, Bates Stamped pp. HSD0004533-4574.
EO, Inc., "Getting Started With Your EO Personal Communicator", Copyright 1992, 1993, Bates Stamped pp. HSD0004575-4657.
EO, Inc., "The World of Messaging An Introduction to Personal Communicators", Copyright 1992, 1993, Bates Stamped pp. HSD0004658-4731.
EO, Inc., The AT&T EO Travel Guide, Ken Maki, Copyright 1993, Bates Stamped pp. HSD0004732-5290.
AT&T, "High-speed cellular modem for laptops from Paradyne and Nokia", "For Release" Feb. 23, 1993, Bates Stamped pp. HSD0009580-9581.
AT&T, "AT&T, Go, PenStuff, Trimble make 'personal navigators'", "For Release" Jun. 29, 1993, Bates Stamped pp. HSD0009582-9584.
AT&T, "AT&T and EO lower prices for personal communicators", "For Release" Sep. 16, 1993, Bates Stamped pp. HSD0009585-9586.
AT&T, "EO, Inc., will become AT&T's personal communicator company", "For Release" Jun. 1, 1993, Bates Stamped pp. HSD0009587-9589.
Internet: "Chronology of Handheld Computers", 1993-1996, Ken Polson, Copyright 2001-2002, Bates Stamped pp. HSD0012760-0012762.
Internet: "Chronology of Hand Held Computers Sources used for information", undated, Bates Stamped pp. HSD0012763-0012764.
Internet: "Chronology of Handheld Computers", 1972-1992, Ken Polson, Copyright 2001-2002, Bates Stamped pp. HSD0012765-0012768.
Internet: "Envolving PDAs", undated, no author, Bates Stamped p. HSD0012769.
Internet: From On the Go Magazine, Sep. 8, 1993: "Wireless Newton Technology Goes to Work", Copyright 1993, David McNeill, Bates Stamped pp. HSD0012770-0012771.
Internet: From On the Go Magazine, Oct. 13, 1993: "Newton Notes Messaging Card and Newton Mail: We Pick up and deliver", Copyright 1993, David McNeill, Bates Stamped pp. HSD0012772-012773.
Internet: "Concept development for LCD-Applied Products", notation "(Received Oct. 7, 1007)" on p. 7, Hideki Atarashi and Toshifumi Mizobata, Bates Stamped pp. HSD0012774-0012780.
Internet: "NCR cuts price of 3170 notebook computer 11-19 percent", AT&T News Release, "for release Monday Mar. 8, 1993", Bates Stamped pp. HSD0012781-0012782.
EO Incorporated, "EO Cellular Module Programming Instructions for Cellular Service Providers and Resellers", May 13, 1993, Bates Stamped pp. HSD0013223-0013233.
EO(?), page copies "Electronics Serial Number (ESN)", "EO Phone", "Authorized Dealer", "Wireline vs. non-Wireline Provider", all undated, Bates Stamped pp. HSD0013234-0013237.
Individual, Inc., "HeadsUp™ Just the News You Need, Delivered Every Morning to Your AT&T EO Personal Communicator™", undated, Bates Stamped pp. HSD0013238-0013246.
EO, Inc., "EO Personal Communicator 440/880 *Technical Note* Number 3011, Installing the EO Update 2B on your EO", "TN Date: Dec. 2, 1993", Bates Stamped pp. HSD0013247-0013254.
EO Customer Services, "Tips from our Users", date unclear, Bates Stamped p. HSD0013255.
EO Customer Services, "Tips from our Users", Jun. 9, 1993, Bates Stamped p. HSD0013256.
Symbol Technologies Incorporated, Operator's Guide LRT 3270, Apr. 1992, Bates Stamped pp. SYM00001-00002.
Symbol Technologies Incorporated, "Operator's Guide LRT 46-key 3270 Emulation", Sep. 1992, Bates Stamped pp. SYM00003-00004.

Symbol Technologies Incorporated, "Operator's Guide LRT 46-key 5250 Emulation", Copyright 1992, Bates Stamped pp. SYM00005-00006.
Symbol Technologies Incorporated, "Series 3800 Portable Terminal User's Guide", Oct. 1992, Bates Stamped pp. SYM00007-00008.
Internet: Symbol Technologies Incorporated, "PPT 4100 Series Portable Pen Terminals With Integrated Scanner", Copyright 1994, Bates Stamped pp. SYM00009-00012.
Internet: Symbol Technologies Incorporated, "LRT 3805 Laser Data and LRT 3800 Laser Radio Terminal Series, Integrated Wireless Data Transaction for Scan-Intensive Applications", no Copyright date, Bates Stamped pp. SYM00013-00014.
Symbol Technologies Incorporated, Series 3800 Portable Terminal User's Guide, Copyright 1992, Bates Stamped pp. SYM00015-00016.
Symbol Technologies Incorporated, "User's Guide Cradle Base Unit 3865", Copyright 1991, Bates Stamped pp. SYM00047-00052.
Symbol Technologies Incorporated, "Spread Spectrum Technology, Monograph 7", Fred P. Heiman, Jun. 1991, Bates Stamped pp. SYM00235-00254.
Symbol Technologies Incorporated, "Plain Talk About Spectrum One™", Copyright 1991, Bates Stamped pp. SYM00255-00298.
"*Lotus Sees Software Integration Rise Systems & Network Integration*," Excerpt from News Brief (unknown source), Mar. 16, 1992, p. 6.
"*IBM's TouchMobile Helps Field Workers Collect Data at the Touch of a Finger*", Pr newswire Jan. 26, 1993, on the Web at www.datastarweb.com, 3 pgs.
Lotus User's Guide, (1989), cover pg., copyright pg. pgs. iii-ix, pp. 1-1 to 1-4, pp. 9-1 to 9-17.
"*TouchMobile Solution for Data Capture and Communication*", IBM, 1-93, 13 pgs.
IBM TouchMobile Information and Planning Guide, IBM, Mar. 1993, cover pg., copyright pg., pgs. iii-vii, pp. 1 to 11, 2 comment pgs., 2 ending pgs.
"*Mobile Communications*", Informa Publishing Group, Plc., Jul. 29, 1993, 3 pgs. (unnumbered).
"*Apple Reports Strong Early Newton Sales*", United Press International, Sep. 2, 1993, 2 pgs. (unnumbered).
"*The EO 440 and EO 880, Paradigms for Personal Communications*", Smart Computing-editorial, vol. 4 issue 9, Sep. 1993, Internet article, pgs. Numbered 1-4.
Documents pgs. Numbered 442-445 with pg. leading "*Using the EO as a Fax and EO Phone*", (unknown source document).
Defendant Handspring, Inc.'s Answer and Counterclaims, Aug. 1, 2001.
Defendant and Counterclaimant Kyocera Wireless Corp.'s Answer to Complaint and Counterclaim, Aug. 7, 2001.
Notice of Motion and DataQuill's Motion to Strike Handspring's Counterclaim and Affirmative Defense Pertaining to Inequitable Conduct, Aug. 24, 2001.
DataQuill's Reply to Handspring Counterclaims, Aug. 24, 2001.
Notice of Motion and DataQuill's Reply to Kyocera Pertaining to Inequitable Conduct, Aug. 24, 2001.
DataQuill's Motion to Strike Kyocera's Counterclaims and Affirmative Defenses Pertaining to Inequitable Conduct, Aug. 24, 2001.
Handspring's Opposition to DataQuill's Motion to Strike Handspring's Counterclaim and Affirmative Defense Pertaining to Inequitable Conduct, Sep. 14, 2001.
DataQuill's Reply in Support of Its Motion to Strike Handspring's Counterclaim and Affirmative Defense Pertaining to Inequitable Conduct, Aug. 21, 2001.
Minute Order: Enter Memorandum Opinion: DataQuill's Motion to Strike is denied. Ruling set for Oct. 18, 2001 is stricken. Status hearing set for Oct. 18, 2001 at 9:30 a.m. to stand, Oct. 3, 2001.
Minute Order: DataQuill's motion to strike Handspring's counterclaim and affirmative defense pertaining to inequitable conduct is denied. Ruling set for Oct. 18, 2001 is stricken. Entered Memorandum Opinion and Order.
Handspring's Responses to DataQuill's First Set of Interrogatories (Nos. 1-11), Nov. 21, 2001.
Handspring's Responses to DataQuill's First Set of Document Requests (Nos. 1-45), Nov. 21, 2001.

DataQuill's Responses to Handspring's First Set of Interrogatories to DataQuill (Nos. 1-7), Nov. 29, 2001.
Handspring's Responses to Dataquill's Second Set of Interrogatories (Nos. 12-14), Jan. 18, 2002.
Handspring's First Set of Supplemental Responses to DataQuill's Interrogatories Nos. 1 & 3-6), Feb. 8, 2002.
Handspring's First Set of Supplemental Responses to DataQuill's Interrogatories (Nos. 1 & 3-6), Feb. 8, 2002.
Handspring's Second Set of Supplemental Responses to DataQuill's Interrogatories (Nos. 4 & 6-8), Feb. 14, 2002.
DataQuill's Second Supplemental Responses to Handspring's First Set of Interrogatories to DataQuill (Nos. 2 and 4), Feb. 20, 2002.
DataQuill's Response and Objections to Handspring's Rule 30(b)(6) Deposition Topics, Mar. 18, 2002.
DataQuill's Response to Handspring's First Set of Requests for Admissions to DataQuill (Nos. 1-184), Mar. 21, 2002.
DataQuill's Responses to Handspring's Third Set of Interrogatories to DataQuill (Nos. 12-22), Mar. 21, 2001.
DataQuill's Supplemental Responses to Handspring Interrogatory Nos. 6, 8, and 9, Mar. 22, 2002.
DataQuill's Amended Responses to Handspring's First Set of Requests for Admissions to DataQuill (Nos. 1, 9-11, 14-18, 20-25, 34, 36-42, 47-50 and 67-69, Apr. 17, 2002.
Handspring's Third Set of Supplemental Responses to DataQuill's Interrogatories (Nos. 4 & 5) Apr. 22, 2002.
Transcript of videotaped deposition of Francis John Callaghan, Mar. 4, 2002, pp. 1-71 (includes reduced format pages of deposition numbered 1-283) and word index pp. 1-23.
Transcript of videotaped deposition of Francis John Callaghan, Mar. 5, 2002. pp. 1-34 (includes reduced format pages of deposition numbered 284-419) and word index pp. 1-14.
Transcript of videotaped deposition of Paul Doran, Mar. 4, 2002, pp. 1-12 (includes reduced format pages of deposition numbered 1-48) and word index pp. 1-5.
Transcript of videotaped deposition of Paul Doran, Mar. 5, 2002, pp. 1-61 (includes reduced format pages of deposition numbered 49-291) and word index pp. 1-22.
Transcript of "Videotaped Oral Deposition of N. Rhys Merrett", Apr. 16, 2002, pp. 1-154 and Addendum, pp. 1-2. and Exhibits.
Transcript of Videotaped Comdex, Fall 2001, Handspring Keynote, pp. 1-69 and word index pp. 1-9.
Minute Order of Judge Charles P. Kocoras, Jun. 25, 2002, 2 pages.
Minute Order concerning U.S. Patent No. 6,058,304; Apr. 16, 2003 (6 pages).
Memorandum Opinion concerning U.S. Patent No. 6,058,304; Feb. 28, 2003 (24 pages).
Texlon Corporation, "Portable Data Collection and Entry Systems", McGraw-Hill Incorporated, Mar. 1989, (5 pages).
Patent License Agreement and Related Settlement Documents between DataQuill and Novatel Wireless regarding U.S. Patent No. 6,058,304, May 25, 2004 (10 pages).
Memorandum Opinion in the DataQuill v. Handspring Litigation, May 7, 2004 (16 pages).
English Translation of Official Action directed against Japanese patent application No. 511431/95, Apr. 8, 2003 (5 pages).
*DataQuill Limited* v. *Handspring, Inc.*, United States District Court Northern District of Illinois Eastern Division, Handspring's Disclosure Pursuant to 35 U.S.C. § 282, Mar. 19, 2004 (10 pages).
*DataQuill Limited* v. *Handspring, Inc.*, United States District Court for the Northern District of Illinois, "Speakerphone Deposition of David C. Allais, Ph.D., Mountain View, California", Feb. 5, 2004 (35 pages).
*DataQuill Limited* v. *Handspring, Inc.*, United States District Court for the Northern District of Illinois Eastern Division, "Deposition of Edward L. Koch", Jan. 29, 2004 (33 pages).
EO, Inc. Brochure, "It's Like Nothing Else", undated, Bates Stamped pp. HSD0014722-14729.
GO Corporation, "At Last Technology Harnesses One of the Most Powerful Forces Known to Man," copyright 1991, Bates Stamped pp. HSD0014708-0014721.
GO Corporation, "Information Statement", 1993, Bates Stamped pp. HSD0014730-0014947.

*DataQuill Limited* v. *Handspring, Inc.*, United States District Court for the Northern District of Illinois, Expert Witness Statement of Dr. David C. Allais, Ph.D., Nov. 12, 2003 (46 pages).
*DataQuill Limited* v. *Handspring, Inc.*, United States District Court for the Northern District of Illinois, "Expert Witness Statement of Mike Cheponis", Nov. 12, 2003 (84 pages).
*DataQuill Limited* v. *Handspring, Inc.*, United States District Court Northern District of Illinois Eastern Division, "Expert Report of George H. Gerstman", Nov. 12, 2003 (17 pages).
*DataQuill Limited* v. *Handspring, Inc.*, United States District Court for the Northern District of Illinois, Verified Expert Disclosure of Edward Koch Pursuant to Rule 26(a)(2)(B), Sep. 18, 2002 (17 pages).
"Supplemental to Verified Expert Disclosure of Edward Koch Pursuant to Rule 26(a)(2)(B)", Sep. 29, 2003 (15 pages).
"Second Supplement to Verified Expert Disclosure of Edward Koch Pursuant to Rule 26(a)(2)(B)", Jan. 13, 2003 (24 pages).
*DataQuill Limited* v. *Handspring, Inc.*, United States District Court for the Northern District of Illinois, "Deposition Mike Cheponis, San Francisco, California", Dec. 18, 2003 (103 pages).
Carr, R., "The Point of the Pen", *Byte*, Feb. 1991, Bates Stamped pp. HSD0014696-0014707.
Schlender, B., "Hot New PCs That Read Your Writing", *Fortune*, 1991, Bates Stamped pp. HSD0014690-0014695.
Letter from Darryl M. Woo regarding Claims 43 and 54, Dec. 16, 2003 (1 page).
*DataQuill Limited* v. *Novatel Wireless, Inc.*, United States District Court for the Southern District of California, "Pleadings-vol. 1", undated, (1 page).
*DataQuill Limited* v. *Novatel Wireless, Inc.*, United States District Court for the Southern District of California, "Complaint", "Answer, Affirmative Defenses and Counterclaims", "Reply to Counterclaims", 2003 (43 pages).
*DataQuill Limited* v. *Kyocera Wireless Corp.*, United States District Court Southern District of California, "Pleadings vol. 1", (4 pages).
*DataQuill Limited* v. *Kyocera Wireless Corp.*, United States District Court Southern District of California, "DataQuill's Rule 26(a)(1) Initial Disclosure", Jun. 30, 2003 (3 pages).
*DataQuill Limited* v. *Kyocera Wireless Corp.*, United States District Court Southern District of California, "DataQuill's Infringement Claim Chart", Jul. 18, 2003 (35 pages).
*DataQuill Limited* v. *Kyocera Wireless Corp.*, United States District Court Southern District of California, "Defendant Kyocera Wirelesss Corporation's Initial Disclosure Pursuant to Federal Rules of Civil Procedure 26(A)(1)", Jul. 26, 2003 (6 pages).
*DataQuill Limited* v. *Kyocera Wireless Corp.*, United States District Court Southern District of California, "Plaintiff's Settlement Brief", Aug. 22, 2003 (10 pages).
*DataQuill Limited* v. *Kyocera Wireless Corp.*, United States District Court Southern District of California, "DataQuill's First Set of Interrogatories and Document Request", Sep. 23, 2003 (21 pages).
*DataQuill Limited* v. *Kyocera Wireless Corp.*, United States District Court Southern District of California, "Defendant's Reponses to Plaintiff's First Set of Interrogatories and Request for Production of Documents", Nov. 19, 2003 (71 pages).
*DataQuill Limited* v. *Kyocera Wireless Corp.*, United States District Court Southern District of California, "Defendant's Supplemental Response to Plaintiff's First Set of Interrogatories and Request for Production of Documents", Dec. 10, 2003 (6 pages).
*DataQuill Limited* v. *Kyocera Wireless Corp.*, United States District Court Southern District of California, "Plaintiff's Initial Identification of Expert Witnesses", Dec. 5, 2003 (5 pages).
*DataQuill Limited* v. *Kyocera Wireless Corp.*, United States District Court Southern District of California, "Kyocera's First Designation of Expert Witnesses", Dec. 5, 2003 (4 pages).
*DataQuill Limited* v. *Kyocera Wireless Corp.*, United States District Court Southern District of California, "Settlement Brief", Aug. 29, 2003 (5 pages).
U.S. District Court for the Northern District of Illinois, *DataQuill Limited* v. *Handspring, Inc.*, Mar. 8, 2004 (20 pages).
Decision to Grant a European Patent Pursuant to Art. 97(2) EPC, EP98200196.8-2210, Aug. 14, 2003 (52 pages).

*DataQuill Limited* v. *Handspring, Inc.*, United States District Court for the Northern District of Illinois, "DataQuill's Notice of Motion to Strike Certain Statements of Fact Accompanying Handspring's Renewed Motions for Summary Judgment", Nov. 7, 2002 (108 pages).

*DataQuill Limited* v. *Handspring, Inc.*, United States District Court for the Northern District of Illinois, "Defendant Handspring's Brief in Opposition to DataQuill's Motions for Summary Judgement" Dec. 6, 2002 (73 pages).

*DataQuill Limited* v. *Handspring, Inc.*, United States District Court for the Northern District of Illinois, "Memorandum Opinion", Dec. 2, 2005 (5 pages).

*DataQuill Limited* v. *Handspring, Inc.*, United States District Court for the Northern District of Illinois, "Notice of Renewed Motions for Summary Judgement", Oct. 29, 2003 (3 pages).

*DataQuill Limited* v. *Handspring, Inc.*, United States District Court for the Northern District of Illinois, "Defendant Handspring's Memorandum in Support of it's Renewed Motion for Summary Judgment of Noninfringement and Invalidity of U.S. Patent No. 6,058,304", Oct. 29, 2002 (14 pages).

*DataQuill Limited* v. *Handspring, Inc.*, United States District Court for the Northern District of Illinois, Defendant Handspring's Renewed Motion for Summary Judgment of Invalidity of U.S. Patent No. 6,058,304 in Light of United States Patent Nos. 5,465,401 and/or 5,335,276, Oct. 29, 2002 (14 pages).

*DataQuill Limited* v. *Handspring, Inc.*, United States District Court for the Northern District of Illinois, "Defendant Handspring's Renewed Motion for Summary Judgment of Invalidity of U.S. Patent No. 6,058,304 in Light of the EO Personal Communicator and Cellular Module", Oct. 29, 2002 (14 pages).

*DataQuill Limited* v. *Handspring, Inc.*, United States District Court for the Northern District of Illinois, "Defendant Handspring, Inc.'s Statement of Material Facts Regarding it's Renewed Motions for Summary Judgement for Noninfringement and Invalidity of U.S. Patent No. 6,058,304", Oct. 29, 2002 (35 pages, also including Exhibits 1-6).

*DataQuill Limited* v. *Handspring, Inc.*, United States District Court for the Northern District of Illinois, "DataQuill's Response to Handspring's Renewed Motion for Summary Judgment of Non-Infringement and Invalidity", Jan. 10, 2003 (12 pages).

*DataQuill Limited* v. *Handspring, Inc.*, United States District Court for the Northern District of Illinois, Plaintiff's Response to Defendant's Renewed Motion for Summary Judgment of Invalidity "In Light of United States Patent Nos. 5,465,401 and/or 5,335,276", Jan. 10, 2003 (12 pages).

*DataQuill Limited* v. *Handspring, Inc.*, United States District Court for the Northern District of Illinois, Plaintiff's Response to Defendant's Response to Defendant's Motion for Summary Judgment of Invalidity "In Light of the EO Personal Communicator and Cellular Module", Jan. 10, 2003 (23 pages).

*DataQuill Limited* v. *Handspring, Inc.*, United Stated District Court for the Northern District of Illinois, "Plaintiff's Local Rule 56.1(b)(3)(A) Response to Defendant Handspring, Inc.'s Statement of Material Facts Regarding it's Renewed Motions for Summary Judgment for Noninfringement and Invalidity of U.S. Patent No. 6,058,304", Jan. 10, 2003 (48 pages).

*DataQuill Limited* v. *Handspring, Inc.*, United States Distric Court for the Northern District of Illinois, "DataQuill's Local Rule 56.1(b)(3)(B) Statement of Additional Facts Requiring the Denial of Handspring's Renewed Summary Judgment Motions", Jan. 10, 2003 (23 pages).

*DataQuill Limited* v. *Handspring, Inc.*, United States District Court for the Northern District of Illinois, "Appendix of Exhibits Relating to Plaintiff DataQuill's Local Rule 56.1(b)(3)(A) Response to Handspring's Statement of Facts and Plaintiff DataQuill's Local Rule 56.1(b)(3)(B) Statement of Additional Facts Requiring the Denial of Handspring's Renewed Summary Judgment Motions, vol. 1 of 4", Jan. 10, 2003 (3 pages, also including Exhibits 1-11).

*DataQuill Limited* v. *Handspring, Inc.*, United States District Court for the Northern District of Illinois, "Appendix of Exhibits Relating to Plaintiff DataQuill's Local Rule 56.1(b)(3)(A) Response to Handspring's Statement of Facts and Plaintiff DataQuill's Local Rule 56.1(b)(3)(B) Statement of Additional Facts Requiring the Denial of Handspring's Renewed Summary Judgment Motions, vol. 2 of 3", Jan. 10, 2003 (3 pages, also including Exhibits 12-17).

*DataQuill Limited* v. *Handspring, Inc.*, United States District Court for the Northern District of Illinois, "Appendix of Exhibits Relating to Plaintiff DataQuill's Local Rule 56.1(b)(3)(A) Response to Handspring's Statement of Facts and Plaintiff DataQuill's Local Rule 56.1(b)(3)(B) Statement of Additional Facts Requiring the Denial of Handspring's Renewed Summary Judgment Motions, vol. 3 of 3", Jan. 10, 2003 (3 pages, also including Exhibits 18-25).

*DataQuill Limited* v. *Handspring, Inc.*, United States District Court for the Northern District of Illinois, "Appendix of Declarations and Deposition Testimony Relating to Plaintiff DataQuill's Local Rule 56.1(b)(3)(A) Response to Handspring's Statement of Facts and Plaintiff DataQuill's Local Rule 56.1(b)(3)(B) Statement of Additional Facts Requiring the Denial of Handspring's Renewed Summary Judgment Motions", Jan. 10, 2003 (190 pages).

*DataQuill Limited* v. *Handspring, Inc.*, United States District Court for the Northern District of Illinois, "Notice of Filing", Jan. 21, 2003 (3 pages).

*DataQuill Limited* v. *Handspring, Inc.*, United States District Court for the Northern District of Illinois, "Defendant Handspring's Reply Brief in Support of it's Renewed Motion for Summary Judgment of Invalidity of U.S. Patent No. 6,058,304 in Light of the EO Personal Communicator and Cellular Module", Jan. 21, 2003 (6 pages).

*DataQuill Limited* v. *Handspring, Inc.*, United States District Court for the Northern District of Illinois, "Defendant Handspring, Inc.'s Reply in Support of it's Renewed Motion for Summary Judgment of Noninfringement of U.S. Patent No. 6,058,304", Jan. 21, 2003 (6 pages).

*DataQuill Limited* v. *Handspring, Inc.*, United States District Court for the Northern District of Illinois, Defendant Handspring's Reply Brief in Support of it's Renewed Motion for Summary Judgment of Invalidity of U.S. Patent No. 6,058,304 in Light of United States Patent Nos. 5,465,401 and/or 5,335,276.

*DataQuill Limited* v. *Handspring, Inc.*, United States District Court for the Northern District of Illinois, "Supplemental Declaration of Richard G. Sanders in Support of Handspring's Motions for Summary Judgment", Jan. 17, 2003 (2 pages, including Exhibits 1-7).

*DataQuill Limited* v. *Handspring, Inc.*, United States District Court for the Northern District of Illinois, "DataQuill's Motion for Leave to File Surreply to Handspring's Renewed Motion for Summary Judgment of Invalidity in Light of the TI Patents", Feb. 7, 2003 (6 pages).

*DataQuill Limited* v. *Handspring, Inc.*, United States District Court for the Northern District of Illinois, "Handspring's Opposition to DataQuill's Motion for Leave to File Surreply to Handspring's Motion for Summary Judgment of Invalidity in Light of the TI Patents", Feb. 10, 2003 (11 pages).

*DataQuill Limited* v. *Handspring, Inc.*, United States District Court for the Northern District of Illinois, "Handspring's Renewed Motion to Strike the Report, the Declaration, and Exclude the Testimony, of Harvey Brodsky", Jan. 21, 2003 (15 pages).

*DataQuill Limited* v. *Handspring, Inc.*, United States District Court for the Northern District of Illinois, "Declaration of Jonathan H. Takei in Support of Handspring's Renewed Motion to Strike the Report, the Declaration, and Exclude the Testimony, of Harvey Brodsky", Jan. 18, 2003 (2 pages, including Exhibits A-E).

*DataQuill Limited* v. *Handspring, Inc.*, United States District Court for the Northern District of Illinois, "Plaintiff DataQuill's Response to Defendant's Motion to Strike Brodsky Declaration", Feb. 10, 2003 (34 pages).

*DataQuill Limited* v. *Handspring, Inc.*, United States District Court for the Northern District of Illinois, "Plaintiff's Motion to Reconsider Part of Memorandum Opinion and Order", Mar. 14, 2003 (5 pages, including Exhibits A-B).

*DataQuill Limited Handspring, Inc.*, United States District Court for the Northern District of Illinois, "Defendant Handspring's Brief in Support of its Opposition to DataQuill's Motion to Reconsider Part of Memorandum Opinion and Order," Apr. 1, 2003 (4 pages).

*DataQuill Limited* v. *Handspring, Inc. and Kyocera Wireless Corp.; Handspring, Inc.,* v. *DataQuill Limited; Kyocera Wireless Corp.* v.

*DataQuill Limited*, United States District Court Northern District of Illinois Eastern Division, "Memorandum Opinion", Feb. 28, 2003 (24 pages).

*DataQuill Limited* v. *Handspring, Inc.*, United States District Court for the Northern District of Illinois Eastern Division, "Memorandum Opinion", Apr. 16, 2003 (6 pages).

*DataQuill Limited* v. *Handspring, Inc.*, United States District Court for the Northern District of Illinois Eastern Division, "Plaintiff's Trial Brief", Feb. 17, 2004 (17 pages).

*DataQuill Limited* v. *Handspring, Inc.*, United States District Court for the Northern District of Illinois Eastern Division, "Defendant Handspring's Trial Brief", Feb. 17, 2004 (21 pages).

*DataQuill Limited* v. *Handspring, Inc.*, United States District Court for the Northern District of Illinois, "Final Pretrial Order", Feb. 17, 2004 (7 pages, including 15 Exhibits).

Intel Corporation, "80C31BH/87C51BH/87C51 MCS® 51 CHMOS Single-Chip 8-BIT Microcontroller", Copyright 1995, (16 pages).

GO Corporation, "Technical Paper Series: The Go Message Center", 1992, Bates Stamped pages CHEPONIS 000052-000081.

"Wireless for the Corporate user", Jun. 1993, Bates Stamped pages CHEPONIS 000082-000148.

GO Corporation, "Getting Started with EO Personal Communicator", Copyright 1993, Bates Stamped pages CHEPONIS 000152-000233.

GO Corporation, "Lookup Guide to the EO Personal Communicator", Copyright 1993, Bates Stamped pages CHEPONIS 000234-000557.

GO Corporation, "The World of Messaging, An Introduction to Personal Communications", Copyright 1993, Bates Stamped pages CHEPONIS 000558-000631.

Photographs of an EO Personal Communicator 440, 1993, 11 pages.

*DataQuill Limited* v. *Handspring, Inc.*, United States District Court for the Northern District of Illinois Eastern Division, Handspring's Case Status Update, Jun. 28, 2004, 11 pages.

*DataQuill Limited* v. *Handspring, Inc.*, United States District Court for the Northern District of Illinois Eastern Division, Notice of filing, Jul. 19, 2004, 3 pages.

*DataQuill Limited* v. *Handspring, Inc.*, United States District Court for the Northern District of Illinois Eastern Division, "Defendant Handspring, Inc.'s Opening Brief in Support of its Motion for Summary Judgment of Invalidity," Jul. 19, 2004, 39 pages.

*DataQuill Limited* v. *Handspring, Inc.*, United States District Court for the Northern District of Illinois Eastern Division, "Defendant Handspring, Inc.'s Supplemental Statement of Material Facts Regarding Its Motion for Summary Judgment for Invalidity of U.S. Patent No. 6,058,304 and Motion for Partial Summary Judgment as to Damages," Jul. 19, 2004, 5 pages.

*DataQuill Limited* v. *Handspring, Inc.*, United States District Court for the Northern District of Illinois Eastern Division, "Declaration of Khoi D. Nguyen in Support of Handspring's Motion for Summary Judgment of Invalidity and Motion to Strike the Report and Exclude Testimony of Joseph Gemini and for Partial Summary Judgment as to Damages," Jul. 19, 2004, 3 pages.

"High in Apple's Bet on PC," The New York Times, Jul. 30, 2002, 5 pages.

"Pen-based Zoomer, Newton phone services highlight CES," http://www.dialogclassic.com/main.vmgw, Jun. 7, 1993, 2 pages.

*DataQuill Limited* v. *Handspring, Inc.*, United States District Court for the Northern District of Illinois Eastern Division, Deposition of Edward L. Koch, Jan. 29, 2004, pp. 179-181, 229-231, 234-237, 264-265.

"Gesture Set Economics for Text and Spreadsheet Editors," Proceedings of the Human Factors Society 34th Annual Meeting, 1990, pp. 410-414.

*DataQuill Limited* v. *Handspring, Inc.*, United States District Court for the Northern District of Illinois Eastern Division, "Declaration of Mike Cheponis in Support of Handspring's Motion for Summary Judgment of Invalidity," Jul. 18, 2004, 9 pages.

*DataQuill Limited* v. *Handspring, Inc.*, United States District Court for the Northern District of Illinois Eastern Division, "Plaintiffs Response to Handspring's (Third) Motion for Summary Judgment of Invalidity Based on Anticipation in View of "TI Patents" with Tabs A, B, C," Aug. 23, 2004, 53 pages.

*DataQuill Limited* v. *Handspring, Inc.*, United States District Court for the Northern District of Illinois Eastern Division, "DataQuill's L.R.56.1(b)(3)(B) Statement of Additional Facts Requiring the Denial of Handspring's Second Renewed Summary Judgment Motion and Handspring's Motion to Strike the Report and Exclude the Testimony of Joseph Gemini and for Partial Summary Judgment as to Damages," Aug. 23, 2004, 26 pages.

*DataQuill Limited* v. *Handspring, Inc.*, United States District Court for the Northern District of Illinois Eastern Division, "1. Plaintiff's L.R.56.1(b)(3)(A) Response to Handspring, Inc.'s Supplemental Statement of Material Facts: Second Renewed Motion for Summary Judgment for Invalidity of U.S. Patent No. 6,058,304 and Motion for Partial Summary Judgment as to Damages; 2. Plaintiff's L.R. 56.1(b)(3)(A) Response to Handspring, Inc.'s Statement of Material Facts: Second Renewed Motion for Summary Judgment for Invalidity of U.S. Patent No. 6,058,304 and Motion for Partial Summary Judgment as to Damages," Aug. 23, 2004, 51 pages.

*DataQuill Limited* v. *Handspring, Inc.*, United States District Court for the Northern District of Illinois Eastern Division, Appendix to Response to Handspring's Supplemental and Initial Statement of Facts and Statement of Additional Facts Requiring (vol. 1 of 3), containing Edward Koch's Response to New Declaration of Mr. Cheponis, Second Supp. To Verified Expert Disclosure of Edward Koch Pursuant To Rule 26(a)(2)(B), Deposition of Edward Koch, and Deposition of Michael Cheponis, Aug. 23, 2003, 160 pages.

*DataQuill Limited* v. *Handspring, Inc.*, United States District Court for the Northern District of Illinois Eastern Division, "Appendix to Response to Handspring's Supplemental and Initial Statement of Facts and Statement of Additional Facts Requiring (vol. 2 of 3), containing PX 21, pp. from Treo 600 manual, 2003," Aug. 23, 2003, 6 pages.

*DataQuill Limited* v. *Handspring, Inc.*, United States District Court for the Northern District of Illinois Eastern Division, "Appendix to Response to Handspring's Supplemental and Initial Statement of Facts and Statement of Additional Facts Requiring (vol. 3 of 3), containing PX 101, Transcript of COMDEX Fall 2001, Handspring Keynote," Aug. 23, 2003, 79 pages.

*DataQuill Limited* v. *Handspring, Inc.*, United States District Court for the Northern District of Illinois Eastern Division, "Handspring, Inc.'s Motion for Leave to Submit Reply Papers in Support of Its Motion for Summary Judgment of Invalidity and Motion to Strike," Aug. 27, 2004, 5 pages.

*DataQuill Limited* v. *Handspring, Inc.*, United States District Court for the Northern District of Illinois Eastern Division, "Order denying motion," Aug. 27, 2004, 1 page.

*DataQuill Limited* v. *Handspring, Inc.*, United States District Court for the Northern District of Illinois Eastern Division, "Notice of Filing of Corrected Page," Sep. 2, 2004.

*DataQuill Limited* v. *Handspring, Inc.*, United States District Court for the Northern District of Illinois Eastern Division, "Email re typo, sent to Court," Sep. 7, 2004, 1 page.

*DataQuill Limited* v. *Handspring, Inc.*, United States District Court for the Northern District of Illinois Eastern Division, "Local Rule 56.1(a)(3)(B) Statement of Handspring in Response to DataQuill's Local Rule 56.1(b)(3)(B) Statement," Sep. 3, 2004, 90 pages.

*DataQuill Limited* v. *Handspring, Inc.*, United States District Court for the Northern District of Illinois Eastern Division, "Supplemented Docket sheet," Sep. 8, 2004, 24 pages.

*DataQuill Limited* v. *Handspring, Inc.*, United States District Court for the Northern District of Illinois Eastern Division, "Notice of Motion and Motion for Leave to Submit Confidential-Designated Materials to Certain Third Parties," May 16, 2002, 5 pages and Tabs A-E.

*DataQuill Limited* v. *Handspring, Inc.*, United States District Court for the Northern District of Illinois Eastern Division, "Minute Order," Jun. 25, 2002, 2 pages.

Excerpts of Edward Koch Expert Reports, dated Mar. 22, 2005, Feb. 28, 2005, Jan. 13, 2004, Sep. 18, 2002, numbered PX11-1 to -124.

Edward Koch's Rebuttal to Certain New Contentions Raised by Kyocera, dated Jun. 23, 2005, numbered PX12-1 to -8.

1993 Consultancy Agreement, dated Mar. 22, 1993, bates No. KYO006928-32.
1995 Consultancy Agreement, dated Jan. 25, 1995, bates No. KYO006933-39.
Litigation Declaration of Francis Callaghan in *DataQuill Ltd.* v. *Kyocera Wireless*, dated Jun. 27, 2005, numbered PX15-1 to -6.
Litigation Declaration of Paul Doran in *DataQuill Ltd.* v. *Kyocera Wireless*, dated Jun. 27, 2005, numbered PX16-1 to -5.
Litigation Supp. Declaration of Paul Doran in *DataQuill Ltd.* v. *Kyocera Wireless*, dated Jul. 30, 2005.
Litigation Declaration of Garry Robb in *DataQuill Ltd*v. *Kyocera Wireless*, dated Jun. 27, 2005, numbered PX17-1 to -5.
Litigation Supp. Declaration of Garry Robb, GR0006 attached, in *DataQuill Ltd.* v. *Kyocera Wireless*, dated Aug. 1, 2005.
Plaintiff's Ex Parte Notice of Potential Amendment to Summary Judgment Record, dated Jul. 21, 2005.
Rainer Thonnes Deposition Excerpts, dated Mar. 29, 2005, numbered PX18-1 to -45.
Francis Callaghan Deposition Excerpts, dated Mar. 23, 2005, numbered PX19-1 to -10.
Paul Doran Deposition Excerpts, dated Mar. 24, 2005, numbered PX20-1 to -20.
Gary Robb Deposition Excerpts, dated Mar. 15, 2005, numbered PX21-1 to -22.
Jan Orkisz Deposition Excerpts, dated Mar. 30, 2005, numbered PX22-1 to -26.
Lawrence Goffney Expert Report, Kyocera Wireless, dated Mar. 1, 2005, numbered PX23-1 - 4.
Lawrence Goffney Notice of Errata re Expert Report, Kyocera Wireless, dated Mar. 4, 2005, numbered PX24-1 - 6.
TREO Communicator Information, dated 2003, bates No. DQ 7958 - 61; DQ 7903 - 09; DQ 7918; DQ 7922 - 24; DQ 7939 - 40; DQ 7945; DQ 7947; DQ 7843 - 44; DQ 7846 - 51; DQ 7855 - 57; DQ 7863; DQ 7866 - 67; DQ 7880 - 84.
Excerpt from opinion, *Quantel Ltd.* v. *Spaceward Microsystems, Ltd.*, 1990 R.P.C 83, 1990 WL 753823, numbered PX26-1 to -3.
Letter from Mr. Merrett, dated Apr. 2, 1996, numbered PX29-1 to -2.
Excerpts from U.S. Securities and Exchange Commission, Form 10-K/A Amendment, dated Jun. 28, 2003, numbered PX29-1 to -2.
Kyocera Response to First Set of Interrogatories, dated Nov. 19, 2003.
Kyocera Second Supplemental Responses to First Set of Interrogatories, dated Apr. 1, 2005.
Pages of "AT&T EO Personal Communicator The Digital Nomad's Guide," Copyright ® 1993, bates No. KYO05340-5348.
Rainer Thonnes, Deposition, pp. 1-284, dated Mar. 29, 2005.
"Ailing EO Cuts Workforce in Half," The San Francisco Chronicle, Mar. 10, 1994, numbered PX39-1 to -2.
"AT&t pulls the plug on high-tech EO," The San Francisco Chronicle, Jul. 28, 1994, numbered PX39-3 to -4.
"At&T pulls plug on ambitious EO pen-computing business," Business Journal, San Jose, Aug. 1, 1994, numbered PX39-5 to -6.
Plaintiff's Ex Parte Application to Correct Patent Term Glossary Definition of "Updating", dated Jun. 6, 2005.
Civil Report in *DataQuill Ltd.* v. *Kyocera Wireless*, dated Sep. 6, 2005.
Rainer Thonnes deposition testimony excerpts, dated Mar. 29, 2005, numbered EX02-032 to -077.
Gary Robb deposition testimony excerpts, dated Apr. 15, 2005, numbered EX03-078 to -140.
Facsimile from Mr. Robb to Mr. Ibbet re microprocessor, etc., Garry D. Robb, dated Sep. 12, 1988, bates No. KYO007130-7146.
Automated Service System, R. Thonnes or J. Johnstone, dated Dec. 14, 1988, bates No. KYO007147-7148.
Automated Service System—A Progress Report, R. Thonnes, dated Jun. 2, 1989, bates No. KYO007151-7153.
Automated Service System, R. Thonnes or J. Johnstone, dated Dec. 14, 1988, bates No. KYO07149-7150.
Barcode Reader, J. Johnstone, dated Sep. 15, 1989, bates No. KYO007154-7155.

"Winfair launches two-way bar code reader," Glasgow Herald, Scotland, dated Aug. 25, 1992, bates No. KYO006926-6927; KYO008809.
Note from Rainer Thonnes to Paul Doran re modifications and barcodes, Mar. 9, 1995, bates No. DQ 01304-1308.
DataQuill a report by Colin Bill and Anthony Hopkin, dated Apr. 7, 1995, bates No. DQ 02018-2029.
Jan Orkisz deposition testimony excerpts, dated Mar. 30, 2005, numbered EX12-187 to -219.
Company formation documents of Winfair Systems (Scotland) Limited, 1991, bates No. KYO006940-6958.
Rainer Thonnes Declaration, dated Jul. 25, 2005, numbered EX14-239 to -240.
Letter from Kim Robb to Rainer Thonnes, dated May 29, 1991, bates No. RT000001-2.
"DATAQUILL," Winfair Systems Limited., Scotland, 1992, bates No. DQ0900; AT000002 (produced by Alec Tait).
Patents Status Information, UK Patent Office, dated May 19, 2005; Register Entry for GB2282906, dated May 2001; Notification of Grant, The Patent Office, UK, dated Oct. 1, 1996; Request for Grant of a Patent, DataQuill Ltd., UK, dated Oct. 13, 1993m bates No. EX17, BIF002779-82, BIF002856-57.
Excerpt of UK Patent Application GB 2,282,906 A publication, DataQuill Ltd., dated Apr. 19, 1995, bates No. EX18, BIF002810-2818.
UK Patent Law, dated Jun. 1, 1991, numbered EX19-261 to -263.
Francis J. Callaghan Deposition excerpts (Handspring), Mar. 4, 2002, numbered EX25-307 to -313.
Paul Doran Deposition excerpts, dated Mar. 24, 2005, numbered EX26-314 to -323.
Paul Doran Deposition excerpts (Handspring), dated Mar. 4, 2002, numbered EX27-324 to -333.
Garry D. Robb Deposition excerpts (Handspring), dated May 31, 2002, numbered EX28-334 to -337.
Francis Callaghan Deposition excerpts, dated Feb. 23, 2005, numbered EX29-338 to -365.
"AT&T EO 440 Personal Communicator available in Phone Centers," dated Jun. 30, 1993 and Jul. 3, 2001, bates No. EX30, BF1001705-06.
"Personal digital assistants win a hand,"Computer Line, dated Sep. 28, 1993, numbered EX30-368 to -69.
Business, San Diego Tribune, dated Sep. 17, 1993, numbered EX30-370-71.
Copyright Certificate of Registration "AT&T EO Personal Communicator: The Digital Nomad's Guide," dated Jul. 5, 1994, numbered EX31-372-373.
Pages of "AT&T EO Personal Communicator The Digital Nomad's Guide," Copyright ® 1993, numbered, EX32, EX32-374 to -395, KYO005340-5342.
Behind the Wheel of the First Zoomer and Newton PDAs, Byte, Sep. 1993, bates No. EX33, KYO005919-5921.
Advertisement, Casio Zoomer, Los Angeles Times, Oct. 10, 1993, bates No. EX34, KYO007390-91.
"The Wireless Factor," Byte, Oct. 1993, bates No. KYO005890.
"EO's Personal Communicator Ushers In a New Era," Byte, Mar. 1993, bates No. KYO005917.
"State of the Art Client/Server Frees Data," Byte, Jun. 1993, bates No. KYO5918.
"PDAs Arrive But Aren't Quite Here Yet," Byte, Oct. 1993, bates No. KYO005898-900.
"Some Computer Science Issues In Ubiquitous Computing," pp. 75-85, Communications of the ACM, Jul. 1993, bates No. KYO009071-82.
Excerpts of application file for US pat. 5537608, bates No. KYO009083-111.
Excerpts of "IBM's Personal Computer," Que Corporation, Copyright ® 1982, bates No. KYO009116-21.
"The Complete Error Free System to Save Your Company Time and Money", Winfair Systems (Scotland) Limited, 1992, bates No. EX35-402 - 403; DQ00914-15; DQ00916-17; DQ02417-18; DQ02409-10; AT000003-4.
Letter from Office of the Chief Advisor to the States, States of Jersey, 26th Oct. 1993, bates No. DQ02149-50.

Business plan, RHS/BTS/DataQuill, bates No. DQ01969-2011.
Memo., Communication Protocol Revised Specification of DataQuill/Computer, DataQuill, R. Thonns, Apr. 2, 1992, bates No. DQ0031-34; DQ02405-06.
DataQuill System I Serial and Modem Versions User Manual, DataQuill Limited, bates No. DQ02330-59.
Dataquill User Manual, partial, bates No. DQ00544-57.
Type Examination Certificate No. BABT/95/2886, British Approvals Board for Telecommunications, dated Aug. 21, 1995, bates No. DQ02242-44.
Production Quality Assurance Approval No. 0736, British Approvals Board for Telecommunications, dated Jul. 31, 1995, bates No. DQ02246-47.
DataQuill Patent Protected System, DataQuill Ltd., 1995, bates No. DQ03393-94.
"Barcode pens keep stock of business," Sunday Times, Jun. 18, 1995, bates No. DQ01159.
"Worth Watching," Della Bradshaw, Financial Times, dated Aug. 4, 1994, bates No. DQ00377.
"Surprise AOL Wins," Fortune, dated Mar. 30, 1998, bates No. DQ00071-79.
Invoice re Consultancy Services of Dr R Thonnes, Department of Computer Science—Apr. & May 1993, dated Jul. 22, 1993, bates No. DQ00092.
The Bar Code Color Book, Symbology Inc., Table 4 continued, Feb. 2, 1989, bates No. DQ01034-39.
UPC Check Digit Calculation [etc.], Symbology Ltd, ® Copyright 1991, bates No. DQ01040-46.
PENpal, Reader Software for the Datawand Barcode, bates No. DQ01056.
Telxon Application Story, Telxon Limited, bates No. DQ01760-62.
Fax transmission, Telxon Limited, dated Jul. 7, 1993, bates No. DQ01759.
Text systems, Text Systems Ltd, Sep. 28, 1993, bates No. DQ01889-94.
SDT Noveau terminal de saisie de donnees, Symbol Technologies Inc., 1990, bates No. DQ01895-96.
PDT Plus Portable Data Collection Terminal, Symbol Technologies Inc., 1990, bates No. DQ01897-98.
"The pen is mightier . . . ", Automatic I.D. News Europe, Jun. 1995, bates No. DQ02291-92.
Bar Code Symbologies, pp. 11-18, 27-28, bates No. DQ02419-26, DQ02443-44.
Telxon Portable 24-Column Microprinter, Telxon Limited, ® Copyright 1984, bates No. DQ0251-52.
Various letters to/from DataQuill Ltd. re licensing issues, dated 1995 to 1999, bates No. EX36, DQ00304; DQ00214; DQ00207; DQ00447; DQ00521-23; DQ 1711 - 12; DQ 2545; DQ2595; DQ 3306 - 07; DQ 3309; DQ 3352 - 54; DQ 3363 - 68; DQ 3404; DQ 3449; DQ 3573; DQ 3573; DQ 3615.
Letter to F J Callaghan, Nokia, dated May 1, 1997, bates No. EX37, DQ 3309.
General Notes on the DataQuill, Rainer Thonnes to Frank Callaghan, dated Feb. 8, 1998, bates No. EX38, DQ 00115-118.
Claim Chart of Kyocera Wireless re claim No. 31, dated Jun. 7, 2005, numbered EX39-437 to -449.
Claim Construction Order, *DataQuill Ltd.* v. *Kyocera Wireless*, dated May 11, 2005, numbered EX40-450 to -467.
Declaration of Royce W. Fletcher, dated Jun. 7, 2005, numbered EX41-468 to -511.
Excerpts from Markman Hearing Transcript, dated May 3, 2005, numbered EX42-512 to -517.
Pages from "The Official Guide to the Prodigy Service," ® 1991, bates No. EX47, KYO005411-29.
Order Denying Defendant's Motion for Summary Judgment and Partial Summary Judgment, filed Jul. 22, 2005.
Excerpt of Expert Report of Royce W. Fletcher, Kyocera Wireless, dated Mar. 2005, numbered EX52-766 to -767.
Excerpt of Verified Expert Report of Edward Koch, dated Mar. 22, 2005, numbered EX53-768 to -769.
Claim Chart of Kyocera Wireless, dated Jun. 7, 2005, numbered EX56-855 to -863.

Plaintiff's Memorandum of Points and Authorities in Opposition to Kyocera's Motion for Summary Judgment, dated Jun. 27, 2005.
Plaintiff's Responses to Kyocera's Motion for Summary Judgment, dated Jun. 27, 2005.
DataQuill's Separate Statement of Facts in Opposition to Kyocera's Motion for Summary Judgment, dated Jun. 27, 2005.
Notice of Lodgment of Exhibits, dated Jun. 27, 2005.
Memorandum of Points and Authorities in Support of Kyocera's Motion for Summary Judgment re Patent No. 6,058,304, dated Jun. 7, 2005.
Separate Statement of Material Facts in Support of Kyocera's Motion for Summary Judgment and Partial Summary Judgment re: U.S. Patent No. 6,058,304, dated Jun. 7, 2005.
N. Rhys Merrett Deposition Transcript excerpt, dated Apr. 16, 2002, bates No. EX21, FW11515; FW11528; EX21-266-67.
Superseding Claim Construction Order for United States Patent No. 6,058,304, *DataQuill Ltd.* v. *Kyocera Wireless*, dated Jul. 1, 2005.
Supplemental Declaration of Royce W. Fletcher in Support of Kyocera's Motion For Summary Judgment and Partial Summary Judgment, dated Jul. 5, 2005.
Letter from Frank Callaghan to Lawrence D'arcy, dated Dec. 5, 1997, bates No. EX57, DQ 00304.
DataQuill, DataQuill Ltd., dated post Feb. 1996, bates No. EX58, DQ 00651-52.
DataQuill, DataQuill Ltd., dated post Feb. 1996, bates No. EX 59, DQ 00527.
Letter, Frank Callaghan to Chris James/Bill Gates re DataQuill Ltd., dated Jul. 12, 1998, bates No. EX60, DQ 01711-12.
Facsimile from Sue Powell to Frank Callaghan re Meeting at Psion Industrial, dated Jul. 30, 1997, bates No. EX61, DQ 03544-48.
DataQuill's Rule 26(a)(1) Initial Disclosure, dated Jun. 30, 2003.
U.K. Patent Application 9600804.0, dated Jan. 17, 1996.
Excerpts of Paul Doran Deposition, dated Mar. 24, 2005, EX67, pp. 1, 52.
Excerpts of Markman Hearing, dated May 3, 2005, EX69, pp. 1, 261.
Excerpts of Rainer Wilhelm Thonnes deposition, dated Mar. 29, 2005, EX70, pp. 1, 87.
Expert Report of Royce W. Fletcher, Kyocera Wireless, dated Mar. 1, 2005, EX71, pp. 1-24; Exhibits I, II, III, IV and V.
Pages of Intel Product Guide, dated 1990, bates No. EX72, KYO009112-15.
Exerpts of Supplemental Expert Report of Royce W. Fletcher relating to validity, Kyocera Wireless, dated Aug. 5, 2005, SUP-1 to -4; OBV_SUP-1 to -38; IMP_SUP-1 to -3; DOC_SUP-1 to -2; Attachment I; Attachment II.
Expert Report of Lawrence J. Goffney, Jr., Kyocera Wireless, dated Mar. 1, 2005, EX74, pp. 1-24; Exhibit A.
Reply Memorandum of Points and Authorities in Support of Kyocera's Motion for Summary Judgment and Partial Summary Judgment re Patent No. 6,058,304, dated Jul. 5, 2005.
DataQuill's (Second) Ex Parte Motion To Strike Certain New Exhibits And Theories Re Kyocera's Motion For Summary Judgment, dated Jul. 15, 2005.
Kyocera's Responses to DataQuill's Separate Statement of Facts in Opposition to Motion for Summary Judgment or Partial Summary Judgment, dated Jul. 5, 2005.
Notice of Lodgment, dated Jul. 11, 2005.
Declaration of Alec Tait in Support of Kyocera's Reply Regarding its Motion for Summary Judgment and Partial Summary Judgment re: U.S. Patent No. 6,058,304, dated Jul. 5, 2005.
Kyocera's "Ex Parte Application Correting Typographical Error"; Dain Declaration, dated Jul. 12, 2005.
Plaintiff's Response To Kyocera's "Ex Parte Application Correcting Typographical Error"; Dain Declaration, dated Jul. 15, 2005.
Declaration of John S. Kyle in Reply Regarding Defendant Kyocera wireless Corp.'s Motion for Summary Judgment and Partial Summary Judgment, dated Jul. 5, 2005.
Declaration of Victor M. Felix in Support of Kyocera Wireless Corp.'s Motion for Summary Judgment and Partial Summary Judgment, dated Jul. 5, 2005.
Provision of a copy of the minutes in accordance with Rule 76(4) EPC, in EPO, dated Feb. 2, 2001.

Grounds for Appeal and attached Feb. 21, 2005 Decision of the Board, and cumulative list of cited art, in EPO, dated Jul. 13, 2005.

Docket sheet, Documents for application No. 94927728, dated Jul. 21, 2005.

Docket sheet, Documents for application No. 98200196, dated Jul. 21, 2005.

"The Global System for Mobile Communication," M. Mouly, Copyright ® 1992, excerpts, cover pages, pp. 67-71.

Photograph, the "Dataquill" in action, Winfair Systems, bates No. ORK000001-2 (produced by Jan Orkisz).

Notes re "Scan Tech. Jun. 23", bates No. ORK000003.

Memo., Winfair Systems (Scotland) LImited, Feb. 26th, 28th 1992, bates No. ORK000004-9.

Memo., Winfair Systems (Scotland) Limited, 1992, bates No. ORK000010-16.

Dataquill projected sales for 1992, Winfair Systems (Scotland) Limited, 1992, bates No. ORK000017.

Meeting agenda, Winfair Systems (Scotland) Limited, 3rd Aug. 1992, bates No. ORK000018.

Notes, Winfair Systems (Scotland) Limited, bates No. ORK000019-20.

Minutes of meeting held, Winfair Systems (Scotland) Limited, 14th Jul. 1992, bates No. ORK000021-22.

Dataquill specification, Winfair Systems (Scotland) Limited, bates No. ORK000023.

Letter to Winfair Systems (Scotland) Ltd. from Jan K. Orkisz, Winfair Systems (Scotland) Limited, 7th Sep. 1992, bates No. ORK000024.

Overdraft guarantee, Winfair Systems (Scotland) Limited, Mar. 2, 1992, producted by Jan Orkisz.

Share Certificate, Winfair Systems (Scotland) Limited, May 28, 1992, bates No. AT00001.

1988 CCITT Blue Book, www.nmedia.nte/docs/ccitt/1988, Feb. 9, 2005, bates No. KYO005562-67.

Matrix Bar Code Symbologies, www.aimglobal.org/aimstore/matrixsymbologies.htm, Mar. 23, 2004, bates No. KYO005672-74.

"Sharp's Non-Newtonian PDA," Byte, dated Oct. 1993, bates No. KYO005884-89.

"The future of pen computing," Byte, dated Mar. 1992, bates No. KYO005894.

"Ease of use is relative," Byte, dated Oct. 1993, bates No. KYO005901-04.

"Rough Gems: first pen systems show promise, lack refinement," Byte, dated Apr. 1992, bates No. KYO005905-10.

What's New Systems, Byte, dated Jan. 1992, bates No. KYO005897.

Dataquill 1 Prototype, Winfair Systems Ltd., bates No. AT000005.

Memo., Requirements for Cherry International, Winfair Systems Ltd., bates No. AT000006-07.

Tait to Grange Galleries, Winfair Systems Ltd., 27th Jul. 1992, bates No. AT000008-09.

Item systems fax to Winfair Systems Ltd., Jun. 17, 1992, bates No. AT000010.

Fax from Jan Orkisz, Winfair Systems, Jun. 19, 1992, bates No. AT000011.

Brief Specification of the DataQuill, R. Thonnes, 1995 or 1996, bates No. DQ02407.

Memo, re DataQuill specification, dated Sep. 10, 1993, bates No. DQ00094-97.

Non-disclosure Agreement, dated Sep. 24, 1993, bates No. DQ01887-88.

Note from R. Thonnes to G. Robb, dated Oct. 19, 1993, bates No. DQ02088.

Gupta carving niche in PC LAN development; local area network; Company Profile, Software Magazine, vol. 13 ; No. 4 ; p. 118, dated Mar. 1993.

Modeling transaction integrity: how CASE tools illustrate the relationships between transactions and data; computer-aided software engineering; Application Strategies; Tutorial, DBMS, vol. 6; No. 1; p. 62, dated Jan. 1993.

Using stored procedures and triggers; Application Strategies; Tutorial, DBMS, vol. 5; No. 10; p. 66, dated Sep. 1992.

The goal: a real network; how the testing methodology for the servers was created; includes related article on Structured Query Language Statements; What's the Right Size?, Corporate Computing, vol. 1; No. 1; p. 133, dated Jun. 1992.

The future of pen computing, Part 2, Byte, dated Apr. 1992, bates No. KYO005891-93.

Wireless Mobile Communications, Byte, Feb. 1993, pp. 147-154, bates No. KYO009061-67.

*DataQuill Ltd.* v. *Kyocera Wireless Corp.*, United States District Court for the Southern District of California, Certificate of translation of JP 1 314462, dated Dec. 19, 1989 producted by Kyocera Wireless, dated Apr. 20, 2005, bates No. KYO009043.

Telnet protocol specification, Network Working Group, dated May 1983, bates No. KYO009044-60.

Responsive Office Environments, Communications of the ACM, dated Jul. 1993, pp. 84-85, bates No. KYO009071-72.

Some Computer Science Issues in Ubiquitous Computing, Communications of the ACM, dated Jul. 1993, pp. 75-84, bates No. KYO009073-82.

*DataQuill Ltd.* v. *Kyocera Wireless Corp.*, United States District Court for the Southern Distric of California, Photographs produced by Kyocera Wireless Corp., bates No. KYO009234-53.

One chip to bind all cell phone functions, CNET News.com, dated May 4, 2005, bates No. KYO009236.

The Single Chip Cellphone—Not just talk anymore, www.abiresearch.com/products/insight, dated Feb. 28, 2005, bates No. KYO009237-38.

QUALCOMM announces single chip Mobile Station Modem ASIC, Business Wire, Inc., Business Wire, dated Mar. 2, 1993.

Firmware for Dataquill hand held bar code reader unit, R. Thonnes, Univ. of Edinburgh, ver. Jan. 8, 1992, KYO007016-66; ex. D-71.

U.S. Appl. No. 08/111,531, copy dated Dec. 23, 2004, bates No. KYO006748-80.

Communications get personal, Byte, dated Feb. 1993, bates No. KYO005911-16.

*DataQuill Ltd.* v. *Kyocera Wireless Corp.*, United States District Court for the Southern District of California, Report and Recommendation for Order Granting in Part and Denying In Part Kyocera's Motion To Continue Trial, To Compel Production of Documents And For Sanctions Based On New Evidence, dated Sep. 6, 2005 (15 pages).

*DataQuill Ltd.* v. *Kyocera Wireless Corp.*, United States District Court for the Southern District of California, Order Granting In Part and Denying In Part Kyocera's Motion To Continue Trial, dated Sep. 6, 2005 (4 pages).

*DataQuill Ltd.* v. *Kyocera Wireless Corp.*, United States District Court for the Southern Distric of California, deposition transcript of Francis Callagham, dated Mar. 23, 2005 (130 pages).

*DataQuill Ltd.* v. *Kyocera Wireless Corp.*, United States District Court for the Southern District of California, Defendant Kyocera Wireless Corp's Memorandum of Fact and Law Re: Patent No. 6,058,304 [Local Rule 16.1 (f)(2) & (3)], dated Aug. 14, 2005 (34 pages).

*DataQuill Ltd.* v. *Kyocera Wireless Corp.*, United States District Court for the Southern District of California, deposition transcript of Paul Doran, dated Mar. 24, 2005 (160 pages).

*DataQuill Ltd.* v. *Kyocera Wireless Corp.*, United States Distric Court for the Southern District of California, deposition transcript of Gary Robb, dated Apr. 15, 2005 (204 pages).

*DataQuill Ltd.* v. *Kyocera Wireless Corp.*, United States District Court for the Southern District of California, deposition transcript of Jan Orkisz, dated Mar. 30, 2005 (124 pages).

English translation of Decision of Rejection (titled "Copy of Decision of Rejection") directed against Japanese patent application No. 511431/95, Feb. 5, 2004 (2 pages).

Court's Order On Motions In Limine and Motion to Bifurcate Trial [115, 118-124, and 128], *DataQuill Ltd.* v. *Kyocera Wireless*, dated Nov. 7, 2005.

Defendant's Trial Exhibits, *DataQuill Ltd.* v. *Kyocera Wireless*, dated Nov. 3, 2005.

Plaintiff's Notice of Reduced Number of Asserted Claims for Trial Pursuant to Court's Request, *DataQuill Ltd.* v. *Kyocera Wireless*, dated Nov. 3, 2005.

Court's Order Granting In Part Defendant's Motion for Partial Reconsideration of the Markman Ruling Construing the Claim Term "Reading Sensor" In United States Patent Number 6, 058,304, *DataQuill Ltd.* v. *Kyocera Wireless*, dated Oct. 25, 2005.
Court's (Second) Superseding Claim Construction Order, *DataQuill Ltd.* v. *Kyocera Wireless*, dated Oct. 25, 2005.
Defendent Kyocera's Points and Authorities In Support Of Motion to Augment Record on Kyocera's Motion In Limine No. 1 of 7, *DataQuill Ltd.* v. *Kyocera Wireless*, dated Oct. 5, 2005.
Defendant Kyocera's 35 U.S.C. Section 282 Disclosure, *DataQuill Ltd.* v. *Kyocera Wireless*, dated Sep. 30, 2005.
Plaintiff's Response to Defendant's Seven Motions In Limine, *DataQuill Ltd.* v. *Kyocera Wireless*, dated Aug. 15, 2005.
Plaintiff's Notice of Lodgment of Exhibits in Response to Kyocera's Seven Motions in Limine, *DataQuill Ltd.* v. *Kyocera Wireless* [certain additional exhibits not under seal], dated Aug. 15, 2005 [Exhs. Nos. 7, 8, 9, 10].
Defendant Kyocera's Motion in Limine No. 1 of 7, *DataQuill Ltd.* v. *Kyocera Wireless*, dated Aug. 1, 2005.
Defendant Kyocera's Notice of Lodgment Of Exhibits In Support Of Kyocera's Motions In Limine Nos. 1 Through 7, *DataQuill Ltd.* v. *Kyocera Wireless* [certain additional exhibits not under seal], dated Aug. 1, 2005 [Exhs. Nos. 5, 6, 7, 8].
Handwritten notes, dated Apr. 26, 1993 [RT0000003; DX 1952].
Letter from G. Robb to R. Thonnes to Don Anderson (ATC Systems), dated Jan. 29, 1996 [RT000006 - RT000006; DX 1954].
Fax message from R. Thonnes to Don Anderson (ATC Systems), dated Jan. 29, 1996 [RT000006 - RT000006; DX 1954].
Letter from P.W. Michel to R. Thonnes, dated 26th Jan. 1996 [RT000008; DX 1955].
Handwritten notes and drawings, dated Feb. 1, 1995 [RT000010; DX 1956].
Portions of draft article with handwriiten notes, dated Feb. 29, 1995 [RT000023 - RT000026; DX 1958].
Letter from G. Robb to R. Thonnes with attached article by John Vellam, dated Mar. 3, 1995 [RT000027 - RT000032; DX 1959].
Fax from G. Robb to R. Thonnes with handwritten notes, dated Jul. 26, 1995 [RT000033 - RT000034; DX 1960].
Fax from Doran to Thonnes with attached fax from Simon Taylor to Doran (Jul. 12, 1995) re modern data throughput, dated Jul. 17, 1995 [RT000035 - RT000038; DX 1961].
Abstract re the Address Decoding Scheme used in the DataQuill Barcode Reader Pen, R. Thonnes, Nov. 1995 [RT000039 - RT000040; DX 1962].
Schematic of DataQuill CPU board, RWT, dated Feb. 1, 1995 [RT000041 - RT000043; DX 1963].
Delivery / shipping form for Pen Motherboard, ATCS, dated Jan. 9, 1995 [RT000044; DX 1964].
Fax message from R. Thonnes to Don Anderson ATCS, dated Sep. 6, 1995 [RT000045; DX 1965].
Fax message from G. Robb to R. Thonnes re questions from marketing department, DataQuill Ltd., dated Jul. 11, 1995 [RT000046; DX 1966].
Fax message from R. Thonnes to Jim Campbell, dated Aug. 29, 1995 [RT000047; DX 1967].
Memorandum, dated Aug. 1995 [RT000049; DX 1968].
List of Setups for Rockwell RC2324ACE Modem, dated Aug. 29, 1995 [RT000050; DX 1969].
Fax message from G. Robb to R. Thonnes sending modern settings on DQ, dated Aug. 3, 1995 [RT000051 - RT000052; DX 1970].
Letter from R. Thonnes to Reg Brailey, dated May 25 1995 [RT000057 - RT000058; DX 1971].
Fax from R. Thonnes to P. Doran, DataQuill Ltd., dated Apr. 25, 1995 [RT000059; DX 1972].
Fax from P. Doran to R. Thonnes to Doran, dated Jan. 27, 1995 [RT00060 - RT000065; DX 1973].
Specification of DataQuill Computer Communications Protocol, DataQuill Ltd., R. Thonnes, dated 2nd Apr. 1992 as revised in 1st Feb. 1995 [RT000066 - RT000069; DX 1974].
Note from F. Callaghan to R. Thonnes with attached letter from Instaspect, DataQuill Ltd., dated Apr. 27, 1995 [RT000070 - RT000071; DX 1975].

Iceland (foods) sample bar codes, Instaspect Ltd., dated May 3, 1995 [RT000072 - RT000074; DX 1976].
Parts list for DataQuill CPU Board, DataQuill Ltd., dated Jan. 13, 1995 [RT000075 - RT000076; DX 1977].
Letter from R. Thonnes to P. Doran, dated Mar. 9, 1995 [RT00077 - RT000078; DX 1978].
Fax message from R Brailey to D. Anderson, ATCS, R. Thonnes re circuit diagram & short on C9, dated Feb. 27, 1995 [RT000079 - RT000082; DX 1979].
Fax message from P. Doran to R. Thonnes re problems, dated Feb. 15, 1995 [RT000083 - RT000084; DX 1980].
Letter from G. Robb to R. Thonnes, dated Feb. 16, 1995 [RT000085; DX 1981].
Letter from Kim Robb to R. Thonnes, undated [RT000086; DX 1982].
Artwork / Media dispatch note, Photo Circuits art work, dated Jan. 20, 1995 [RT000087; DX 1983].
Fax message from R. Brailey to R. Thonnes re.REM G. Robb Wand PCB Rev. B 1995 MODS, dated Jan. 23, 1995 [RT000088 -RT000096; DX 1984].
Brief Specification of the DataQuill, DataQuill Ltd., Jan. 23, 1995 [RT000097; DX 1985].
Message to Jim from PCD Ltd., dated May 29, 1991 [RT000098 - RT000103; DX 1986].
Modern XTALS and Associated Capacitors, dated Jul. 8, 1991 [RT0000104; DX 1987].
Parts list for modern version three, dated Sep. 17, 1992 [RT000112 -RT000114; DX 1988].
Document : "DataQuill v. Kyocera, Oversized Document, Feb. 12, 1991 Handheld Unit V2B Barcode Reader sheet 1 of 2 schematic drawing" [RT000115; DX 1989].
Document: "DataQuill v. Kyocera, Oversized Document: Barcode Reader Modem Card V3 sheet 1 of 3 schematic drawing" [RT000116; DX 1990], no date listed.
Document: "DataQuill v. Kyocera, Oversized Document: Barcode Reader Modem Card V3 sheet 2 of 3 schematic drawing" [RT000117; DX 1991], no date listed.
Document: "DataQuill v. Kyocera, Oversized Document: Barcode Reader Modem Card Line Interface sheet 3 of 3 schematic drawing" [RT000118; DX 1992], no date listed.
Document: "DataQuill v. Kyocera, Oversized Document: Schematic Drawing" [RT000119; DX 1993], no date listed.
The Potential Market for the DataQuill, prepared by CIT Research for Highlands and Islands Enterprise, dated Feb. 14, 1994 [DQ01026; DX 1694].
DataQuill's Response to kyocera's First Set of Interrogatories, *DataQuill Ltd.v. Kyocera Wireless*, [certain non-confidential portions], dated Feb. 9, 2005 [DX 2016, pp. 1-3; 12-21].
DataQuill's Response to Kyocera's Second Set of Interrogatories, *DataQuill Ltd.* v. *Kyocera Wireless*, dated Feb. 24, 2005 [DX 2017].
DataQuill's Response to Kyocera's First Set of Requests For Admission, *DataQuill Ltd.v. Kyocera Wireless*, dated Frb. 1, 2005 [DX 2015].
Francis J. Callaghan Deposition transcript, *DataQuill Ltd.v. Kyocera Wireless*, pp. 1-99, dated Oct. 28, 2005.
Paul Doran Deposition transcript, *DataQuill Ltd.v. Kyocera Wireless*, pp. 1-21, dated Nov. 2, 2005.
Diary notes, G. Robb, dated Aug. 1992, [Def's Ex. 116 (Doran); GR0036].
Paul Doran deposition transcript dated Mar. 2005 with handwritten notations, *DataQuill Ltd.v. Kyocera Wireless*, pp. 1-160, dated Nov. 2, 2005 [Def's Ex. 117 (Doran)].
Diary notes, G. Robb, dated Jan. 20, 1994 [Def's Ex. 250 (Callaghan); GR0105-106].
Plaintiff's Ex Parte Notice of Potential Amendment to Summary Judgement Record, *DataQuill Ltd.v. Kyocera Wireless*, dated Jul. 21, 2005 [Def's Ex. 252 (Callaghan)].
Docket Sheet, *DataQuill Ltd.v. Kyocera Wireless*, dated Nov. 16, 2005.
Transcript of Status Hearing, DataQuill Ltd. v. Kyocera Wireless, cover pgs. and pp. 1-10, dated Nov. 8, 2005.

Order Setting Special Briefing Schedule And Setting Settlement Conference And Setting Trial Date, DataQuill Ltd. v. Kyocera Wireless, dated Nov. 28, 2005.

Gary D. Robb Deposition transcript, DataQuill Ltd. v. Kyocera Wireless, cover pgs., pp. 1-146, index pp. 1-16 (also referring to C51, C87, C191, C184, C88), dated Oct. 26, 2005.

Diary notes, G. Robb, dated variously from May 1992 to Sep. 1995 [Def's Ex. 109 (Robb); GR006-GR0115].

Letter from Gary D. Robb to Franklin Woolfson re correspondence, DataQuill Ltd., dated Sep. 8, 1993 [DX 1653; DQ00330].

Magic Cap, *Magic Cap Means Communication*, General Magic Inc., © 1994, pp. 1-56, plus cover and two end pages.

*Motorola's Envoy Personal Wireless Communicator lets you organize your life from almost anywhere . . . with no strings attached.*, Motorola, Inc. © 1994, two pages.

*The Marco Wireless Communicator keeps you in touch, even when you're out of reach*, Motorola, Inc., © 1994, two pages.

*Simon Mobile Communications Made Simple*, BellSouth, (c) 1993, 11 pages.

Internal Memorandum Re Summary of Response to Siemens re recent references from Siemens re U.S. pat. 6,058,30, dated Apr. 27, 2006 3 pages, DataQuill outside litigation counsel, and attached claim charts of Siemens Corp., Exhibits A, B and C, 15 pages, dated Apr. 25, 2006.

The GSM System for Mobile Communications A comprehensive overview of the European Digital Cellular Systems, Cell & Sys. Correspondence, © 1992, 3 cover pages, pp. 56-59, 550-565.

Internal Memorandum Re Summary of Response re recent references from Motorola re U.S. pat. 6, 058,304, Dataquill outside litigation counsel, dated May 23, 2006, 9 pages, and attached claim charts, Exhibits A and B, dated May 4, 2006, 8 pages, attached Dataquill Meeting Ahenda and claim chart, Exhibit C, dated May 9, 2006, 16 pages.

HAND HELD TELECOMMUNICATIONS AND DATA ENTRY DEVICE

CROSS-REFERENCE TO RELATED APPLICATIONS

This application is a continuation of U.S. patent application Ser. No. 09/548,565, filed Apr. 13, 2000 now abandoned, which is a continuation of U.S. patent application Ser. No. 08/619,682, filed May 23, 1996 (now U.S. Pat. No. 6,058,304), which was the National Stage of International Application No. PCT/GB94/02101, filed Sep. 27, 1994, each of which is hereby incorporated by reference.

FIELD OF THE INVENTION

This invention relates to data entry systems, to applications of such data entry systems and to equipment for use therewith.

BACKGROUND

UK patent GB-B-2,202,664 describes an example of an application for a data entry system for the automated ordering of merchandisable items. Merchandisable items are represented in a printed catalogue or other form of list and are associated with bar codes. A merchandise ordering unit comprises a bar code reader with a telephone transmission capability for use in selecting one or more items from the catalogue and transmitting electronically an order for the merchandise to a processing centre over the public telephone network. The orders for the merchandisable items received in this way are processed in the processing centre. As described, the hand held data entry terminal comprises a calculator-like processing unit with a pen-like bar code reader wand electrically connected to the processing unit via a flexible cable. The processing unit includes a display for displaying information and a telephone transmission capability for transmitting captured data via the telephone network. Although this system works well, it is rather bulky and can be somewhat inconvenient in use as it requires two handed operation, one hand for the processing unit and one hand for the wand. Alternatively, if the processing unit is not carried all the time, it needs to be located in a position where the display on the processing unit can be seen and the keys on the processing unit can be operated. It will be appreciated that particularly where the processing unit is being carried in the hand, operation of the keys on it while holding the wand requires considerable dexterity.

European patent application EP-A-0,094,571 describes a self-contained portable data entry terminal positioned within a portable wand-type enclosure. The wand contains a bar code optical reader, signal conditioning electronics, a microprocessor, a memory and a rechargeable battery. The optical reader is operable as a transmitter/receiver so that readout of data stored in the memory is possible. An example of the use of the portable data terminal is described in which captured bar code data can be output from the memory via the optical reader to an optical receiver and from there via an audio coupler to a telephone line for transmission to a remote station. Another example is described where the bar code data relates to items on a menu in a restaurant. Captured menu selections can be output from the memory via the optical reader to an optical receiver and from there via a computer to a printer in a kitchen. Also described is the programming of the portable data entry terminal using an optical transmitter to input data via the optical reader. The wand includes a beeper for indicating the correct reading of a bar code and the current memory loading. The wand described in EP-A-0,094,571 is relatively simple in construction, and although it is readily portable, it does not provide any confirmation of what has been read.

A further portable data entry terminal manufactured by Telxon Corporation is described in an article entitled "Telxon Corporation, Portable Data Collection and Entry Systems" published by McGraw-Hill in 1989 and referenced "R51-832-101 SKU/UPC Marking and Reading Equipment". The article describes various models of data entry terminals similar to that described in UK patent GB-8-2,202,664. Data from the terminals can be transmitted to a remote station via various telecommunication options including direct connect modems and acoustic couplers. The data entry terminals have a generally rectangular format, similar to a large scientific calculator with a rectangular display and an array of keys. For most models, a separate bar code reader wand is provided which is connected to the data entry terminal via a flexible cable, requiring a two-handed operation as described above. One model PTC-620 has the same basic format as the other terminals, but is described as being for simple applications and features a snap-on reversible head for one-handed operation with either the left or the right hand. However, this terminal is still relatively bulky and cumbersome and in use it is easy inadvertently to operate one or more keys in the array of keys.

SUMMARY

An object of the present invention is to provide a data entry system which mitigates the problems of the prior art.

In accordance with an aspect of the invention, there is provided a data entry system comprising a hand held data entry unit, the hand held unit comprising a reading sensor for sensing commands and/or data and for producing input signals in response to the sensed commands and/or data, rewritable storage for information relating to selectable items, a controller connected to receive and process the input signals from the sensor for responding to the commands to control the hand held unit and/or to the data to select the item and a display screen for displaying a user readable representation of the commands and/or stored information for the selected item, and a telecommunications interface for telephonic transmission of information relating to a selected item or items from the storage to a remote processing centre and for telephonic transmission of information relating to selectable items from the remote processing centre to the storage.

The provision of a hand held unit having an integral sensor, control, storage, display means with a telecommunications interface enables the unit to be used in a particularly efficient and self-contained manner for the capture, processing, storage, display and transmission of data. The inclusion of the display in the hand held unit enables the user to verify the data being captured without taking his or her eyes off the areas in which data capture is taking place.

Preferably, the telecommunications interface is integral to the hand held unit. The provision of a telecommunications interface in the hand held unit enables captured data to be used for direct telephonic transmission of the captured data via a telephone network to a remote processing centre. It also allows for data and/or commands to be received from the remote data processing centre.

Preferably, the hand held unit includes a rechargeable power source. There can be provided a base unit separate from the hand held unit, wherein the base unit includes a charger unit and the base unit and the hand held unit are provided with respective interconnectable electrical connectors for recharging the rechargeable power source.

In some embodiments of the invention, the data entry system can comprise a base unit separate from the hand held unit, wherein the base unit and the hand held unit are provided with a wireless data link which is operable for bidirectional data transfer between the hand held unit and the base unit, and wherein the base unit includes a telecommunications interface for telephonic transmission of information relating to a selected item or items from the storage to a remote processing centre and for telephonic transmission of information relating to selectable items from the remote processing centre to the storage. In this embodiment, the wireless data link preferably comprises, in the base unit and the hand held unit, optical transmitters and/or receivers which cooperate when the hand held unit is in the rest position to provide a two way optical data link for transferring data from the hand held unit to the base unit and/or from the base unit to the hand held unit. In other embodiments it could comprise respective radio frequency, rather than optical, transmitters and receivers, or indeed other types of transmitters and receivers.

In preferred embodiments of the invention, the telecommunications interface is an interface for connection to a wireless telephony network. This provides for a particularly advantageous implementation of the invention, which can then be used without the need to plug in the data entry system to, for example, a conventional wired telephone network.

In a preferred embodiment of the invention the telecommunications interface is a cellular telephone network interface. In this embodiment of the invention, particularly where the telecommunications interface is incorporated in the hand held unit, the data entry system can be used with the convenience, for example, of a portable cellular phone. Cellular telephone networks are now common place and give a very wide area of coverage. This facilitates the use of a data entry system in accordance with the invention in, for example, a user's home or workplace.

Alternatively, the telecommunications interface can be a satellite telephone network interface, or some other form of wireless telephone interface, for example a telephone interface for a telephone network based on highly localised transponder stations.

Where the telecommunications interface is intended to interface with an analogue telephone network, the telecommunications interface includes a modem.

By arranging that the reading sensor can be used for the input of commands for controlling the hand held unit, the number of user input means (e.g., keys) can be kept to a minimum, reducing the possibility of inadvertent operation. Preferably, there are provided one or two manually operable switches for scrolling the display in a first and/or second direction for selectively displaying a plurality of data stored in the storage. The scrolling of the display enables a large number of items to be accessed with a relatively compact display. In a preferred embodiment of the invention, the first and/or second switches are the only switches on the hand held unit. Preferably also, operation of the first and/or second switches in predetermined operational states of the hand held unit causes predetermined functions other than scrolling functions to be performed (e.g., powering-up or powering-down of the hand held unit). By the provision of only two keys on the hand held unit, the possibility of accidentally operating an incorrect key can be reduced, and also the hand held unit can be kept particularly compact.

Preferably, the hand held unit comprises a sensor for reading coded data, the controller being arranged to access the stored information for selectable items to determine natural language characters or images corresponding to the coded data for display. The invention finds particular, but not exclusive application to the reading of bar codes and/or binary dot codes, whereby the sensor is a bar code and/or dot code reader. It will be appreciated that the invention also applies to other forms of codes.

The hand held data entry unit may comprise a reading head including a reading sensor for producing input signals, wherein the reading sensor traces movements of the reading head and wherein the controller is responsive to signals from the sensor representative of the movements for identifying characters traced by the reading head as captured data. In this manner data entry can be made in an advantageous manner by tracing out the characters of the data to be input or characters representing commands for controlling the operation of the data entry system.

Preferably, the controller is user programmable to cause the captured data to be displayed on the display either in a first orientation suitable for reading displayed data when the hand held unit is held in a user's right hand, or in a second orientation suitable for reading displayed data when the hand held unit is held in a user's left hand. In a preferred embodiment the display has a substantially rectangular display screen with a longitudinal axis arranged substantially parallel to a longitudinal axis of the hand held unit. For example, for right handed operation, a string of characters could, for example, be displayed along the display from an end nearest to the sensor to the end furthest therefrom, whereas for left handed operation, the same string of characters would be displayed from the end of the display furthest from the sensor to the end nearest thereto.

A data entry system comprising a hand held unit with or without a base unit as described above, can also include means for displaying a plurality of selectable items with associated data sources for user selection of an item by operation of the hand held unit and a remote processing centre for processing user selections transmitted from the hand held unit. The controller in the hand held unit is preferably arranged to respond to appropriate commands input, for example via the reading sensor, to issue coded instructions via the telecommunications interface to the data processing centre and to receive programming data (e.g., relating to information for selectable items) from the programming centre for storage in the hand held unit.

The data entry system may additionally be arranged to provide the functions of a telephone to permit audio communication. In particular, if a cellular telephone interface is provided in a hand held unit, this unit can advantageously combine the functions of the data entry unit and a cellular telephone.

Accordingly, the invention also provides a data entry system additionally comprising means for displaying a plurality of selectable items with associated data sources for user selection of an item by operation of the hand held unit and a remote processing centre for processing user selections transmitted from the hand held unit. Preferably, the hand held unit is programmable remotely from the processing centre.

In a preferred embodiment of the invention, the hand held unit is configured as an elongate unit such that it may be held by a user in the manner of a pen or quill with the reading sensor being located in a reading head at or adjacent to one end of the hand held unit. The configuration of the hand held unit such that it may be held in the manner of a pen or quill means that the unit can be held in a familiar and comfortable manner. Also, it facilitates the provision of user input means (e.g. switches) on the hand held unit to be located such that inadvertent operation thereof can easily be avoided.

Preferably the reading sensor is located in a reading head which is releasably attached to the hand held unit. This enables alternative types of reading head to be connected to the hand held unit and/or for faulty reading heads to be replaced easily.

The invention also provides a merchandising system comprising a data entry system of this type wherein the selectable items are merchandisable items and the remote processing centre initiates processing of user orders of the selectable merchandisable items.

Thus, a data entry system in accordance with the invention, especially a data entry system comprising a hand held unit including a telecommunications interface for use with a wireless telephony system, such as a cellular network telephone system, provides a particularly advantageous device for use, for example, for "home shopping". It enables the user to make shopping selections from a catalogue or from a series of options displayed on a television screen from the comfort of his or her home without the need to connect the device to a conventional telephone network. A hand held unit including a wireless telephone network interface such as a cellular network interface finds particular application where the user of the system is travelling from place to place and may need to perform data entry functions when they are far from a conventional wired telephone network socket.

A data entry system or a merchandising system as described above preferably includes a verification device in the form of a verification card (e.g., a credit, payment or other validation card) or like carrier carrying a verification bar code and/or dot code for verification of a user identity. Operation of the data entry system subsequent to an initial data capture operation can then be made dependent on the identification of authorised coded data.

The invention also provides a carrier for a plurality of data and/or command codes (e.g., bar and/or dot codes) for association with means for displaying a plurality of selectable items in a data entry system or a merchandising system as defined above, wherein the carrier carries a plurality of codes, each for a respective one of a plurality of natural language and/or numeric characters, and a plurality of commands for controlling the operation of the data entry or merchandising system, each code being associated with a visual representation of the corresponding natural language or numeric character or command and/or of a graphical representation thereof. This avoids the need for a complete coded data source to be associated with each selectable item in, for example, a catalogue, rather a composite code can be built up by capturing a desired sequence of individual codes. By including the command characters as well, the need for a lot of keys on the data entry device can be avoided.

As an alternative to the use of bar codes, other data representations could be used. Indeed, if the data entry device is provided with a reading sensor in the form of a camera or other scanning sensor rather than a bar code reader, and the data entry device is provided with character or image recognition logic, graphical or alphanumeric data representations can be captured directly. One application of an embodiment of the pen with a camera head as its sensor could be for fingerprint recognition.

As an example of a possible mode of operation, a command character (e.g., a bar code) can be read using the reading head (e.g., a bar code reading head) and this can be used to load down remote data from a remote station. This is particularly advantageous mode of operation where the data entry system can set up a telephone connection to the remote station automatically, for example where the data entry device has cellular telephone capabilities.

The carrier is preferably in the form of a sheet of material. The various characters and commands could be arranged in the manner of a standard typewriter keyboard layout to facilitate entry of individual codes to make up a desired code sequence (e.g., for a specific product code).

BRIEF DESCRIPTION OF THE DRAWINGS

Exemplary embodiments of the invention will be described hereinafter, by way of example only, with reference to the accompanying drawings in which like reference numerals are used for like features and in which.

DETAILED DESCRIPTION OF EXEMPLARY EMBODIMENTS

Figure 1A:
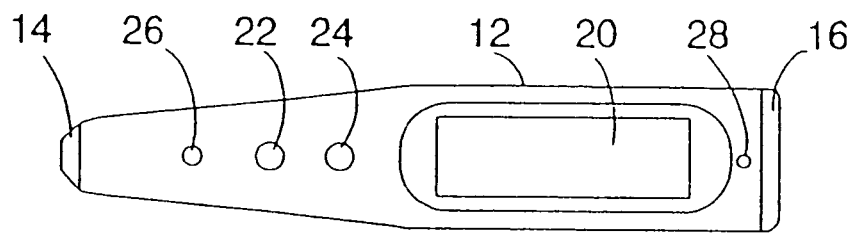
FIGS. 1A and 1B are schematic views of a substantially pen-shaped hand held data entry device.
Figure 1B:
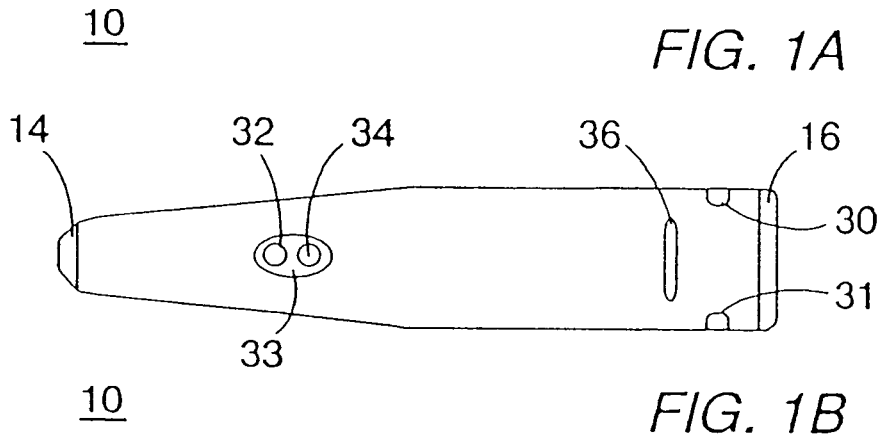

FIGS. 1A and 1B are schematic views from above and below, respectively, of one embodiment of hand held data entry unit 10 which is substantially pen-shaped and which will hereinafter, for reasons of conciseness only, be referred to as the "pen 10". The pen 10 is intended to be held for essentially one handed operation between the thumb and forefinger of either the left or right hand in the manner of a conventional, if rather thicker than usual, pen.

The pen 10 has an elongate body 12 with, in the present example, external dimensions of approximately 120 mm by 40 mm, although the dimensions may be larger or smaller as desired subject to technical limitations. A reading head 14, for example a red or infra-red optical reading head (e.g., a laser diode) suitable for reading bar codes is located at one end of the pen. Other types of reading head may be provided. The reading head is preferably-replaceable for interchanging types of reading head. A removable battery cover 16 covering a battery compartment is located at the other end of the pen. As an alternative to a compartment for removable batteries, a removable and/or fixed rechargeable battery pack could be provided instead. Also, the reading head in the present embodiment is arranged to read with a reading angle of between 0° to 45° to the normal to the bar code to be read.

On the upper surface of the pen shown in FIG. 1A a display screen 20, first and second microswitches 22 and 24, a first indicator light 26 and a second indicator light 28 are located. The display screen 20 preferably comprises a conventional two-dimensional array of pixels which can be selectively activated in order to provide the display of a wide range of displayable items. However, in a low cost version of the pen 10, the display may be configured only to display a predetermined range of characters and symbols, this reducing the complexity of the display and the controlling logic and thus reducing the cost as will be well understood by one skilled in the art.

Any suitable display technology can be used which enables the displayed information to be read over a wide enough angular range such that it can be read by the user when the pen is held at an angle suitable for reading a bar code. In this way it is not necessary to change the orientation of the pen in order to read the display. In view of the low power consumption and advantageous readability characteristics, a 2 line by 16 character supertwist LCD display screen is employed in the preferred embodiment giving a viewing area of approximately 60 mm by 16 mm with a character size of approximately 3 mm by 5.5 mm. The display is preferably located towards the end of the pen 10 opposite to the reading head 14 with its longitudinal axis substantially parallel to the longitudinal axis of the pen 10.

With the pen 10 held between thumb and forefinger with the user's hand below the pen as viewed in FIG. 1A, and with the pen held at an angle of, say, 30" to the normal of a bar code to be read, (assuming that the normal to the bar code is generally in the direction of the line of sight of the user), the display screen can be read without difficulty.

The switches 22 and 24 are used to control basic operations of the data entry system and for control of the sequential display of stored information (scrolling of the display) as will be explained later. The indicator light 26 is used to report successful scanning of a bar code. The indicator light 28 is used when rechargeable batteries (70, FIG. 3) are inserted in the battery compartment to indicate that the batteries are charging.

On the lower surface of the pen 10 shown in FIG. 1B, an optical transmitter 32 and an optical receiver 34 are provided in a shallow recess 33. Also, provided on the lower surface are a locating groove 36 and first and second electrical contacts 30 and 31. The optical transmitter 32 and the optical receiver 34 are used in combination with an optical receiver 62 and optical transmitter 64, respectively, on a base unit 40 to be described with reference to FIG. 2, for the transfer of data between the pen 10 and the base unit 40. The locating groove 36 is used correctly to position the pen 10 with respect to a corresponding ridge in a cradle 56 on the base unit 40 when the pen 10 is placed in that cradle 56. The cradle 56 defines a rest position for the pen 10 on the base unit 40. The first and second contacts 30 and 31 are arranged to cooperate with corresponding contacts 60 and 61 in the cradle 56 on the base unit 40 for charging the rechargeable batteries.

Figure 2:
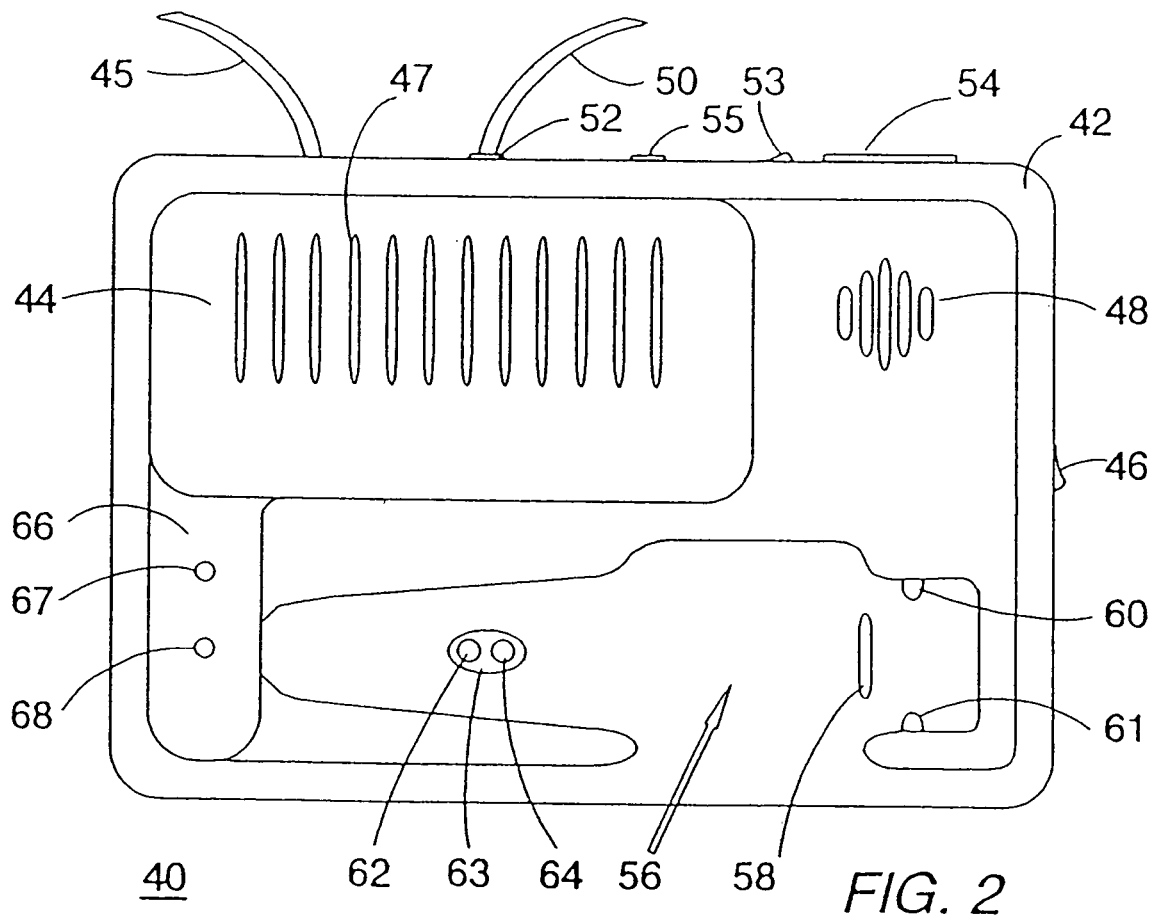
FIG. 2 is a schematic plan view of a base unit for use with the hand held unit of FIGS. 1A and 1B.

Turning now to FIG. 2, this illustrates a plan view of a base unit 40 for use with the pen 10 of FIGS. 1A and 1B.

The base unit includes a generally rectangular housing 42 with a raised portion 44 containing a power supply unit (102, FIG. 4) which receives electrical power via a mains supply cable 45 and a mains switch 46. The mains switch 46 is located on the right hand side of the base unit housing 42. Cooling slots 47 for the power supply unit (102, FIG. 4) are provided in the upper surface of the raised portion 44. Further slots 48 in the upper surface of the base unit housing 42 are located over a speaker (110, FIG. 4) for relaying information to the user of the data entry system. The rear of the housing 42 is also provided with a socket 52 for a standard telephone plug for connecting the base unit 40 to a telephone line 50 and a standard serial connector 54 (e.g., an RS232 connector) for connecting the base unit to, for example, a personal computer (not shown). A manual switch 53 can be provided for switching between the telephone line and the serial connector. It will be appreciated that a parallel connector could be provided instead of, or in addition to, the serial connector 54. A separate telephone socket 55 can be provided for the connection of a standard telephone handset to the base unit.

Towards the front of the base unit housing 42, a recess is formed which is configured as a cradle 56 for receiving the pen 10.

An optical receiver 62 and an optical transmitter 64 are located in the bottom of the recess for cooperating with the optical transmitter 32 and optical receiver 34, respectively, when the pen is located in the cradle 56. The optical receiver 62 and the optical transmitter 64 are surrounded by a wall 63 which also forms a shroud between the optical receiver 62 and the optical transmitter 64. The wall 63 cooperates with the recess 33 in the pen 10 to prevent external light reaching the optical link, and the shroud between the optical receiver 62 and the optical transmitter 64 prevents light from the two optical paths between the pen and the base unit and between the base unit and the pen from interfering with each other. It will be appreciated that alternative configurations are possible, for example the wall could be provided on the pen and the recess on the base unit, although this could mean that the pen was less comfortable to use.

First and second base contacts 60 and 61 are also located in the recess for cooperating with the contacts 30 and 31 on the pen 10 when it is inserted in the cradle 56, thus enabling rechargeable batteries (70, FIG. 3) in the pen 10 to be recharged. A locating ridge 58 is formed in the recess for cooperating with the locating groove 36 in the bottom of the pen 10 to enable to pen to be positioned correctly in the cradle 56 such that the optical transmitter/receiver pairs 32/62 and 64/34 and the contact pairs 30/60 and 31/61 are aligned correctly.

The pen 10 can also be provided with a socket for directly charging the internal rechargeable batteries using an AC mains supply or a DC supply. In the first case the pen will include a transformer, in the second a transformer/rectifier could be incorporated in, for example, a mains plug.

On a further raised portion 66, one or two base unit indicator lights are provided. The first base unit indicator light 67 is for indicating the base unit is receiving mains power and is turned on. Optionally, the second base unit indicator light 68 can used to indicate that rechargeable battery (70, FIG. 3) in the pen is being charged.

Figure 3:
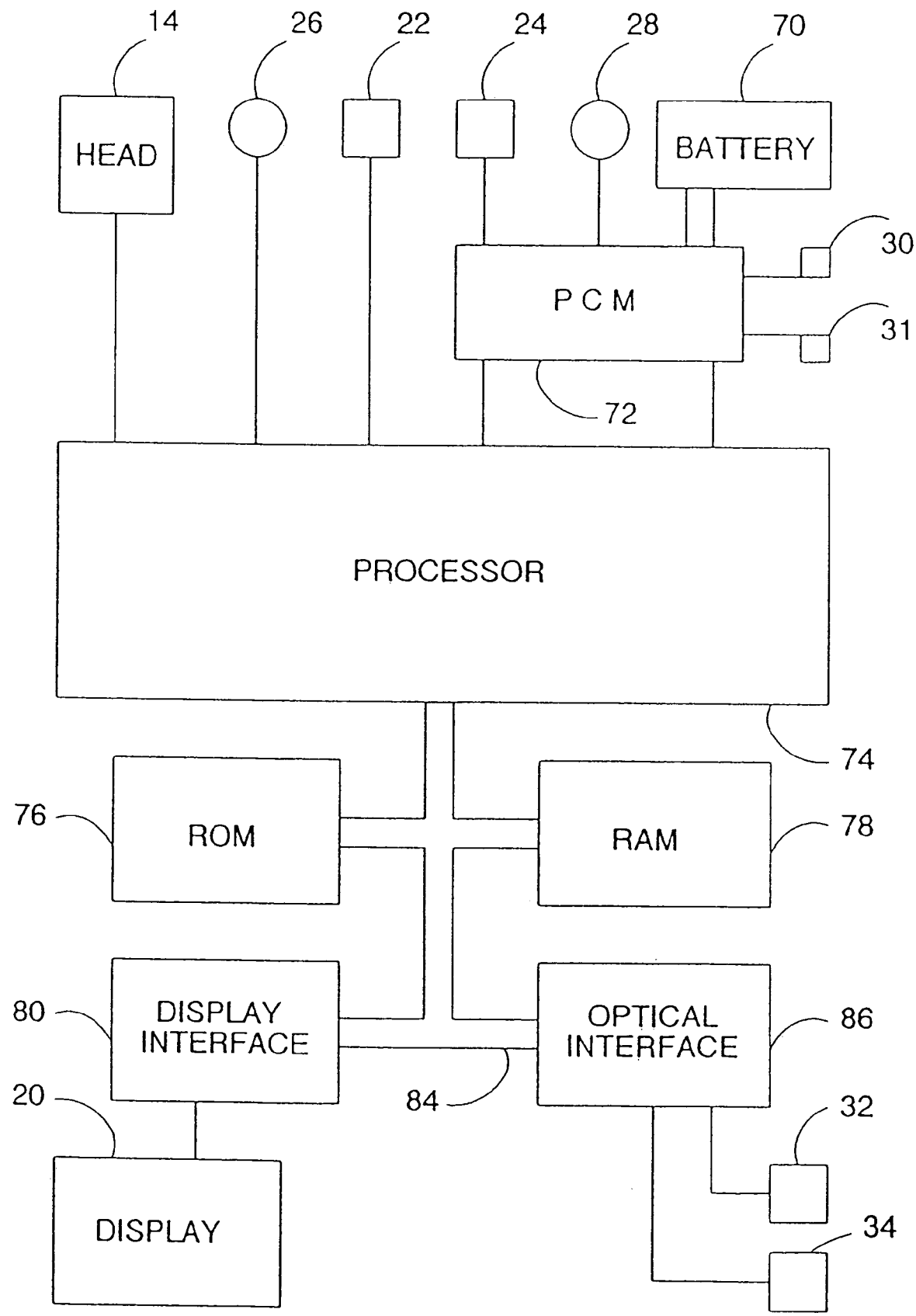
FIG. 3 is a schematic block diagram of the functional elements of a first example of a hand held data entry device as shown in FIGS. 1A and 1B.

FIG. 3 is a schematic block diagram of the functional elements of the pen 10. A processor 74 is preferably formed by a conventional programmable microprocessor (e.g., an Intel 80C31 12 MHz CMOS microprocessor with two internal clocks, an Intel 80486, etc.), although a special purpose or specially configured unit (e.g. an ASIC) could alternatively be used (compare FIG. 10). A read only memory (ROM) 76 is connected via a bus 84 to the processor 74 for the storage of control programs and data. The ROM 76 can be implemented by any appropriate technology, for example by a flash PROM. A random access memory (RAM) 78 (for example a 128K low power static RAM, or higher capacity RAM, e.g, a 256K, 512K . . . 5 Mb, etc., RAM) is connected to the processor via the bus 84. The RAM 78 is used as working storage and for the storage of data captured using the reading head 14. A display interface 80, which connects the display 20 to the bus 84, responds to display instructions from the processor to drive the display in a conventional manner. An optical interface 86 is connected to the bus to convert data to be transmitted into signals for driving the optical transmitter 32, and converts signals from the optical receiver 34 into data to be passed to the bus 84.

In the present embodiment, other connections are made directly to the processor rather than via the bus. Thus, in the present embodiment, signals relating to data captured by the reader head 14 are passed directly to the processor 74 to be processed.

The manual switch 22 is also connected directly to the processor. In use this switch serves as a "scroll-down" key. The second manual switch 24, which in use serves as a "scroll-up" key, is, however, connected to the processor via a power control module (PCM) 72. This is because the switch 24 also serves as a "power-up" key for turning the pen on or powering it up after it has been powered down. The power control module 72 responds to operation of the key 24 in a powered down state to connect the battery 70 to the processor 74. The power control module 72 also controls the charging of the battery 70 when the contacts 30 and 31 are connected to the corresponding contacts 60 and 61 in the cradle 56 of the base unit 40. The indicator light 67 (e.g., an LED or NEON) is connected to the processor 74 and indicates when the base unit is connected to the mains. The optional indicator light 68 (e.g., an LED or NEON) is connected to the power control module 72 to indicate when the battery 70 is being charged.

The processor is programmed by means of control programs and data stored in the ROM 76 and, in use, in the RAM 78, to receive signals from the reading head 14, to interpret those signals and to derive data therefrom which are displayed on the display 20 and stored in the RAM 78 for subsequent transmission via the optical interface as will be described in more detail below.

Figure 4:
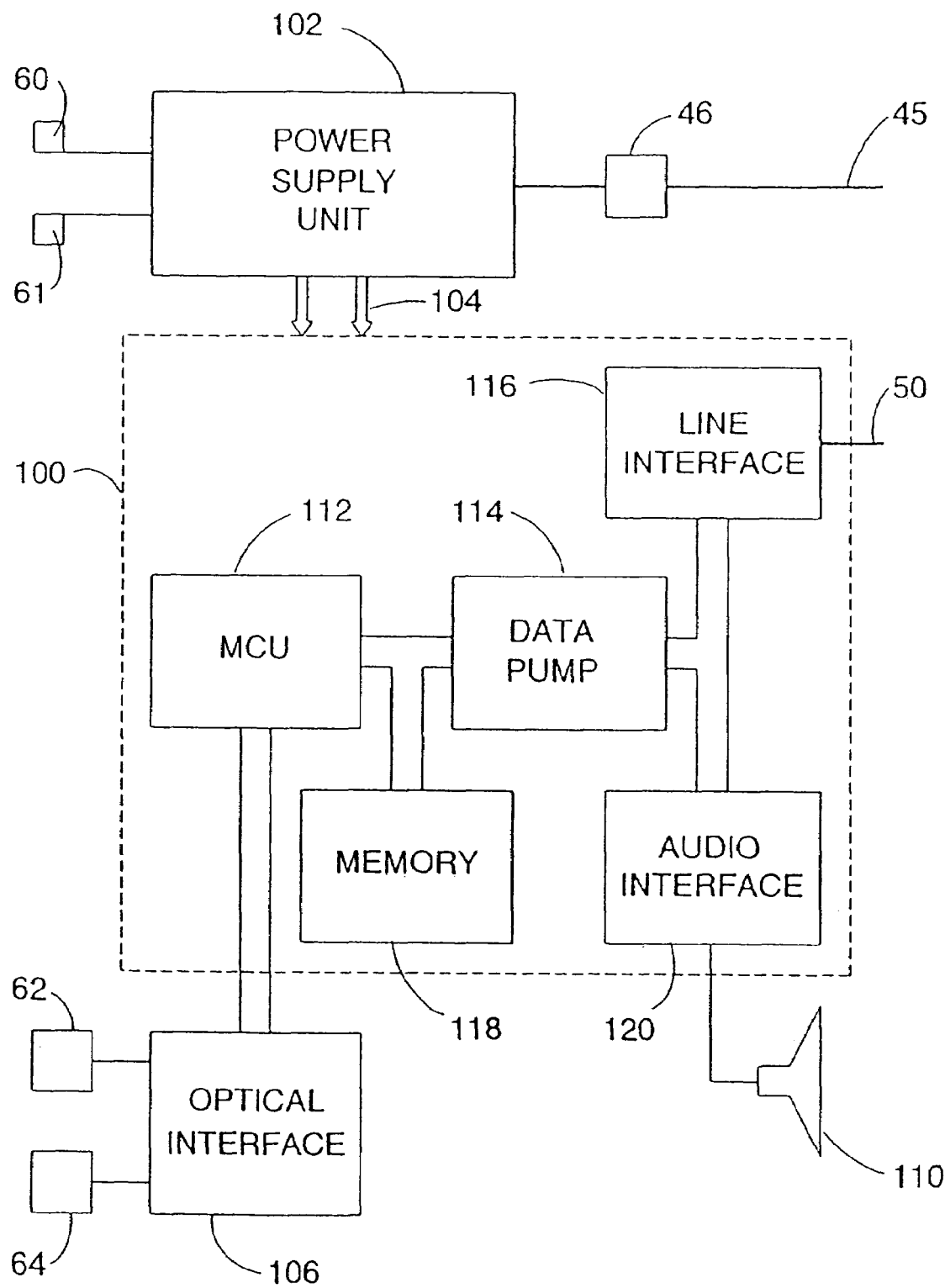
FIG. 4 is a schematic block diagram of the functional elements of a base unit as shown in FIG. 2 for use with the hand held data entry device of FIGS. 1A, 1B and 3.

FIG. 4 is a schematic block diagram of the functional elements of the base unit 40 of FIG. 2. A power supply module 102 is connected to a mains supply via the switch 46 and the supply cable 45. The power supply unit 102 is also connected to the contacts 60 and 61 so that, when the pen 10 is located in the cradle 56, the battery 70 can be recharged. The power supply unit 102 also supplies power to the other elements of the base unit via supply lines which are represented schematically (for reasons of drawing simplicity) by the arrows 104.

A modem 100 is connected via an optical link 106 to an optical receiver 62 and an optical transmitter 64. The optical interface 106 converts signals from the optical receiver 62 to data to be passed to the modem 100 and converts data from the modem 100 to signals to be transmitted by the optical transmitter 64. A further interface (e.g. a standard V24/RS232 interface—not shown) for connection to a personal computer (not shown) could also be provided. Also a socket for a connection to a standard telephone handset (not shown) could be provided. The modem 100 can be a conventional modem generally comprising a master control unit 112, a data pump 114 and memory 118. The master control unit 112 is connected to receive data from the optical interface 106 (and/or from a V24/RS232 interface, if a personal computer is connected). Data from the data pump 114 are coupled via a line interface 116 to the telephone line 50. The data pump 116 is also connected via an audio interface 120 to a speaker 110 for monitoring the transmission of data via the telephone line 50.

Figure 5:
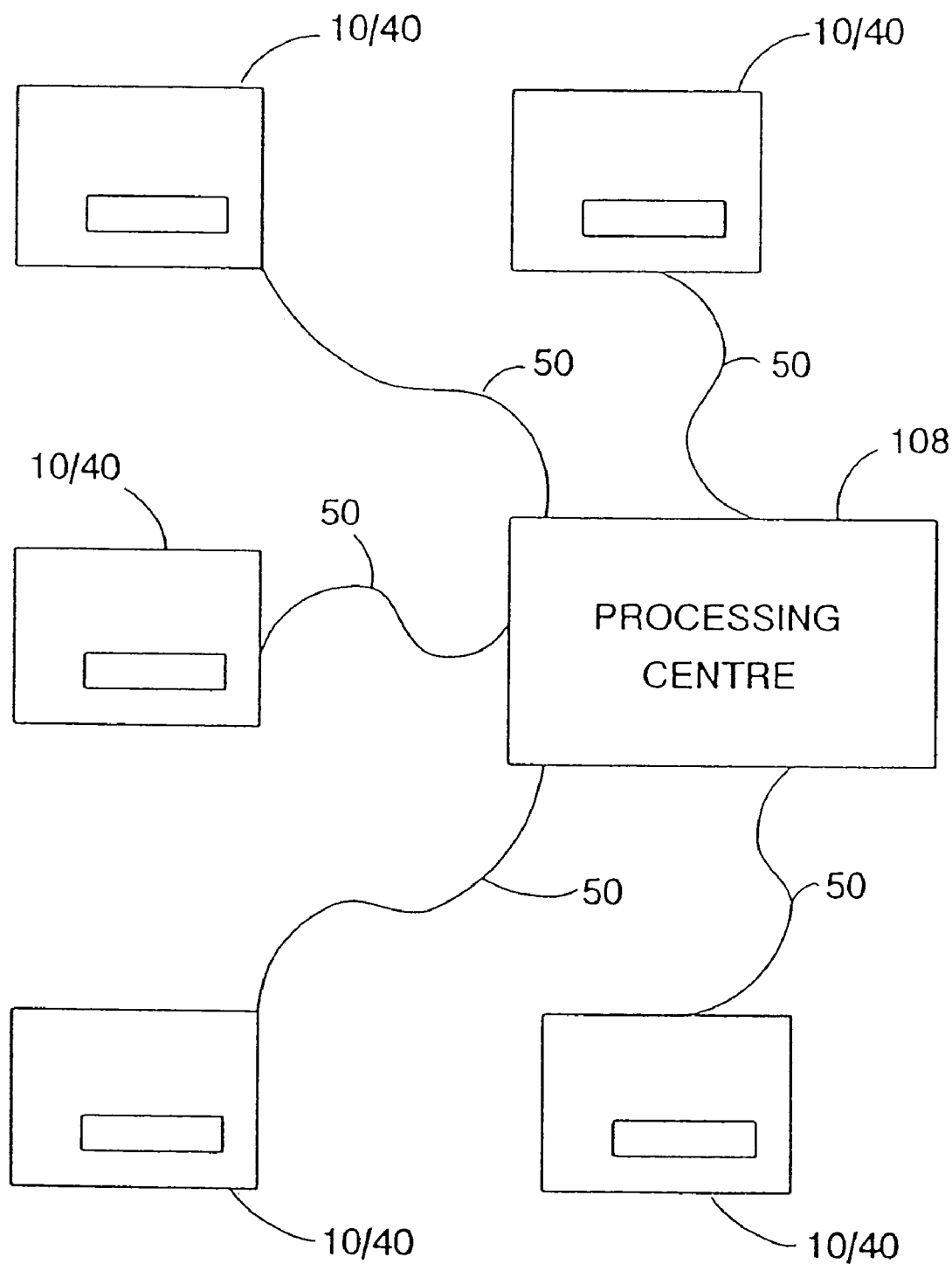
FIG. 5 is an overview of a merchandising system using a data entry terminal such as is illustrated in the preceding Figures.

FIG. 5 is a schematic representation of a data entry network comprising a plurality of pens/base units 10/40 connected via respective telephone connections 50 (telephone lines, wireless telephone channels, etc) to a processing centre 108 where data transmitted from the individual pens/base units 10/40 are processed. In the preferred embodiment of the invention, the pens/base units 10/40 are used for the placing of orders for merchandise and the processing centre 108 processes those orders and dispatches them to the users.

Figure 6:
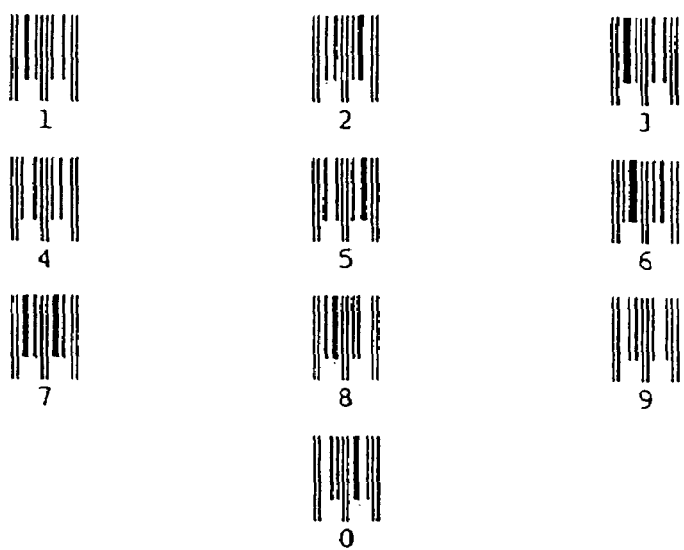
FIG. 6 represents a control card with bar codes for a number of numeric and control characters.
Figure 6:
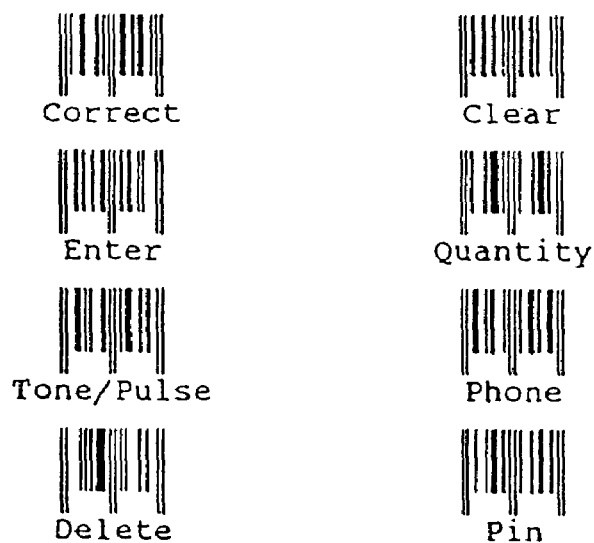

FIG. 6 is a schematic representation of an example of a control card for use with the pen 10. The card shows bar codes for the numerals 0 to 9 and for a set of commands. The command bar codes are used for controlling the operation of the pen 10. The control card can be thought of as a keyboard extension for the pen 10.

At this point it should be explained that the operation of reading a bar code is performed by the processor 74 in a conventional manner. Thus, where the head 14 comprises a red or infra-red light source and a light sensor, signals representing changing levels of reflected illuminations are supplied to the processor 74. Firmware stored in the ROM 76, or in other embodiments possibly hard-wired in the processor 74, is used then to decode the changing levels of reflected illumination to generate a numerical value. On successful reading of a bar code the good read light 26 is illuminated.

The processor tests the numerical values to determine whether the sensed code relates to data or a command. A look up table containing the numerical values for individual commands (not shown) is configured in the ROM 76 and/or RAM 78. By accessing this table, input commands can be identified. The controlling software is aware of which commands can be executed for the current processing state. On identifying a currently executable command, the processor 74 executes that command and causes the display of a human readable command description for user verification purposes. The processor causes an error message to be displayed on the display screen if a non-executable command (e.g., a command has been input at a wrong time) has been input.

If the code does not relate to a recognised command, it is treated as data. The data are then stored in RAM as the result of reading a bar code and are used to address a description of the item referenced by the bar code value from a further look-up table. If a description of the item corresponding to the bar code value is stored in the ROM 76 and/or the RAM 78 in a suitable data structure so that the bar code value can be used either directly or indirectly to address the appropriate description, then the item description can readily be displayed instead of or as well as the bar code value for user verification purposes. If the bar code is not read correctly, then an error message is displayed on the display screen.

The item description data can relate, for example, to items from a merchandising catalogue. In the this case the rewritable storage capacity of the pen (e.g. the RAM 78) is chosen to be sufficient to store all the items from one or more merchandising catalogues. If the data is stored in volatile memory, this data is downloaded from the remote processing centre via the telecommunications link on restoring power to the memory in the pen. Preferably, if volatile memory is used, power is supplied to the memory even when the pen is "switched off". An integral rechargeable back-up battery can be provided in addition to the battery 70 to maintain power to a volatile memory when the battery 70 is being changed. If non-volatile memory is provided, then this data can be retained during a period when no power is supplied to the memory. However, through the use of rewritable memory and control logic enabling the memory to be updated using data downloaded from the remote processing centre, it is possible to keep the pen's memory up to date on a full list of merchandisable items, including product description, availability, price, etc. Then on reading a bar code relating to an item stored in memory the display on the pen can indicate a description of the item corresponding to the code read, its availability and price. If the code read is not recognised, for example, the pen can be programmed automatically to call up the remote processing centre to check on whether an update of the pen's storage is needed when the pen is replaced in the base unit.

Figure 7:
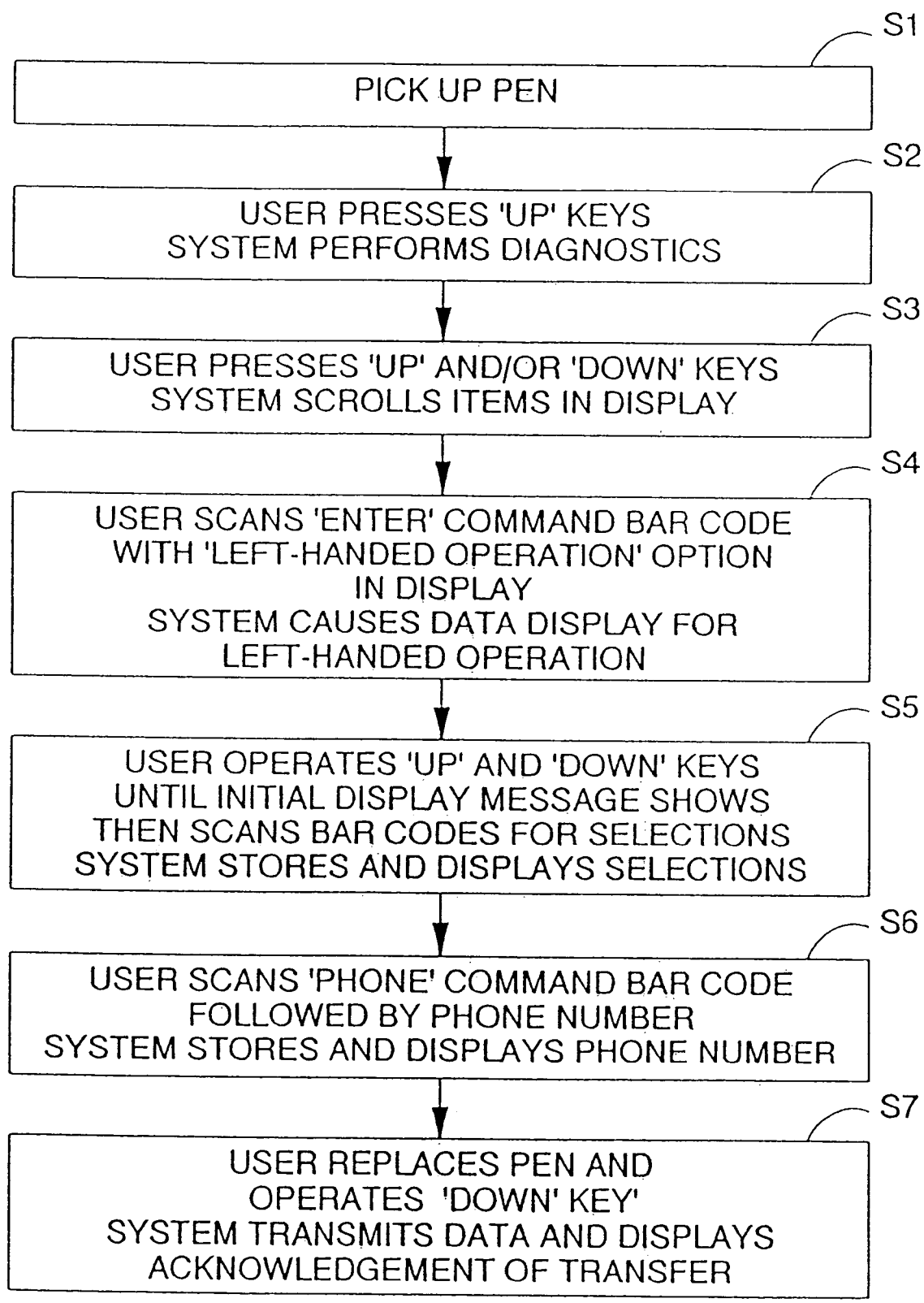
FIG. 7 is flow diagram illustrating an example of the operation of a data entry system as described with reference to FIGS. 1 to 6.

FIG. 7 is a flow diagram illustrating an example of a possible series of operations using an example of data entry system such as that described with reference to FIGS. 1 to 6. It will be appreciated that other sequences and modes of operation may be provided in other embodiments of the invention.

In a first step, S1, the pen 10 is removed from the base unit 40.

In step S2, "Up" key switch 24 is operated. The power control module senses operation of this key switch and powers up the processor 74, which performs a series of diagnostic checks, calibrates itself and then displays an initial message (e.g., "Ready") on the display 20.

In step S3 the "Down" and "Up" scroll keys switches 22 and 24 are operated to scroll though a number of initial options pre-stored within the ROM 76 or the RAM 78 and presented on successive screens of data items on the display 20.

In this example of operation, in step S4, when an option "Left-handed operation" is encountered on the screen, the pen is scanned over the "Enter" command bar code on the command sheet of FIG. 6. Whereas for right-handed operation, where text is displayed in English, the text is displayed in sequence from the end of the display nearest to the reading head 14 towards the opposite end, for left-handed operation the text display is inverted with the text then reading from the end of the display furthest from the reading head to the end nearest thereto. It can be seen, therefore, that the text is displayed in an orientation appropriate for the user. If left-handed operation has already selected and it is desired to use the pen in a right-handed mode, then "Right-handed operation" can be selected by scrolling the display using the "Down" and "Up" key switches 22 and 24 and then scanning the "Enter" command bar code when the appropriate option is displayed.

Other options which could be provided in this manner could, for example, be the selected of one of a number of operating languages.

In step S5, the scroll key switches 22 and 24 are again operated until the option "Ready" is encountered once more. Then a series of merchandise selections can be entered by the user by scanning the bar codes for the desired merchandise selections and the command bar codes "Enter", "Clear", "Quantity", etc., as appropriate. As each bar code is scanned successfully, the good read indicator 26 lights and the data read by the bar code reader is displayed on the screen. Either the alphanumeric value of the bar code read is displayed or, if a description of the item corresponding to the bar code value is stored in the RAM or the ROM, then this can be displayed instead of or as well as the bar code value.

Step S5 can be repeated as often as desired until all the desired items have been entered, or until the RAM 78 has become full or nearly full, in which case a "Memory full" error message is displayed on the display screen 20.

If desired, the items entered and stored in the RAM 78 could be checked by selecting a "Check Entries" option with the scroll key switches 22 and 24. In this case the items entered can then be checked in sequence using the scroll key switches 22 and 24, and if necessary corrected by scanning the correct command bar code while the appropriate item is displayed.

In the example shown in FIG. 6, however, after entering the desired items, a phone number is then entered in step S6 by scanning the command bar code "Phone" followed by the number of the processing centre 108 to be called. As an alternative to entering separately the telephone number, this could be pre-stored in memory, or could alternatively be included in the "Phone" bar code.

After this, in step S7 the pen is placed in the cradle on the base unit and the "Down" key switch 22 is pressed to download the data from the pen. This causes the data for the telephone number to be downloaded to the modem 100 via the optical link 106. The downloading of the telephone number causes the base unit automatically to call the desired number and, once the normal modem handshaking is completed, to transfer the data stored in the RAM 78 in the pen 10. Preferably, in addition to the actual data stored, the processor 74 in the pen 10 automatically adds error correcting codes to enable the processing centre 108 to verify that successful transmission has occurred. The processing centre 108 then sends a message to confirm (or otherwise) whether successful transmission occurred after checking the error correcting codes. This message is then displayed on the display 20 of the pen 10.

It will be appreciated that the steps S1 to S7 illustrated above merely form one possible method of operation. In an alternative embodiment of the invention, the scrolling function is only used for stepping though items which have already been entered into the pen, whether in the form of selectable items downloaded from the remote processing centre and/or items selected by means of the reading head. All other command functions are input by reading appropriate command codes from a command sheet. For this embodiment therefore, a command sheet should include commands for left and right handed operation, or a command for changing handedness. Then, to change between left and right-handed operation, it is merely necessary to scan an appropriate command bar code.

In a final step (not shown in FIG. 7). the pen is turned off by pressing the "Down" and "Up" scroll key switches simultaneously. It should be noted that the processor, which is provided with a date and time clock, is arranged to power-down the pen to conserve battery power if no bar codes are scanned and no key switches operated during a predetermined interval (e.g. 30 seconds). However, as mentioned above, power will be maintained to the RAM 76 if this is a non-volatile memory.

The software stored in the pen also permits the loading of data from the processing centre or another remote computer. The programming is performed using a series of commands preceded by dot codes. The programming commands are thus known as "dot" commands and cover operations such as RAM PEEK, RAM POKE, ROM PEEK, DISPLAY, SENSE, GET INFO, GET FIRST ITEM, GET NEXT ITEM, GET PREVIOUS ITEM, AMEND ITEM, DELETE ITEM, CLEAR ORDER, CLEAR CATALOGUE, ADD CATALOGUE ITEM, and AMEND CATALOGUE ITEM. In this way, a significant amount of catalogue data and/or program software can be held in the processing centre and be sent to the pens only when required. Where programs are to be downloaded, rewritable program storage will be needed in the pen, for example by implementing the ROM 76 in flash PROM technology.

The processing centre can also send commands to a hand held unit to instruct the user to scan in a personal identification number (PIN) possibly with the scanning of a further verification number from, for example a verification device in the form of a verification card (e.g., a credit, payment or other validation card) or like carrier carrying a verification bar code and/or dot code for verification of a user identity. Alternatively, the verification device can be scanned prior to any connection to a remote processing centre. In this case a connection can then be made to the remote processing centre for verification of the user identity. Operation of the data entry system subsequent to an initial data capture operation can then be made dependent on the identification of authorised coded data and a PIN number.

Figure 8:
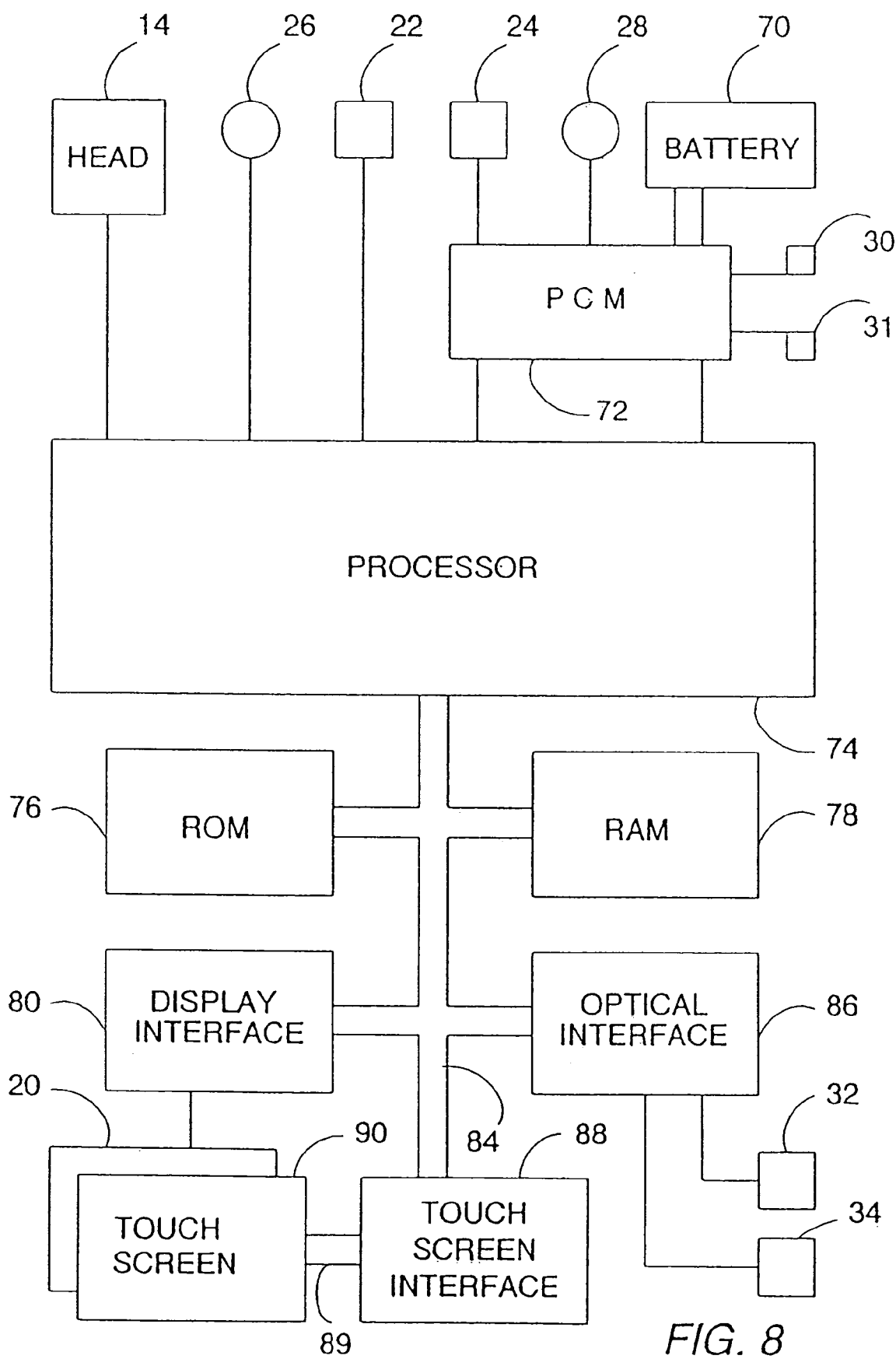
FIG. 8 is a schematic block diagram of the functional elements of a second example of a hand held data entry device as shown in FIGS. 1A and 1B.

FIG. 8 illustrates another example of a pen 10 in accordance with the invention. This example is substantially the same as the pen 10 described with reference to FIGS. 1 and 3, apart from the addition of a touch sensitive screen 90 for the display 20. A touch screen interface 88 couples the touch sensitive screen to the bus 84 so that data sensed by the touch sensitive screen can be communicated to the processor 74. Although FIG. 8 shows a touch sensitive screen 90 (e.g., an overlay) separate from a conventional display screen, any applicable touch sensitive screen technology can be used, either though the use of an addition to an existing conventional display screen, or the use of a display screen with integral touch sensitivity. One or more touch sensitive areas can be defined on the touch sensitive screen area, in combination with the data displayed on the display screen, for the entry of commands and/or the selection of displayed items. In particular, the processor 74 can be arranged to display a menu of user selectable items and to be responsive to a location at which the screen is touched for input of a user selection of a menu item. The touch sensitive screen can then thus be used as a dynamic and reconfigurable user interface. Touch screen entry can be used in place of or in addition to the entry of commands by scanning the bar codes on the command bar code card.

Figure 9:
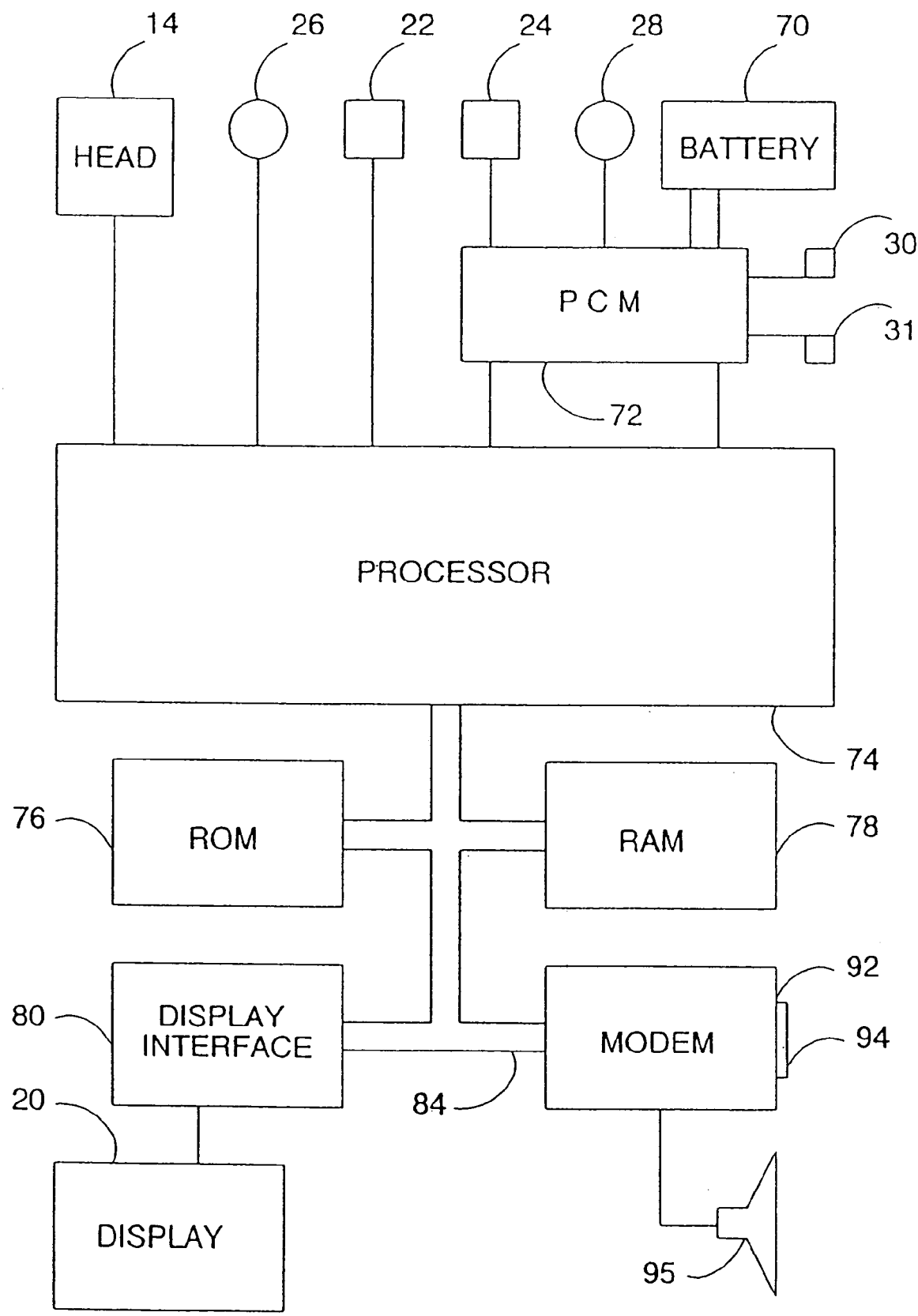
FIG. 9 is a schematic block diagram of the functional elements of a further, self-contained, hand held data entry device which is intended for use without a base unit.

FIG. 9 illustrates another example of a pen 10 in accordance with the invention. This example includes much in common with the pen 10 of FIG. 3, except that here a modem 92, a socket 94 for a standard telephone plug and a speaker 95 for monitoring transmissions during operation of the modem are provided in place of the optical interface 86 and optical transmitter and receivers 32 and 34. In this example, therefore, data can be transmitted and received via a telephone line without the use of the base station, providing added portability. Preferably, a simplified base station is provided in the form of a charging unit for rechargeable batteries in the pen 10. It will be appreciated that the pen 10 could also be provided with the touch screen facility of the pen 10 of FIG. 8.

Although in the above embodiments, the pens 10 are intended for manual scanning of bar codes, it will be appreciated that they could also be used for reading other optically readable codes, such as binary dot codes, by the provision of appropriate control software for programming the processor 74. Alternatively, in place of the sensor head 14 which is intended to be manually scanned, a self-scanning head could be provided.

The invention is also applicable to the reading of other coded data sources such as, for example, magnetic strips, graphical representations and/or alphanumeric characters, by the provision of an appropriate reading head and control logic.

Alternative removable heads could be attached to the tip of the pen by a screw, bayonet, friction or other appropriate attachment arrangement.

For example, the data entry pen could be provided with a reading head which is responsive to movement of the pen for tracing out desired codes and or commands. In particular, by the provision of a rolling ball in a holder in the reading head, of rotation sensing means in the manner of a personal computer mouse for tracing movements of the ball and suitable interpretation logic in software or special purpose hardware, for defining a series of vectors as the pen is moved over a surface and for performing pattern recognition on the resulting vector patterns to identify control and/or alphanumeric characters traced out by the pen head, it is possible directly to input information into the pen by "writing" down those characters. By limiting the range of characters to be recognised (e.g., corresponding to the numerals and commands shown in FIG. 6) it is possible to use conventional pattern recognition techniques with relatively limited processing power and storage requirements. It will be appreciated that increased processing power and storage can be provided in the pen described above for the embodiments of FIGS. 1, 3, 8 and 9 by the use of a more powerful processor and increased memory capacity.

Figure 10:
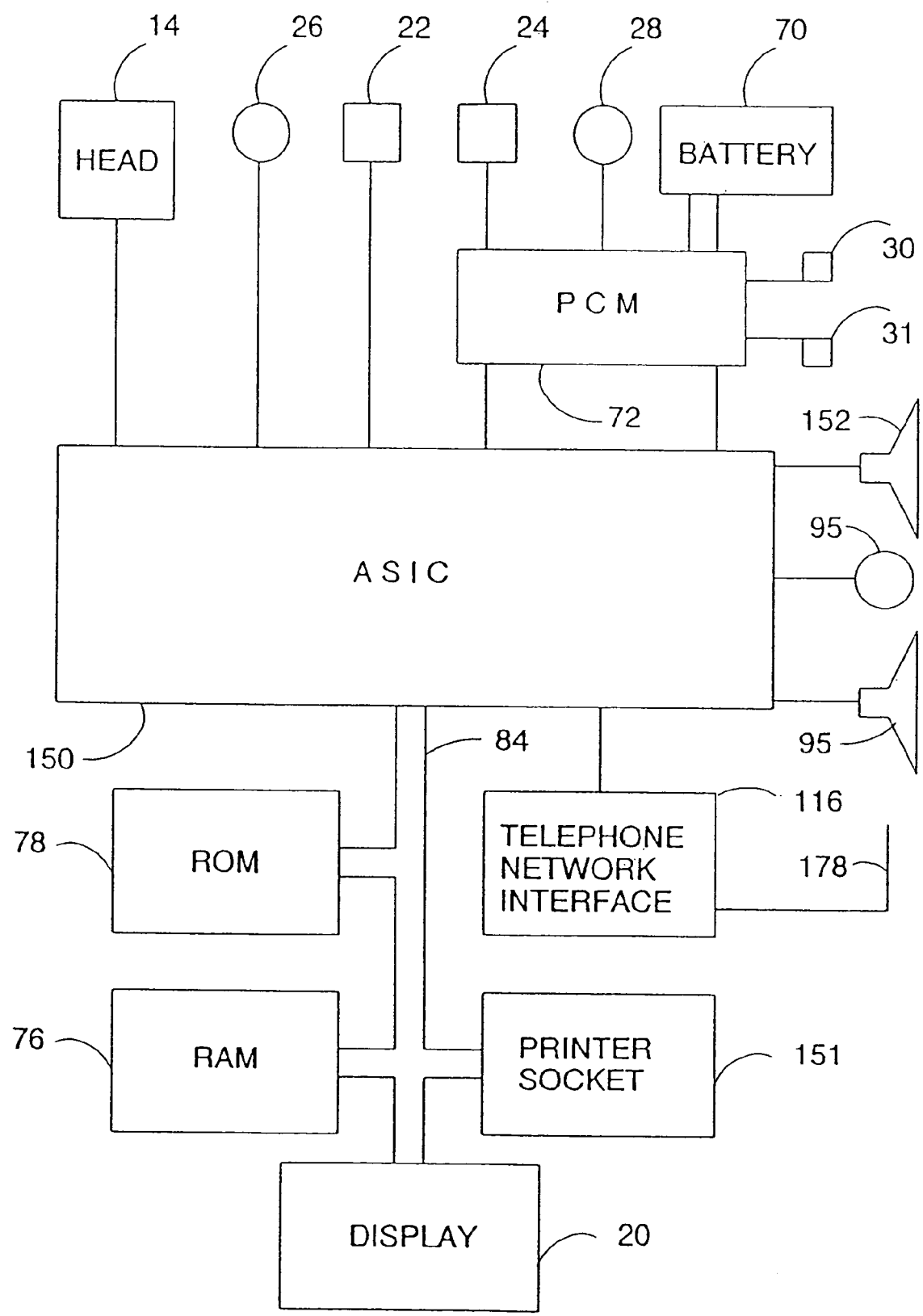
FIG. 10 is a schematic block diagram of the functional elements of a further, self-contained, hand held data entry device for use without a base unit and intended, in particular, for use with a wireless telephone network such as a cellular network.

FIG. 10 illustrates a further embodiment of the invention. This further embodiment of the invention is similar to the embodiment of FIG. 9, but this embodiment is intended for use with a wireless data transmission means, for example radio signals. In particular, the embodiment of FIG. 10 is intended for use with a cellular telephone network, although it could be adapted for use with some other form of wireless telephone system, for example a satellite based telephone network.

The embodiment of FIG. 10 is intended to be used independently of a base unit and to contain all the necessary functionality for independent operation. In one alternative the hand held unit is provided with a rechargeable battery pack 70, which can be removed from the hand held unit for recharging. In another alternative the hand held unit is provided with a fixed rechargeable battery pack 70. In the latter alternative, and optionally in the former alternative, a mains voltage charging socket and transformer/rectifier can be provided in the hand held unit or the battery pack for receiving a mains lead for charging purposes rather than the low voltage connectors 30/31. The low voltage DC charging connectors 30/31 can be configured in a socket for receiving an adapter lead, with a transformer/rectifier being provided, possibly incorporated in a plug, for connection to a mains socket. It will be appreciated that an adapter for connection to, for example, a 12 volt DC supply from a car may also be provided. As a further alternative, contactless recharging (for example by magnetic induction) could be employed.

The embodiment of FIG. 10 is implemented using a ASIC, although a conventional microprocessor and external hardware could be used. Likewise, it will be appreciated that the embodiments described with reference to the previous Figures could also be implemented using a ASIC or other equivalent technology instead of a microprocessor.

In the embodiment of FIG. 10, the ASIC (Application Specific Integrated Circuit) performs the majority of the necessary processing functions of the device including:
- accepting data from the head 14;
- accepting data from the switches 22 and 24;
- driving the indicator 26;
- processing the data received from the head in the manner described with respect to the previous embodiments in order to extract the necessary information;
- controlling the flow of data in and out of the RAM 78;
- controlling the flow of data in and out of the ROM 76;
- interfacing with the power control module 72;
- implementing the modem function for use with an analogue telephony system and also providing the necessary processing and control for integration with a digital telephony system and/or a cellular telephone network;
- controlling the loudspeaker 95 permitting the progress of calls to be monitored;
- accepting input from a microphone 152 to enable the pen in combination with the loudspeaker 95 to operate as a hand set for the purposes of audio telephony;
- controlling the flow of data to an optional printer socket (not shown) allowing a user to print out information relative to the code being scanned in a predefined format;
- controlling the output of data via an optical link 153 to a peripheral device (e.g., a printer) using for example, infra red light;
- controlling an interface to the display 20, the display interface functions being performed in the ASIC.

The optical link 153 could be implemented using the optical link technology described above for interfacing a hand held unit with a base station. Indeed, the printer or other peripheral device could be implement as, or connected to a base station for the hand held unit.

Figure 11:
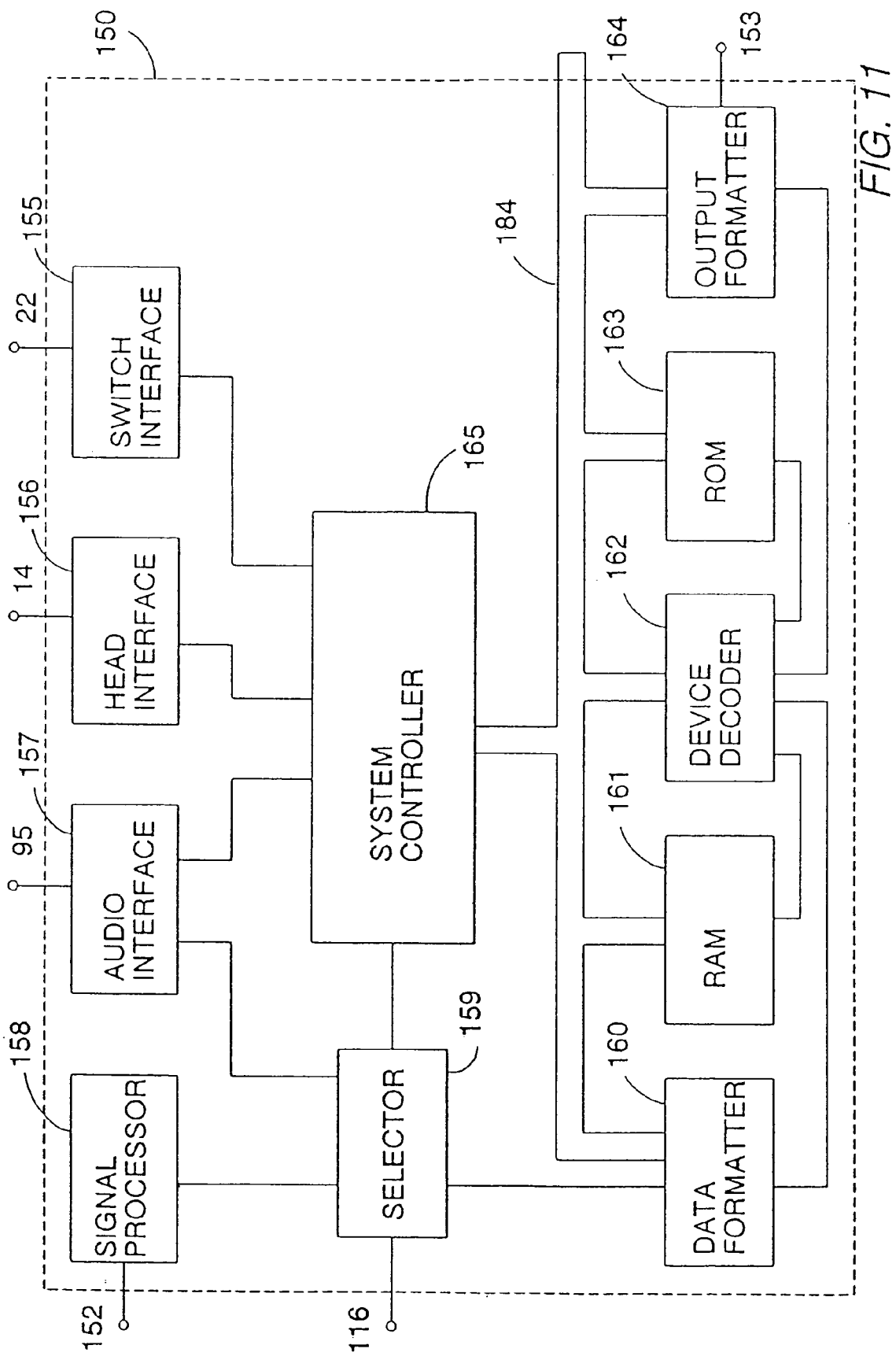
FIG. 11 is a schematic block diagram illustrating components in an ASIC forming part of the apparatus of FIG. 10.

FIG. 11 illustrates in more detail the configuration of the ASIC 150.

The ASIC comprises the system controller 165 that controls the operation of the pen and of its associated components. In this embodiment system controller 165 consists of a microcontroller core incorporated into the ASIC. In other embodiments it could consist of some other control means using, for example, one or more finite state machines.

If the system controller 165 is a microcontroller core, then the data that controls its operation is stored in an internal ROM 163 together with the external ROM 76. Alternatively, there could be no internal ROM 163 and the system controller 165 will then obtain all the data from the external ROM 76. Alternatively, again, the internal ROM 163 could be used exclusively without an external ROM 78. However, this would reduce the flexibility of the device. The use of the internal ROM 163 is advantageous where a pre-defined amount of the operations to be performed are fixed for all pen types, whilst the remainder of the operation is dependent on a particular model, to take account for example of language variations, number of switches used to enter data, etc. The RAM 161 in the ASIC can be used by the system controller 165 as a scratch pad RAM to speed up operations and in order to reserve the maximum amount of RAM 78 for the storage of the main data. This "main data" includes data identifying information relating to selectable items of, for example, a merchandising catalogue, which can be down loaded by telephonic transmissions from a remote station.

The microcontroller receives requests via the bus 84 which is connected to the external bus 84 illustrated in FIG. 10. However, in an alternative embodiment where the system controller 165 consist of a number of finite state machines, then control would be by means of the fixed interconnection of the logic in the fixed state machines.

RAM 161 could be used as a short term data store leaving the RAM 78 to store the main data, the data in RAM 78 being retained by the battery 70. An additional battery (not shown) could be provided for data retention to prevent the loss of data from the RAM 78 or the RAM 161 in the event of failure of the battery 70.

The switch interface 155 responds to the operation of the switch 22 and ensures that the system controller 165 receives signals which are devoid of bounce (resulting for example from multiple operations of the switch due to the spring operation within the switch).

The head interface 156 carries out the necessary signal conditioning as required on receiving signals from the head 14. The signal conditioning will depend on the exact configuration of the head and preferably comprises simple buffering of the data read. Alternatively, it could be implemented to provide at least some of the bar code conversion operations as will be apparent to one skilled in the art.

Selector 159 is controlled by the system controller 165 and functions in such a manner to allow the microphone 152 and the speaker 95 to provide standard audio telephony transmission or to allow the system controller to transfer the data over the telephony network using, in the present embodiment, conventional cellular telephone technology.

Thus the selector 159 enables the data entry device to be used as a conventional cellular telephone for the transmission of audio signals. In conventional telephony mode, the selector 159 takes signals from the microphone 152 that have been processed by the signal processor 158 and directs the output to the line interface 116. The processing performed by the processor 158 can comprise, as will be apparent to one skilled in the art, conventional operations of buffering the microphone to filter out any frequencies not required and to amplify the signal to a suitable level. Received audio data is directed to the audio interface 157 which performs necessary signal conditioning before passing the signal to the speaker 95.

In the data transfer mode, the selector takes the output from the data formatter 160, which has prepared the data to be transmitted over the cellular telephone network, and directs this to the line interface 152. The speaker 95 is then used to output any tones or audio messages indicating errors, correct operation, etc., again via the audio interface 157.

Switching between modes can be accomplished using the keys and/or the scanning sensor of the hand held unit in the manner described above for the entry of data and/or commands.

The output formatter 164 prepares the data to be transmitted to a remote printer via an optical link 153 (not shown). This transmission could be in any one of a number of forms, for example, infra red light using technology as described above for interfacing the pen with a base unit. Alternatively, other remote link technology, for example a radio link, could be provided.

Figure 12:
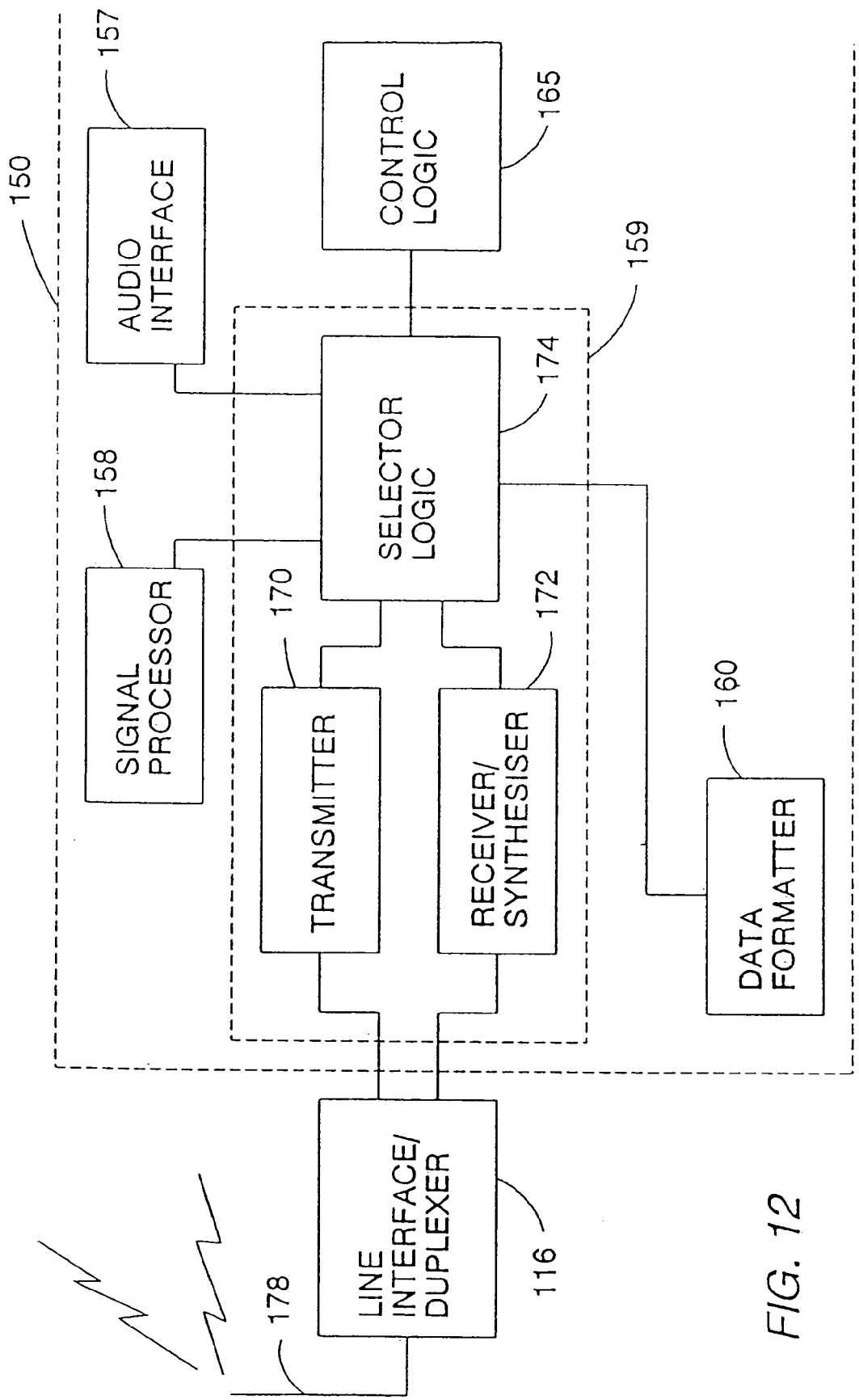
FIG. 12 is a schematic block diagram illustrating the inter-relationship of functional elements of FIGS. 10 and 11.

FIG. 12 illustrates aspects from FIGS. 10 and 11 to illustrate in more detail the incorporation of an example of a cellular telephone system within the data entry device. The telecommunications interface 116 comprises a line interface/duplexer which is connected to an aerial 178. The line interface/duplexer 116 is connected to a transmitter 170 and to a receiver/synthesizer 172 implemented in the selector

159. Also implemented in the selector 159 is selector logic 174 for connecting the transmitter 170 and the receiver/synthesizer 172 to the signal processor 158, the audio interface 157, the data formatter 160 and the control logic 165 within the ASIC 150.

Although specific embodiments of the invention have been described hereinabove, it will be appreciated that many modifications and/or additions are possible within the scope of the present invention.

Thus, for example, although in the presently preferred embodiments described above the hand held unit is configured with the shape of a pen, it will be appreciated that the hand held unit could be configured in other shapes as desired in other applications, for example in the shape of a pistol.

Although in the examples of the pen and base unit described with reference to FIG. 1 to 4 and 8 an optical link between the pen and the base unit is provided, in an alternative embodiment other wireless data transmission means, for example radio signals, could be used, in the manner of a portable telephone of the type with a portable handset and a base unit.

The data from the memory of the pen (e.g., the complete list of items which could be ordered from a catalogue) could conveniently be output in alphanumeric form via a modem to a facsimile (fax) machine for printing the content of the memory.

In the preferred embodiments described above, catalogue data is down-loaded into the pen from a remote processing system by telephone, over the telecommunications interface. However, as an alternative to down-loading, for example a complete catalogue, via the telephone line, other data entry means could be provided for the bulk of the data, the telephone line then only being used for updating the stored data. For example the pen and/or the base unit as appropriate could be provided with a socket or connector or reader for a memory device (such as a plug-in ROM, a smart card, etc.).

Although no speaker is illustrated in the examples of the pen described with reference to FIGS. 3 and 8, a speaker or other sound generator could be provided as in the FIGS. 9 and 10 embodiments for giving audio feedback to report on the correct reading, or otherwise, of a code. Thus, for example, when a code is correctly read, one beep can be sounded, and when a code is incorrectly read, two beeps could be sounded. Alternatively, appropriate synthetic or recorded voice messages could be output.

Although in the examples described above the plane of the display in generally parallel to the axis of the pen, the plane of the display 20 could be arranged to slope progressively towards the axis of the pen away from the head end of the pen to reduce the angle between the normal to the plane of the display and the line of sight of the user.

Also, although in the present examples two mechanical key switches are provided, in other embodiments one key switch only could be provided. Operating that key switch a predetermined number of times within a short period could be used to emulate the provision of two key switches for scrolling and other functions. More key switches could also be provided in other embodiments. For example, a numerical keypad could be provided. However, in preferred embodiments of the invention, the number of keys should be kept as low as possible for any particular application. As in the embodiments described above, two key switches are preferred. The control sheet or data carrier effectively forms a keyboard extension for the pen.

Although in the example of a card or other carrier shown in FIG. 6 a set of bar codes for only numeric and command codes are indicated, if desired a set of bar codes for the complete alphabet could be provided. Alternative arrangements of the codes would also be possible, for example a complete set of codes and corresponding characters could be arranged in the format of a standard typewriter keyboard layout. The codes could also be incorporated in the letters and numerals, for example extending as a strip across the letters and numerals. For example, a bar code could replace the cross bar in a capital "A", and similar modifications for the other letters of the alphabet.

Also, as mentioned above, in appropriate embodiments of the invention, codes other than bar codes or dot codes could be used. For example a symbol blob code could be used, this requiring about 1 Kbyte of storage for decoding purposes. Indeed, in other embodiments of the invention full character recognition (OCR) could be employed where the reading sensor is in the form of a camera or other scanning sensor incorporated in the reading head. With a camera and appropriate recognition logic, the pen could be used, for example, for fingerprint recognition, either as an aim in itself, or for user validation purposes.

In a merchandising system, where bar codes or other codes are associated with merchandisable items, this could be achieved simply by means of a printed catalogue, or some other form of list, or as a result of codes applied to examples of the products in question, or as a result of codes displayed, for example, on a TV screen with images relating to those products. The only requirement is that the display of the codes are readable by the data entry system of the present invention.

Features from the respective embodiments of the invention described above could also be combined as desired to provide a configuration appropriate for a particular application.

Thus, for example, the audio telephony functions described with reference to the embodiment of FIGS. 10 to 12 could be incorporated in the hand held or base unit, as appropriate, of the other embodiments of the invention.

Although in the specific embodiments described above the telecommunications interface for the telephonic transmission of information is only provided in a hand held unit where no base unit with a telecommunications interface is provided, it will be appreciated that a hand held unit with a telecommunications interface could be combined with a base unit also having a telecommunications interface, either of the same or a different type.

The invention claimed is:

1. A data entry system comprising a hand held data entry unit, said hand held unit comprising:

a reading sensor for sensing commands and/or data and for producing input signals in response to said sensed commands and/or data;

rewritable storage programmable with information relating to selectable items;

a controller connected to receive and process said input signals from said sensor, said controller being arranged to respond to said commands to control said hand held unit and to said data to select a said item;

a display screen for displaying a user readable representation of said commands and displaying information relating to said item from said rewritable storage;

a telecommunications interface for telephonic transmission of information relating to a selected item or items from said storage to a remote processing center via a telecommunications network and for telephonic reception of information relating to said selectable items from said remote processing center to said storage via said telecommunications network, wherein said telecommunications interface is a telecommunications line interface integral to said hand held unit and directly connects said hand-held unit to said telecommunications network; and a carrier for a plurality of data and/or command codes for association with means for displaying a plurality of selectable items, wherein said carrier carries a plurality of codes, each for a respective one of a plurality of natural language and/or numeric characters and a plurality of commands for controlling operation of said data entry or merchandising system, each code being associated with a visual representation of the corresponding natural language or numeric character or command and/or of a graphical representation thereof.

2. A data entry system according to claim 1, wherein said codes are bar and/or dot codes and/or other product identifications.

3. A portable hand held computer, wherein said hand held computer is capable of use by a user as a data entry device and as a portable wireless telephone for voice transmission and reception, said hand held computer comprising:

memory, wherein said memory is operable for retaining information input by the user, operable for retaining downloaded information, and operable for retaining information for updating downloaded information previously retained in said memory;

a manually operable key switch for input of information;

a display interface comprising a touch sensitive screen, wherein said display interface is operable to display user commands, operable to display information retained by said memory, and operable to display a list of user selectable items comprising merchandisable items, and to selectively display information relating to one or more of said items;

an antenna;

a rechargeable power supply;

a sensor operable to sense and capture data wherein said sensor is a camera;

a wireless telecommunications interface operable directly to connect said hand held computer via said antenna to a wireless telecommunications network and operable for transmission and reception of voice, data, and information, wherein said wireless telecommunications interface is operable to transmit data captured by said sensor; an optical interface operable to establish an optical datalink for the transmission and reception of information from and to said hand held computer;

a controller coupled to said display interface, key switch, memory, rechargeable power supply, optical interface, sensor, and wireless telecommunications interface; and a speaker and a microphone configuring said hand held computer for use as a telephone handset;

wherein said display interface, antenna, key switch, rechargeable power supply, wireless telecommunications interface, memory, controller, optical interface, sensor, speaker, and microphone comprise a self-contained assembly; and, wherein said hand held computer is operable:

to download from a remote processing center via said antenna and at least said wireless telecommunications network information relating to one or more merchandisable items for retention in said memory;

to transmit data relating to one or more of said merchandisable items from said memory to said remote processing center via said antenna and at least said wireless telecommunications network, and to download information relating to one or more of said merchandisable items from said remote processing center via said antenna and at least said wireless telecommunications network in response to a said transmission of data;

to download, via said antenna and at least said wireless telecommunications network in response to entry of a user command, information from said remote processing center for retention in said memory to update information previously retained in said memory for one or more of said merchandisable items; and as a portable wireless telephone for voice reception and transmission.

4. A portable hand held computer according to claim 3 wherein said hand held computer comprises a connector interface operable to connect said hand held computer to a separate personal computer for inputting and outputting information to or from said hand held computer, said connector interface comprising a part of said self-contained assembly.

5. A portable hand held computer according to claim 3 wherein said hand held computer is operable using said wireless telecommunications interface to receive a request from a said remote processing center for the user to input user identification information for utilization by said remote processing center.

6. A portable hand held computer according to claim 5 wherein said user identification information comprises a personal identification number.

7. A portable hand held computer according to claim 5 wherein said user identification information comprises a credit card number.

8. A portable hand held computer according to claim 5 wherein said hand held computer is operable, subsequent to an initial input of user identification information after a connection to a said remote processing center, for subsequent use with said remote processing center which is dependent on the user identification information.

9. A portable hand held computer according to claim 3 wherein said hand held computer comprises a connector interface operable to connect said hand held computer to a separate personal computer for inputting and outputting information, and wherein said display interface, antenna, key switch, rechargeable power supply, wireless telecommunications interface, memory, controller, optical interface, sensor, speaker, microphone, and connector interface comprise a self-contained assembly, and wherein said hand held computer is operable using said wireless telecommunications interface to receive a request from a said remote processing center to the user to instruct the user to input user identification information for utilization by said remote processing center.

10. A portable hand held computer according to claim 9 wherein said user identification information comprises a personal identification number.

11. A portable hand held computer according to claim 9 wherein said user identification information comprises a credit card number.

12. A portable hand held computer according to claim 9 wherein said hand held computer is operable, subsequent to an initial input of user identification information after a connection to a said remote processing center, for subsequent use with said remote processing center which is dependent on the user identification information.

13. A portable hand held computer according to claim 3 wherein said computer comprises one or two manually operable switches for scrolling said display in a first and/or second direction for selectively displaying said selectable items, and wherein operation of one of said switches in predetermined operational states of said hand held computer causes predetermined functions other than scrolling to be performed.

14. A portable hand held computer according to claim 3 comprising a verification device in the form of a verification card or like carrier carrying a verification code to verify user information.

15. A portable hand held computer according to claim 3 that is operable to provide audio feedback to the user to indicate input of information via a said manually operable key switch, and further comprises a plurality of manually operable key switches arranged as a numerical keypad.

16. A portable hand held computer according to claim 4 wherein said hand held computer is operable to connect to a said separate personal computer via said connector interface or said optical interface, and said separate computer has a separate telecommunications interface.

17. A portable hand held computer according to claim 3 wherein said display interface is a reconfigurable user interface that is operable to display different information or data depending on user input.

18. A portable hand held computer according to claim 4 wherein said connector interface is also operable to connect said hand held computer to a source for recharging the rechargeable power supply.

19. A portable hand held computer according to claim 3 wherein said wireless telecommunications interface is operable to download information to update information describing one or more of said merchandisable items previously retained wherein such information has changed or has not changed.

20. A portable hand held computer according to claim 3 wherein said memory comprises one or more memory components.

21. A portable hand held computer according to claim 3 wherein said wireless telecommunications interface comprises one or more radio components.

22. A portable hand held computer according to claim 3 wherein said data captured by said sensor is one or more images.

23. A portable hand held computer according to claim 3 wherein said memory comprises rewritable storage.

24. A portable hand held computer according to claim 3 wherein said downloaded information is retained in said hand held computer at least in part by utilizing power from said rechargeable power source.

25. A portable hand held computer according to claim 4 wherein said connector interface is also operable to connect to a cradle.

26. A portable hand held computer according to claim 3 wherein said display interface displays a carrier of data and/or command codes comprising coded data in the form of alphanumeric characters, and said hand held computer is operable to read said coded data.

27. A portable hand held computer according to claim 3 wherein said optical interface is configured to connect to a printer or another hand held computer.

28. A portable hand held computer according to claim 3 wherein said hand held computer is operable by a user for initiating the purchase of one or more of said merchandisable items by means of the transmission of information from said memory via said antenna.

29. A portable hand held computer according to claim 3 further comprising a carrier for a plurality of data and/or command codes, wherein said carrier carries a plurality of command codes arranged in the format of a numerical keypad or a typewriter keyboard layout displayed via said display interface.

30. A portable hand held computer according to claim 3 wherein information retained in said memory for a list of merchandisable items is kept up to date via information downloaded from said remote processing center.

31. A portable hand held computer according to claim 3 wherein programs for use in said hand held computer are downloadable from a processing center remotely located from said hand held computer and are updateable via said wireless telecommunications interface from said processing center.

32. A portable hand held computer, wherein said hand held computer is capable of use by a user as a data entry device and configured to be held in one hand for operable use as a portable wireless telephone for voice transmission and reception, said hand held computer comprising:
   memory, wherein said memory is operable for retaining information in response to input by the user, operable for retaining downloaded information, and operable for retaining information for updating downloaded information previously retained in said memory;
   a manually operable key switch for input of information;
   a display interface comprising a touch sensitive screen, wherein said display interface is operable to display user commands, operable to display information retained by said memory, and operable to display a list of user selectable items comprising merchandisable items, and to selectively display information relating to one or more of said items;
   an antenna;
   a rechargeable power supply;
   a wireless telecommunications interface operable directly to connect via said antenna to a wireless telecommunications network and operable for transmission and reception of voice, data, and information;
   a controller coupled to said display interface, key switch, memory, rechargeable power supply, and wireless telecommunications interface;
   a speaker and a microphone permitting said hand held computer to be used as a telephone handset;
   wherein said display interface, antenna, key switch, rechargeable power supply, wireless telecommunications interface, memory, controller, speaker, and microphone comprise a self-contained assembly; and wherein said hand held computer is operable:
   to download from a remote processing center via said antenna and at least said wireless telecommunications network information relating to one or more merchandisable items for retention in said memory;
   to transmit data relating to one or more of said merchandisable items from said memory to said remote processing center via said antenna and at least said wireless telecommunications network, and to download information relating to one or more said merchandisable items from said remote processing center in response to a said transmission of data;
   to receive a request from said remote processing center to the user to input user identification information for utilization by said remote processing center; and
   as a portable wireless telephone for voice reception and transmission.

33. A portable hand held computer according to claim 32 wherein said hand held computer comprises a connector interface operable to connect said hand held computer to a separate personal computer for inputting and outputting data or information, and wherein said display interface, antenna, key switch, rechargeable power supply, wireless telecommunications interface, memory, controller, speaker, microphone, and connector interface comprise a self-contained assembly.

34. A portable hand held computer according to claim 32 wherein said hand held computer comprises an optical interface operable to establish an optical datalink for the transmission and reception of information from and to said hand held computer, and wherein said display interface, antenna, key switch, rechargeable power supply, wireless telecommunications interface, memory, controller, speaker, microphone, and optical interface comprise a self-contained assembly.

35. A portable hand held computer according to claim 32 wherein said hand held computer comprises a sensor operable to sense and capture data wherein said sensor is a camera, and wherein said display interface, antenna, key switch, rechargeable power supply, wireless telecommunications interface, memory, controller, speaker, microphone, and sensor comprise a self-contained assembly.

36. A portable hand held computer according to claim 32 wherein said hand held computer comprises a connector interface operable to connect said hand held computer to a separate personal computer for inputting and outputting data or information to or from said hand held computer, and comprises an optical interface operable to establish an optical datalink for the transmission and reception of information from and to said hand held computer, and wherein said display interface, antenna, key switch, rechargeable power supply, wireless telecommunications interface, memory, controller, speaker, microphone, optical interface, and connector interface comprise a self-contained assembly.

37. A portable hand held computer according to claim 32 wherein said hand held computer comprises a connector interface operable to connect said hand held computer to a separate personal computer for inputting and outputting data or information, comprises an optical interface operable to establish an optical datalink for the transmission and reception of information from and to said hand held computer, and comprises a sensor operable to sense and capture data wherein said sensor is a camera, and wherein said display interface, antenna, key switch, rechargeable power supply, wireless telecommunications interface, memory, controller, speaker, microphone, optical interface, sensor, and connector interface comprise a self-contained assembly.

38. A portable hand held computer according to claim 32 wherein said hand held computer using a said wireless telecommunications interface also is operable in response to entry of a user command to download information from said remote processing center for retention in said memory to update information previously retained in said memory for one or more of said merchandisable items.

39. A portable hand held computer according to claim 32 wherein said user identification information comprises a personal identification number.

40. A portable hand held computer according to claim 32 wherein said user identification information comprises a credit card number.

41. A portable hand held computer according to claim 32 wherein said hand held computer is operable, subsequent to an initial input of user identification information after a connection to a said remote processing center, for subsequent use with said remote processing center which is dependent on the user identification information.

42. A portable hand held computer according to claim 33 wherein said hand held computer using said antenna and at least said wireless communications network also is operable in response to entry of a user command to download information from said remote processing center for retention in said memory to update information previously retained in said memory for one or more of said merchandisable items.

43. A portable hand held computer according to claim 34 wherein said hand held computer using said antenna and at least said wireless communications network also is operable in response to entry of a user command to download information from said remote processing center for retention in said memory to update information previously retained in said memory for one or more of said merchandisable items.

44. A portable hand held computer according to claim 35 wherein said hand held computer using said antenna and at least said wireless communications network also is operable in response to entry of a user command to download information from said remote processing center for retention in said memory to update information previously retained in said memory for one or more of said merchandisable items.

45. A portable hand held computer according to claim 36 wherein said hand held computer using said antenna and at least said wireless communications network also is operable in response to entry of a user command to download information from said remote processing center for retention in said memory to update information previously retained in said memory for one or more of said merchandisable items.

46. A portable hand held computer according to claim 37 wherein said hand held computer using said antenna and at least said wireless communications network also is operable in response to entry of a user command to download information from said remote processing center for retention in said memory to update information previously retained in said memory for one or more of said merchandisable items.

47. A portable hand held computer, wherein said hand held computer is capable of use by a user as a data entry device and configured to be held in one hand for operable use as a portable wireless telephone for voice transmission and reception, said hand held computer comprising:
  memory, wherein said memory is operable for retaining data or information in response to input by the user, operable for retaining downloaded information, and operable for retaining information for updating downloaded information previously retained in said memory;
  a manually operable key switch for input of information;
  a display interface, wherein said display interface is operable to display user commands, operable to display information retained by said memory, and operable to display a list of user selectable items comprising merchandisable items, and to selectively display information relating to one or more of said items;
  an antenna;
  a rechargeable power supply;
  a sensor operable for sensing user commands or data;
  a wireless telecommunications interface operable directly to connect via said antenna to a wireless telecommunications network and operable for transmission and reception of voice or data, wherein said wireless telecommunications interface is operable to transmit data captured by said sensor;
  a controller coupled to said display interface, key switch, memory, rechargeable power supply, sensor, and wireless telecommunications interface; and,
  a speaker and a microphone permitting said hand held computer to be used as a telephone handset;
  wherein said display interface, antenna, key switch, rechargeable power supply, wireless telecommunications interface, memory, controller, sensor, speaker, and microphone comprise a self-contained assembly; and wherein said hand held computer is operable:

to download from a remote processing center via said antenna and at least said wireless telecommunications network information relating to one or more merchandisable items for retention in said memory;

to transmit data relating to one or more of said merchandisable items from said memory to said remote processing center via said antenna and at least said wireless telecommunications network, and to download information relating to one or more of said merchandisable items from said remote processing center via said antenna and at least said wireless telecommunications network in response to a said transmission of data;

to receive a request from said remote processing center to the user to input user identification information for utilization by said remote processing center; and as a portable wireless telephone for voice reception and transmission.

48. A portable hand held computer according to claim 47 wherein said hand held computer comprises a connector interface operable to connect said hand held computer to a separate personal computer for inputting and outputting data or information, and wherein said display interface, antenna, key switch, rechargeable power supply, wireless telecommunications interface, memory, controller, sensor, speaker, microphone, and connector interface comprise a self-contained assembly.

49. A portable hand held computer according to claim 47 wherein said hand held computer comprises a optical interface operable for an optical datalink to transmit information from said hand held computer and/or to receive information, and wherein said display interface, antenna, key switch, rechargeable power supply, wireless telecommunications interface, memory, controller, sensor, speaker, microphone, and optical interface comprise a self-contained assembly.

50. A portable hand held computer according to claim 47 wherein said sensor comprises a camera operable for sensing and capturing data, and wherein said display interface, antenna, key switch, rechargeable power supply, wireless telecommunications interface, memory, controller, speaker, microphone, and sensor comprise a self-contained assembly.

51. A portable hand held computer according to claim 47 wherein said hand held computer comprises a connector interface operable to connect said hand held computer to a separate personal computer for inputting and outputting data or information, and comprises a optical interface operable for an optical datalink to transmit data or information from said hand held computer and/or to receive data or information, and wherein said display interface, antenna, key switch, rechargeable power supply, wireless telecommunications interface, memory, controller, sensor, speaker, microphone, optical interface, and connector interface comprise a self-contained assembly.

52. A portable hand held computer according to claim 47 wherein said hand held computer comprises a connector interface operable to connect said hand held computer to a separate personal computer for inputting and outputting data or information, comprises a optical interface operable for an optical datalink to transmit information from said hand held computer and/or to receive data or information, and said sensor comprises a camera operable for sensing and capturing data, and wherein said display interface, antenna, key switch, rechargeable power supply, wireless telecommunications interface, memory, controller, speaker, microphone, optical interface, sensor, and connector interface comprise a self-contained assembly.

53. A portable hand held computer according to claim 47 wherein said user identification information comprises a personal identification number.

54. A portable hand held computer according to claim 47 wherein said user identification information comprises a credit card number.

55. A portable hand held computer according to claim 47 wherein said hand held computer is operable, subsequent to an initial input of user identification information after a connection to a said remote processing center, for subsequent use with said remote processing center which is dependent on the user identification information.

56. A portable hand held computer according to claim 48 wherein said hand held computer using said antenna and at least said wireless communications network also is operable in response to entry of a user command to download information from said remote processing center for retention in said memory to update information previously retained in said memory for one or more of said merchandisable items.

57. A portable hand held computer according to claim 49 wherein said hand held computer using said antenna and at least said wireless communications network also is operable in response to entry of a user command to download information from said remote processing center for retention in said memory to update information previously retained in said memory for one or more of said merchandisable items.

58. A portable hand held computer according to claim 50 wherein said hand held computer using said antenna and at least said wireless communications network also is operable in response to entry of a user command to download information from said remote processing center for retention in said memory to update information previously retained in said memory for one or more of said merchandisable items.

59. A portable hand held computer according to claim 47 wherein said sensor is comprised of said display interface and at least one or two manually operable keys on said hand held computer for sensing user commands or data via input caused by use of one or more of said keys, wherein one or more of said keys is operable to cause scrolling through items displayed via said display interface, one or more of said keys is operable to select one or more of said items, and one or more of said keys is operable to select a said command displayed via said display interface.

60. A portable hand held computer according to claim 47 wherein said sensor is comprised of said display interface comprising a touch sensitive screen for sensing input by the user.

61. A portable hand held computer, wherein said hand held computer is capable of use by a user as a data entry device and configured to be held in one hand for operable use as a portable cellular telephone for voice transmission and reception, said hand held computer comprising:

memory, wherein said memory is operable for retaining data or information in response to input by the user, operable for retaining downloaded information, and operable for retaining information for updating downloaded information previously retained in said memory;

a manually operable key switch for input of information;

a display interface, wherein said display interface is operable to display user commands, operable to display information retained by said memory, and operable to display a list of user selectable items comprising merchandisable items, and to selectively display information relating to one or more of said items;
an antenna;
a rechargeable power supply;
a sensor operable for sensing user commands or data;
a wireless telecommunications interface operable directly to connect via said antenna to a wireless telecommunications network and operable for transmission and reception of voice or data, wherein said wireless telecommunications interface is operable to transmit data captured by said sensor, and is a cellular telephone interface;
a controller coupled to said display interface, key switch, memory, rechargeable power supply, sensor, and wireless telecommunications interface; and,
a speaker and a microphone permitting said hand held computer to be used as a telephone handset;
wherein said display interface, antenna, key switch, rechargeable power supply, wireless telecommunications interface, memory, controller, sensor, speaker, and microphone comprise a self-contained assembly; and wherein said hand held computer is operable:
to download from a remote processing center via said antenna and at least said wireless telecommunications network information relating to one or more merchandisable items for retention in said memory;
to transmit data relating to one or more of said merchandisable items from said memory to said remote processing center via said antenna and at least said wireless telecommunications network, and to download information relating to one or more of said merchandisable items from said remote processing center via said antenna and at least said wireless telecommunications network in response to a said transmission of data;
to download, via said antenna and at least said wireless telecommunications network in response to entry of a user command, information from said remote processing center for retention in said memory to update information previously retained in said memory for one or more of said merchandisable items;
to receive a request from said remote processing center to the user to input user identification information for utilization by said remote processing center; and
as a portable cellular telephone for voice reception and transmission.

62. A portable hand held computer operable as a data entry device and a portable wireless telephone by a user, comprising:
memory, wherein said memory is operable for retaining data or information in response to input by the user, operable for retaining downloaded data or information, and operable for retaining data or information for updating downloaded data or information previously retained in said memory;
a manually operable key switch for input of information;
a display interface, wherein said display interface is operable to display user commands, operable to display information retained by said memory, and operable to display a list of user selectable items comprising merchandisable items, and to selectively display information relating to one cc more of said items;
an antenna;
a rechargeable power supply;
a sensor operable to sense and capture data wherein said sensor is a camera;
a wireless telecommunications interface operable directly to connect via said antenna to a wireless telecommunications network and operable for transmission and reception of voice or data, wherein said wireless telecommunications interface is operable to transmit data captured by said sensor via said antenna;
a controller coupled to said display interface, key switch, memory, rechargeable power supply, sensor, and wireless telecommunications interface;
wherein said hand held computer is operable using said wireless telecommunications interface to download from a remote processing center information relating to one or more of said items for retention in said memory by utilizing at least said wireless telecommunications network, said hand held computer is operable using said wireless telecommunications interface to transmit data or information relating to one or more of said items from said memory to said remote processing center and to download information relating to one or more of said items from said remote processing center in response to a said transmission, said hand held computer using said wireless telecommunications interface also is operable in response to entry of a user command to download information from said remote processing center for retention in said memory to update information previously retained in said memory for one or more of said items, and said hand held computer is operable as a portable wireless telephone;
wherein said display interface, antenna, key switch, rechargeable power supply, wireless telecommunications interface, memory, controller, and sensor comprise a self-contained assembly; and wherein said assembly includes a speaker and a microphone permitting said hand held computer to be used as a telephone handset.

* * * * *

(12) EX PARTE REEXAMINATION CERTIFICATE (7125th)

United States Patent
Callaghan et al.

(10) Number: US 7,139,591 C1
(45) Certificate Issued: *Oct. 27, 2009

(54) HAND HELD TELECOMMUNICATIONS AND DATA ENTRY DEVICE

(75) Inventors: Francis John Callaghan, St. Helier (GB); Paul Marshall Doran, St Helier (GB); Gary Douglas Robb, St Brelades (GB)

(73) Assignee: Dataquill Limited, Tortola (VG)

Reexamination Request:
No. 90/008,394, Feb. 9, 2007

Reexamination Certificate for:
Patent No.: 7,139,591
Issued: Nov. 21, 2006
Appl. No.: 10/869,215
Filed: Jun. 15, 2004

(*) Notice: This patent is subject to a terminal disclaimer.

Related U.S. Application Data

(63) Continuation of application No. 09/548,565, filed on Apr. 13, 2000, now abandoned, which is a continuation of application No. 08/619,682, filed as application No. PCT/GB94/02101 on Sep. 27, 1994, now Pat. No. 6,058,304.

(30) Foreign Application Priority Data

Oct. 13, 1993 (GB) .......................................... 9321133.2

(51) Int. Cl.
*H04B 1/38* (2006.01)

(52) U.S. Cl. .................. 455/557; 455/422.1; 455/556.1; 235/462.46; 235/472.02

(58) Field of Classification Search ........................ None
See application file for complete search history.

(56) References Cited

U.S. PATENT DOCUMENTS

| | | |
|---|---|---|
| 3,810,101 A | 5/1974 | Avery |
| 3,906,166 A | 9/1975 | Cooper |
| 3,956,740 A | 5/1976 | Jones et al. |
| 4,004,133 A | 1/1977 | Hannan et al. |
| 4,016,542 A | 4/1977 | Azure |

(Continued)

FOREIGN PATENT DOCUMENTS

| | | |
|---|---|---|
| DE | 2739157 A1 | 3/1979 |
| DE | A-3814728 A1 | 11/1989 |
| DE | A-4109482 A1 | 9/1992 |
| EP | 0094571 A3 | 11/1983 |
| EP | 0 149 762 A1 | 7/1985 |

(Continued)

OTHER PUBLICATIONS

"Always in Touch: The EO Personal Computer 440", undated, Bates Stamped p. HSD0004018.

EO, Inc, Letter to D. Beaufait, California Wireless, Inc., Mar. 22, 1993, "Own Your Own Personal Communicator 440", Bates Stamped pp. HSD004019-4020.

GO Corporation, "Penpoint Communications Technology Benefits Study", Draft Discussion Outline, Nov. 12, 1992, Bates Stamped pp. HSD0004021-4066.

(Continued)

*Primary Examiner*—Roland G. Foster

(57) ABSTRACT

A data entry system includes a hand held data entry unit having a reading sensor for sensing commands and/or data, rewritable storage for storing information relating to selectable items, a controller (a microprocessor or other processing circuitry) and a display screen for displaying a user readable representation of the commands and/or stored information for a selected item, and a telecommunication interface for the telephonic transmission of information relating to a selected item or items from the storage to a remote processing center and for the telephonic information relating to selectable items from the remote processing center to the storage. Preferably a telecommunications interface is provided in the hand held unit for cellular or other wireless telephony systems. The hand held unit can be configured to combine the data entry functions with those of audio telephony.

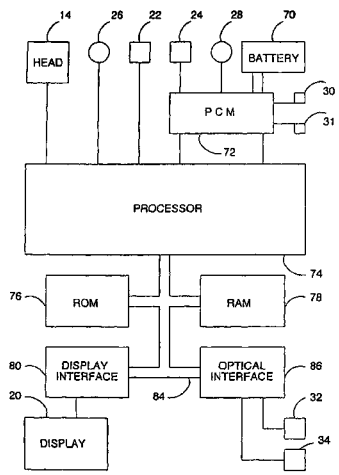

U.S. PATENT DOCUMENTS

| | | |
|---|---|---|
| 4,071,697 A | 1/1978 | Bushnell et al. |
| 4,153,937 A | 5/1979 | Poland |
| 4,241,409 A | 12/1980 | Nolf |
| 4,251,798 A | 2/1981 | Swartz et al. |
| RE30,671 E | 7/1981 | Poland |
| 4,279,021 A | 7/1981 | See et al. |
| 4,295,181 A | 10/1981 | Change et al. |
| 4,399,331 A | 8/1983 | Brown et al. |
| 4,415,065 A | 11/1983 | Sandstedt |
| 4,482,802 A | 11/1984 | Aizawa et al. |
| 4,490,853 A | 12/1984 | Nally et al. |
| 4,503,288 A | 3/1985 | Kessler |
| 4,545,023 A | 10/1985 | Mizzi et al. |
| 4,569,421 A | 2/1986 | Sandstedt |
| 4,575,621 A | 3/1986 | Dreifus |
| 4,587,630 A | 5/1986 | Straton et al. |
| 4,591,974 A | 5/1986 | Dornbush et al. |
| 4,607,156 A | 8/1986 | Koppenaal et al. |
| 4,621,189 A | 11/1986 | Kumar et al. |
| 4,622,437 A | 11/1986 | Bloom |
| 4,653,086 A | 3/1987 | Laube |
| 4,654,514 A | 3/1987 | Watson et al. |
| 4,654,867 A | 3/1987 | Labedz et al. |
| 4,697,281 A | 9/1987 | O'Sullivan |
| 4,706,090 A | 11/1987 | Hasiguchi et al. |
| 4,712,242 A | 12/1987 | Rajasekaran et al. |
| 4,724,521 A | 2/1988 | Carron et al. |
| 4,725,694 A | 2/1988 | Auer et al. |
| 4,725,977 A | 2/1988 | Izumi et al. |
| 4,731,726 A | 3/1988 | Allen |
| 4,734,858 A | 3/1988 | Schlafy |
| 4,757,022 A | 7/1988 | Shults |
| 4,760,387 A | 7/1988 | Ishii |
| 4,775,928 A | 10/1988 | Kendall et al. |
| 4,776,003 A | 10/1988 | Harris |
| 4,777,646 A | 10/1988 | Harris |
| 4,785,420 A | 11/1988 | Little |
| 4,800,255 A | 1/1989 | Imran |
| 4,800,505 A | 1/1989 | Axelrod et al. |
| 4,803,652 A | 2/1989 | Maeser et al. |
| 4,805,134 A | 2/1989 | Calo et al. |
| 4,806,742 A | 2/1989 | Swartz et al. |
| 4,812,843 A | 3/1989 | Champion et al. |
| 4,816,660 A | 3/1989 | Swartz et al. |
| 4,816,904 A | 3/1989 | McKenna et al. |
| 4,823,311 A | 4/1989 | Hunter et al. |
| 4,825,057 A | 4/1989 | Swartz et al. |
| 4,831,647 A | 5/1989 | D'Avello et al. |
| 4,835,372 A | 5/1989 | Gombrich et al. |
| 4,835,374 A | 5/1989 | Swartz et al. |
| 4,837,800 A | 6/1989 | Freeburg et al. |
| 4,845,350 A | 7/1989 | Shepard et al. |
| 4,845,658 A | 7/1989 | Gifford |
| 4,845,740 A | 7/1989 | Tokuyama et al. |
| 4,850,003 A | 7/1989 | Huebeck et al. |
| 4,850,009 A | 7/1989 | Zook et al. |
| 4,857,713 A | 8/1989 | Brown |
| 4,882,757 A | 11/1989 | Fisher et al. |
| 4,885,574 A | 12/1989 | Negishi et al. |
| 4,885,580 A | 12/1989 | Noto et al. |
| 4,887,265 A | 12/1989 | Felix |
| 4,894,523 A | 1/1990 | Chadima, Jr. et al. |
| 4,896,026 A | 1/1990 | Krichever et al. |
| 4,897,532 A | 1/1990 | Swartz et al. |
| 4,907,264 A | 3/1990 | Seiler et al. |
| 4,914,732 A | 4/1990 | Henderson et al. |
| 4,916,411 A | 4/1990 | Lymer |
| 4,916,441 A | 4/1990 | Gombrich |
| 4,924,462 A | 5/1990 | Sojka |
| 4,927,986 A | 5/1990 | Daly |
| 4,928,300 A | 5/1990 | Ogawa et al. |
| 4,947,028 A | 8/1990 | Gorog |
| 4,961,043 A | 10/1990 | Koenck |
| 4,965,821 A | 10/1990 | Bishop et al. |
| 4,969,830 A | 11/1990 | Daly et al. |
| 4,972,457 A | 11/1990 | O'Sullivan |
| 4,974,170 A | 11/1990 | Bouve et al. |
| 4,983,318 A | 1/1991 | Matsumoto et al. |
| 4,991,197 A | 2/1991 | Morris |
| 4,991,199 A | 2/1991 | Parekh et al. |
| 4,995,402 A | 2/1991 | Smith |
| 5,003,164 A | 3/1991 | Barkan |
| 5,003,472 A | 3/1991 | Perrill |
| 5,008,927 A | 4/1991 | Weiss et al. |
| 5,008,952 A | 4/1991 | Davis et al. |
| 5,019,764 A | 5/1991 | Chang |
| 5,019,974 A | 5/1991 | Beckers |
| 5,020,090 A | 5/1991 | Morris |
| 5,020,135 A | 5/1991 | Kasparian et al. |
| 5,021,640 A | 6/1991 | Muroi |
| 5,021,642 A | 6/1991 | Chadima, Jr. et al. |
| 5,023,438 A | 6/1991 | Wakatsuki et al. |
| D317,910 S | 7/1991 | Hawkins et al. |
| 5,029,183 A | 7/1991 | Tymes |
| 5,031,098 A | 7/1991 | Miller et al. |
| 5,031,119 A | 7/1991 | Dulaney et al. |
| 5,046,082 A | 9/1991 | Zicker et al. |
| 5,046,084 A | 9/1991 | Barrett et al. |
| 5,047,614 A | 9/1991 | Bianco |
| 5,047,617 A | 9/1991 | Shepard et al. |
| 5,055,660 A | 10/1991 | Bertagna et al. |
| 5,059,778 A | 10/1991 | Zouzoulas et al. |
| 5,065,003 A | 11/1991 | Wakatsuki et al. |
| 5,067,164 A | 11/1991 | Denker et al. |
| 5,068,838 A | 11/1991 | Klausner et al. |
| 5,070,536 A | 12/1991 | Mahany et al. |
| 5,075,538 A | 12/1991 | Swartz et al. |
| 5,077,784 A | 12/1991 | Fujita et al. |
| 5,080,456 A | 1/1992 | Katz et al. |
| 5,081,343 A | 1/1992 | Chadima, Jr. et al. |
| 5,095,197 A | 3/1992 | Chadima, Jr. et al. |
| 5,095,503 A | 3/1992 | Kowalski |
| 5,095,538 A | 3/1992 | Durboraw |
| 5,100,098 A | 3/1992 | Hawkins |
| 5,101,439 A | 3/1992 | Kiang |
| 5,103,080 A | 4/1992 | Barkan |
| 5,107,100 A | 4/1992 | Shepard et al. |
| 5,110,226 A | 5/1992 | Sherman et al. |
| 5,111,498 A | 5/1992 | Guichard et al. |
| 5,117,098 A | 5/1992 | Swartz |
| 5,122,914 A | 6/1992 | Hanson |
| 5,123,064 A | 6/1992 | Hacker et al. |
| 5,125,039 A | 6/1992 | Hawkins |
| 5,126,545 A | 6/1992 | Barkan |
| 5,127,041 A | 6/1992 | O'Sullivan |
| 5,128,776 A | 7/1992 | Scorse et al. |
| 5,130,520 A | 7/1992 | Shepard et al. |
| 5,133,076 A | 7/1992 | Hawkins et al. |
| 5,133,081 A | 7/1992 | Mayo |
| RE34,034 E | 8/1992 | O'Sullivan |
| 5,136,147 A | 8/1992 | Metlitsky et al. |
| 5,138,140 A | 8/1992 | Siemiatkowski et al. |
| 5,142,550 A | 8/1992 | Tymes |
| 5,144,119 A | 9/1992 | Chadima, Jr. et al. |
| 5,144,121 A | 9/1992 | Chadima, Jr. et al. |
| 5,157,687 A | 10/1992 | Tymes |
| 5,161,248 A | 11/1992 | Bertiger et al. |
| 5,168,148 A | 12/1992 | Giebel |
| 5,171,977 A | 12/1992 | Morrison |
| 5,173,691 A | 12/1992 | Sumner |
| 5,182,441 A | 1/1993 | Chadima, Jr. et al. |

| Patent | Date | Inventor |
|---|---|---|
| 5,184,314 A | 2/1993 | Kelly et al. |
| 5,187,353 A | 2/1993 | Metlitsky et al. |
| 5,187,355 A | 2/1993 | Chadima, Jr et al. |
| 5,187,356 A | 2/1993 | Chadima, Jr. et al. |
| 5,187,805 A | 2/1993 | Bertiger et al. |
| 5,189,287 A | 2/1993 | Parienti |
| 5,189,291 A | 2/1993 | Siemiatkowski |
| 5,189,356 A | 2/1993 | Rovner |
| 5,189,632 A | 2/1993 | Paajanen et al. |
| 5,195,130 A | 3/1993 | Weiss et al. |
| 5,195,183 A | 3/1993 | Miller et al. |
| 5,196,683 A | 3/1993 | Marom et al. |
| 5,198,651 A | 3/1993 | Barkan et al. |
| 5,200,913 A | 4/1993 | Hawkins et al. |
| 5,201,067 A | 4/1993 | Grube et al. |
| 5,202,825 A | 4/1993 | Miller et al. |
| 5,208,446 A | 5/1993 | Martinez |
| 5,212,628 A | 5/1993 | Bradbury |
| 5,216,233 A | 6/1993 | Main et al. |
| 5,218,187 A | 6/1993 | Koenck et al. |
| 5,218,188 A | 6/1993 | Harrison |
| 5,218,191 A | 6/1993 | Chadima, Jr. et al. |
| 5,221,838 A | 6/1993 | Gutman et al. |
| 5,222,138 A | 6/1993 | Balabon et al. |
| 5,225,822 A | 7/1993 | Shiraishi |
| 5,227,614 A | 7/1993 | Danielson et al. |
| 5,227,802 A | 7/1993 | Pullman et al. |
| 5,227,863 A | 7/1993 | Bilbrey |
| 5,233,172 A | 8/1993 | Chadima, Jr. et al. |
| 5,233,502 A | 8/1993 | Beatty et al. |
| 5,241,488 A | 8/1993 | Chadima, Jr. et al. |
| 5,243,452 A | 9/1993 | Baur |
| 5,247,162 A | 9/1993 | Swartz et al. |
| 5,248,929 A | 9/1993 | Burke |
| 5,249,218 A | 9/1993 | Sainton |
| 5,250,789 A | 10/1993 | Johnsen |
| 5,250,792 A | 10/1993 | Swartz et al. |
| 5,258,606 A | 11/1993 | Chadima, Jr. et al. |
| 5,260,697 A | 11/1993 | Barrett et al. |
| 5,266,787 A | 11/1993 | Mazz et al. |
| 5,272,323 A | 12/1993 | Martino |
| 5,272,353 A | 12/1993 | Barkan et al. |
| 5,278,487 A | 1/1994 | Koenck |
| 5,280,498 A | 1/1994 | Tymes et al. |
| 5,288,985 A | 2/1994 | Chadima, Jr. et al. |
| 5,289,378 A | 2/1994 | Miller et al. |
| 5,294,782 A | 3/1994 | Kumar |
| 5,294,784 A | 3/1994 | Tooley et al. |
| 5,295,014 A | 3/1994 | Toda |
| 5,297,216 A | 3/1994 | Sklarew |
| 5,301,222 A | 4/1994 | Fujiwara |
| 5,302,813 A | 4/1994 | Goren |
| 5,303,288 A | 4/1994 | Duffy et al. |
| 5,306,899 A | 4/1994 | Marom et al. |
| 5,307,263 A | 4/1994 | Brown |
| 5,307,497 A | 4/1994 | Feigenbaum et al. |
| 5,308,966 A | 5/1994 | Danielson et al. |
| 5,309,500 A | 5/1994 | Koma et al. |
| 5,313,051 A | 5/1994 | Brigida et al. |
| 5,313,053 A | 5/1994 | Koenck et al. |
| 5,317,691 A | 5/1994 | Traeger |
| 5,319,548 A | 6/1994 | Germain |
| 5,322,991 A | 6/1994 | Harrison |
| 5,324,922 A | 6/1994 | Roberts |
| 5,324,925 A | 6/1994 | Koenck et al. |
| 5,327,308 A | 7/1994 | Hanson |
| 5,331,136 A | 7/1994 | Koenck et al. |
| 5,331,137 A | 7/1994 | Swartz |
| 5,331,580 A | 7/1994 | Miller et al. |
| 5,333,116 A | 7/1994 | Hawkins et al. |
| 5,333,176 A | 7/1994 | Burke et al. |
| 5,334,824 A | 8/1994 | Martinez |
| 5,335,170 A | 8/1994 | Petteruti et al. |
| 5,335,276 A | 8/1994 | Thompson et al. |
| 5,337,346 A | 8/1994 | Uchikura |
| 5,337,358 A | 8/1994 | Axelrod et al. |
| 5,339,239 A | 8/1994 | Manabe et al. |
| 5,340,978 A | 8/1994 | Rostoker et al. |
| 5,345,071 A | 9/1994 | Dumont |
| 5,347,115 A | 9/1994 | Sherman et al. |
| 5,347,632 A | 9/1994 | Filepp et al. |
| 5,349,678 A | 9/1994 | Morris et al. |
| 5,353,331 A | 10/1994 | Emery et al. |
| 5,353,334 A | 10/1994 | O'Sullivan |
| 5,359,182 A | 10/1994 | Schilling |
| 5,363,031 A | 11/1994 | Miller et al. |
| 5,367,563 A | 11/1994 | Sainton |
| 5,368,562 A | 11/1994 | Blomquist et al. |
| 5,369,260 A | 11/1994 | Schuessler |
| 5,371,348 A | 12/1994 | Kumar et al. |
| 5,371,858 A | 12/1994 | Miller et al. |
| 5,379,057 A | 1/1995 | Clough et al. |
| 5,392,447 A | 2/1995 | Schlack et al. |
| 5,400,068 A | 3/1995 | Ishida et al. |
| 5,401,944 A | 3/1995 | Bravman et al. |
| 5,402,117 A | 3/1995 | Zijderhand |
| 5,406,491 A | 4/1995 | Lima |
| 5,408,250 A | 4/1995 | Bier |
| 5,410,141 A | 4/1995 | Koenck et al. |
| 5,412,417 A | 5/1995 | Tozuka |
| 5,412,660 A | 5/1995 | Chen |
| 5,418,560 A | 5/1995 | Yasuda |
| 5,418,812 A | 5/1995 | Reyes et al. |
| 5,424,524 A | 6/1995 | Ruppert et al. |
| 5,425,077 A | 6/1995 | Tsoi |
| 5,426,594 A | 6/1995 | Wright et al. |
| 5,434,994 A | 7/1995 | Shaheen et al. |
| 5,436,654 A | 7/1995 | Boyd |
| 5,436,954 A | 7/1995 | Nishiyama et al. |
| 5,442,541 A | 8/1995 | Hube et al. |
| 5,442,783 A | 8/1995 | Oswald et al. |
| 5,444,763 A | 8/1995 | Lazaridis et al. |
| D363,281 S | 10/1995 | Buhrmann |
| 5,457,629 A | 10/1995 | Miller et al. |
| 5,463,305 A | 10/1995 | Koenck |
| 5,463,547 A | 10/1995 | Markowitz et al. |
| 5,465,207 A | 11/1995 | Boatwright et al. |
| 5,465,401 A | 11/1995 | Thompson |
| 5,467,403 A | 11/1995 | Fishbine |
| 5,468,947 A | 11/1995 | Danielson et al. |
| 5,468,949 A | 11/1995 | Swartz et al. |
| 5,475,375 A | 12/1995 | Barrett et al. |
| 5,477,042 A | 12/1995 | Wang |
| 5,478,998 A | 12/1995 | Charych et al. |
| 5,479,441 A | 12/1995 | Tymes |
| 5,485,370 A | 1/1996 | Moss et al. |
| 5,485,505 A | 1/1996 | Norman |
| 5,491,507 A | 2/1996 | Umezawa et al. |
| 5,493,199 A | 2/1996 | Koenck et al. |
| 5,497,339 A | 3/1996 | Bernard |
| 5,504,595 A | 4/1996 | Marom et al. |
| 5,508,599 A | 4/1996 | Koenck |
| 5,517,434 A | 5/1996 | Hanson et al. |
| 5,519,205 A | 5/1996 | Rostoker et al. |
| 5,519,577 A | 5/1996 | Dudas et al. |
| 5,522,089 A | 5/1996 | Kikinis et al. |
| 5,526,481 A | 6/1996 | Parks et al. |
| 5,528,266 A | 6/1996 | Arbeitman et al. |
| 5,528,285 A | 6/1996 | Morikawa et al. |
| 5,528,621 A | 6/1996 | Heiman et al. |
| 5,530,754 A | 6/1996 | Garfinkle |
| 5,537,608 A | 7/1996 | Beatty et al. |

| Patent | Date | Inventor |
|---|---|---|
| 5,541,398 A | 7/1996 | Hanson |
| 5,543,588 A | 8/1996 | Bisset et al. |
| 5,546,538 A | 8/1996 | Cobbley et al. |
| 5,550,646 A | 8/1996 | Hassan et al. |
| 5,550,715 A | 8/1996 | Hawkins |
| 5,550,754 A | 8/1996 | McNelley et al. |
| 5,553,312 A | 9/1996 | Gattey et al. |
| 5,555,443 A | 9/1996 | Ikehama |
| 5,555,459 A | 9/1996 | Kraus et al. |
| 5,568,536 A | 10/1996 | Tiller et al. |
| 5,579,489 A | 11/1996 | Dornier et al. |
| 5,579,535 A | 11/1996 | Orlen et al. |
| 5,584,054 A | 12/1996 | Tyneski et al. |
| 5,585,789 A | 12/1996 | Haneda |
| 5,590,373 A | 12/1996 | Whitley et al. |
| 5,594,470 A | 1/1997 | Meyerson et al. |
| 5,602,854 A | 2/1997 | Luse et al. |
| 5,602,963 A | 2/1997 | Bissonnette et al. |
| 5,606,594 A | 2/1997 | Register et al. |
| 5,612,732 A | 3/1997 | Yuyama et al. |
| 5,617,236 A | 4/1997 | Wang et al. |
| 5,619,684 A | 4/1997 | Goodwin et al. |
| 5,625,673 A | 4/1997 | Grewe |
| 5,634,080 A | 5/1997 | Kikinis |
| 5,640,444 A | 6/1997 | O'Sullivan |
| 5,646,389 A | 7/1997 | Bravman et al. |
| 5,666,530 A | 9/1997 | Clark et al. |
| 5,668,876 A | 9/1997 | Falk et al. |
| 5,675,524 A | 10/1997 | Bernard |
| 5,680,633 A | 10/1997 | Koenck et al. |
| 5,694,546 A | 12/1997 | Reisman |
| 5,706,290 A | 1/1998 | Shaw |
| 5,729,591 A | 3/1998 | Bailey |
| 5,745,559 A | 4/1998 | Weir |
| 5,754,645 A | 5/1998 | Metroka et al. |
| 5,754,655 A | 5/1998 | Hughes et al. |
| 5,761,621 A | 6/1998 | Sainton et al. |
| 5,771,354 A | 6/1998 | Crawford |
| 5,793,957 A | 8/1998 | Kikinis et al. |
| D397,679 S | 9/1998 | Hawkins et al. |
| 5,812,953 A | 9/1998 | Griffith et al. |
| 5,815,142 A | 9/1998 | Allard et al. |
| 5,821,523 A | 10/1998 | Bunte et al. |
| 5,822,230 A | 10/1998 | Kikinis et al. |
| 5,825,732 A | 10/1998 | Arataki |
| 5,835,732 A | 11/1998 | Kikinis et al. |
| 5,845,073 A | 12/1998 | Carlin et al. |
| 5,850,358 A | 12/1998 | Danielson et al. |
| 5,854,985 A | 12/1998 | Sainton et al. |
| 5,866,888 A | 2/1999 | Bravman et al. |
| 5,870,561 A | 2/1999 | Jarvis et al. |
| 5,884,323 A | 3/1999 | Hawkins et al. |
| 5,894,595 A | 4/1999 | Foladare |
| 5,899,855 A | 5/1999 | Brown |
| 5,900,875 A | 5/1999 | Haitani et al. |
| 5,902,988 A | 5/1999 | Durbin |
| 5,932,863 A | 8/1999 | Rathus et al. |
| 5,952,641 A | 9/1999 | Clancy et al. |
| 5,969,698 A | 10/1999 | Richard et al. |
| 6,000,000 A | 12/1999 | Hawkins et al. |
| 6,006,274 A | 12/1999 | Hawkins et al. |
| 6,009,399 A | 12/1999 | Spille |
| 6,016,135 A | 1/2000 | Biss et al. |
| 6,058,304 A | 5/2000 | Callaghan et al. |
| 6,118,939 A | 9/2000 | Nack et al. |
| 6,134,453 A | 10/2000 | Sainton et al. |
| 6,177,950 B1 | 1/2001 | Robb |
| 6,192,255 B1 | 2/2001 | Lewis et al. |
| RE37,141 E | 4/2001 | Bartels |
| D440,542 S | 4/2001 | Hawkins et al. |
| 6,219,681 B1 | 4/2001 | Hawkins et al. |
| 6,295,372 B1 | 9/2001 | Hawkins et al. |
| D449,283 S | 10/2001 | Sipher et al. |
| 6,300,946 B1 | 10/2001 | Lincke et al. |
| 6,317,797 B2 | 11/2001 | Clark et al. |
| 6,330,618 B1 | 12/2001 | Hawkins et al. |
| 6,343,318 B1 | 1/2002 | Hawkins et al. |
| 6,366,935 B2 | 4/2002 | Hawkins et al. |
| 6,371,081 B1 | 4/2002 | Hawkins et al. |
| D457,162 S | 5/2002 | Hawkins et al. |
| D457,526 S | 5/2002 | Hawkins et al. |
| 6,388,870 B1 | 5/2002 | Canova, Jr. et al. |
| 6,388,877 B1 | 5/2002 | Canova, Jr. et al. |
| 6,397,259 B1 | 5/2002 | Lincke et al. |
| 6,442,637 B1 | 8/2002 | Hawkins et al. |
| 6,448,988 B1 | 9/2002 | Haitani et al. |
| D466,115 S | 11/2002 | Hawkins et al. |
| D466,502 S | 12/2002 | Hawkins et al. |
| D466,877 S | 12/2002 | Hawkins et al. |
| D467,235 S | 12/2002 | Hawkins et al. |
| 6,493,464 B1 | 12/2002 | Hawkins et al. |
| 6,516,202 B1 | 2/2003 | Hawkins et al. |
| 6,539,476 B1 | 3/2003 | Marianetti et al. |
| 6,587,700 B1 | 7/2003 | Meins et al. |
| 6,601,111 B1 | 7/2003 | Peacock et al. |
| 6,671,389 B1 | 12/2003 | Marzke et al. |
| 6,687,345 B1 | 2/2004 | Swartz et al. |
| 6,728,786 B2 | 4/2004 | Hawkins et al. |
| 6,755,946 B1 | 6/2004 | Patton et al. |
| 7,505,785 B2 | 3/2009 | Callaghan |
| 2001/0007334 A1 | 7/2001 | Wilz, Sr. et al. |
| 2005/0259797 A1 | 11/2005 | Swartz et al. |

FOREIGN PATENT DOCUMENTS

| | | |
|---|---|---|
| EP | 0149762 A2 | 7/1986 |
| EP | 0 349 430 A2 | 1/1990 |
| EP | 0 486 973 A2 | 5/1992 |
| EP | 0519838 A1 | 12/1992 |
| EP | 0 530 416 A1 | 3/1993 |
| EP | 0536481 A2 | 4/1993 |
| EP | 0 378 775 | 4/1995 |
| EP | 0 651 543 A2 | 5/1995 |
| EP | 97900179.9 | 1/1996 |
| EP | 0 531 645 | 3/1997 |
| EP | 0519838 B1 | 4/1998 |
| GB | 2183071 A | 5/1987 |
| GB | 2202664 A | 9/1988 |
| GB | 2 216 319 A | 10/1989 |
| GB | 2229562 A | 9/1990 |
| GB | 2 246 491 A | 9/1994 |
| GB | 2 289 555 A | 11/1995 |
| JP | 59 198034 | 11/1984 |
| JP | 63-172558 | 7/1988 |
| JP | 63311563 | 12/1988 |
| JP | 01173262 A | 7/1989 |
| JP | 1173262 | 7/1989 |
| JP | 01-276862 | 11/1989 |
| JP | 01-311364 | 12/1989 |
| JP | 1 314462 | 12/1989 |
| JP | 03-074958 | 3/1991 |
| JP | 3-109891 | 5/1991 |
| JP | A-4-17494 | 1/1992 |
| JP | 4-24149 | 2/1992 |
| JP | 04024149 | 2/1992 |
| JP | 04348463 | 12/1992 |
| JP | 05241994 | 9/1993 |
| JP | 06 090309 | 3/1994 |
| JP | 3-1098891 | 6/2008 |
| WO | WO 8707106 A1 | 11/1987 |
| WO | WO 89/04016 A1 | 5/1989 |
| WO | WO 91/00574 A1 | 1/1991 |
| WO | WO 92/14329 A1 | 8/1992 |

| | | |
|---|---|---|
| WO | WO 93/16550 | 8/1993 |
| WO | WO 93/16550 A1 | 8/1993 |
| WO | WO 94/11967 A1 | 5/1994 |
| WO | WO 94/12938 | 6/1994 |

OTHER PUBLICATIONS

EO, Inc., "Industry Briefing EO, AT&T, Matsushita and Marubeni" Oct. 1, 1992, Bates Stamped pp. HSD004067–4116.

EO, Inc., "Personal Communicators At–a–Glance", undated, Bates Stamped pp. HSD0004117–4119.

EO, Inc., "Software Vendors Rally Around EO Personal Communicators", Nov. 4, 1992, Bates Stamped pp. HSD0004120–4122.

"AT&T Easylink Services", undated, Bates Stamped pp. HSD0004123–4124.

GO Corporation, "GO Corp. Announces PenPoint for Hobbit, GO Message Center, and GO Faz on will be available on EO Personal Communicator", Nov. 4, 1992, Bates Stamped pp. HSD0004125–4126.

Pensoft Corporation, "Pensoft Corporation Announces Personal Perspective built into every EO Personal Communicator", Nov. 4, 1992, Bates Stamped pp. HSD0004127–4128.

Notable Technologies, Inc., "Notable Technologies Announces Support for EO: will Produce Applications for Personal Communicators", Nov. 4, 1992, Bates Stamped pp. HSD0004129–4130.

Sitka Corporation, "EO Selects Sitka's Mobile Networking Solutions for New Line of Personal Communicators", Nov. 4, 1992, Bates Stamped pp. HSD0004131–4133.

PenMagic Software Inc., "PenMagic Announces Support for EO Personal Communicators and Hobbit Platform", Nov. 4, 1992, Bates Stamped pp. HSD0004134–4135.

Ink Development Corporation, "Ink Development Announces InkWare™ NoteTaker for EO Personal Communicators", Marked "For Release Nov. 4, 1992", Bates Stamped pp. HSD0004136–4137.

Slate Corporation, Slate Announces Port of PenApps™, Nov. 4, 1992, Bates Stamped pp. HSD0004138–4139.

EO, "Market Convergence", undated, Bates Stamped p. HSD0004140.

EO, "Market Evolution for Personal Communicators", undated, Bates Stamped p. HSD0004141.

EO, Inc., "EO Unveils World's First Personal Communicator's", Nov. 4, 1992, Bates Stamped pp. HSD0004142–4145.

"Introducing the EO Personal Communicator", undated, oversize page, Bates Stamped p. HSD004146.

American Programmer, Inc., "American Programmer", Dec. 1991, Bates Stamped pp. HSD0004147–0004178.

EO Inc., "AT&T EO Personal Communicator", "Third Party Product and Services Catalog", Fall 1993, Bates Stamped pp. HSD0004179–0004204.

EO, Inc., "Exactly what is an EO", pamphlet, oversized pages, Bates Stamped pp. HSD0004205–4206.

"Communication—Anytime, Anywhere", undated, Bates Stamped p. HSD0004207.

EO, Inc., "Lookup Guide to the EO Personal Communicator", Copyright 1992, 1993, Bates Stamped pp. HSD0004208–4532.

EO, Inc., "Connecting With Your EO Cellular Module", Copyright 1992, 1993, Bates Stamped pp. HSD004533–4574.

EO, Inc., "Getting Started With Your EO Personal Communicator", Copyright 1992, 1993, Bates Stamped pp. HSD0004575–4657.

EO, Inc., "The World of Messaging An Introduction to Personal Communicators", Copyright 1992, 1993, Bates Stamped pp. HSD0004658–4731.

EO, Inc., The AT&T EO Travel Guide, Ken Maki, Copyright 1993, Bates Stamped pp. HSD0004732–5290.

AT&T, "High–speed cellular modem for laptops from Paradyne and Nokia", "For Release" Feb. 23, 1993, Bates Stamped pp. HDS0009580–9581.

AT&T, "AT&T, Go, PenStuff, Trimble make 'personal navigators'", "For Release" Jun. 29, 1993, Bates Stamped pp. HSD0009582–9584.

AT&T, "AT&T and EO lower prices for personal communicators", "For Release" Sep. 16, 1993, Bates Stamped pp. HSD0009585–9586.

AT&T, "EO, Inc., will become AT&T's personal communicator company", "For Release" Jun. 1, 1993, Bates Stamped pp. HSD0009587–9589.

Internet: "Chronology of Handheld Computers", 1993–1996, Ken Polson, Copyright 2001–2002, Bates Stamped pp. HSD0012760–0012762.

Internet: "Chronology of Hand Held Computers Sources used for information", undated, Bates Stamped pp. HSD0012763–0012764.

Internet: "Chronology of Handheld Computers", 1972–1992, Ken Polson, Copyright 2001–2002, Bates Stamped pp. HSD0012765–0012768.

Internet: "Evolving PDAs", undated, no author, Bates Stamped p. HSD0012769.

Internet: From On the Go Magazine, Sep. 8, 1993: "Wireless Newton Technology Goes to Work", Copyright 1993, David McNeill, Bates Stamped pp. HSD0012770–0012771.

Internet: From On the Go Magazine, Oct. 13, 1993: "Newton Notes Messaging Card and NewtonMail: We Pick up and deliver", Copyright 1993, David McNeill, Bates Stamped pp. HSD0012772–0012773.

Internet: "Concept development for LCD–Applied Products", notation "(Received Oct. 7, 1997)" on p. 7, Hideki Atarashi and Toshifumi Mizobata, Bates Stampled pp. HSD0012774–0012780.

Internet: "NCR cuts price of 3170 notebook computer 11 to 19 percent", AT&T News Release, "for release Monday Mar. 8, 1993", Bates Stamped pp. HSD0012781–0012782.

EO Incorporated, "EO Cellular Module Programming Instructions for Cellular Service Providers and Resellers", May 13, 1993, Bates Stamped pp. HSD0013223–0013233.

EO(?), page copies "Electronic Serial Number (ESN)", "EO Phone", "Authorized Dealer", "Wireline vs. non–Wireline Provider", all undated, Bates Stamped pp. HSD0013234–0013237.

Individual, Inc., "HeadsUp™ Just the News You Need, Delivered Every Morning to Your AT&T EO Personal Communcator™", undated, Bates Stamped pp. HSD0013238–0013246.

EO, Inc., "EO Personal Communicator 440/880 Technical Note No. 3011, Installing the EO Update 2B on your EO", "TN Date: Dec. 2, 1993", Bates Stamped pp. HSD0013247–0013254.

EO Customer Services, "Tips from our Users", date unclear, Bates Stamped p. HSD0013255.

EO Customer Services, "Tips from our Users", Jun. 9, 1993, Bates Stamped p. HSD0013256.

Symbol Technologies Incorporated, Operator's Guide LRT 3270, Apr. 1992, Bates Stamped pp. SYM00001–00002.

Symbol Technologies Incorporated, "Operator's Guide LRT 46–key 3270 Emulation", Sep. 1992, Bates Stamped pp. SYM00003–00004.

Symbol Technologies Incorporated, "Operator's Guide LRT 46–key 5250 Emulation", Copyright 1992, Bates Stamped pp. SYM00005–00006.

Symbol Technologies Incorporated, "Series 3800 Portable Terminal User's Guide", Oct. 1992, Bates Stamped pp. SYM00007–00008.

Internet: Symbol Technologies Incorporated, "PPT 4100 Series Portable Pen Terminals With Integrated Scanner", Copyright 1994, Bates Stamped pp. SYM00009–00012.

Internet: Symbol Technologies Incorporated, "LRT 3805 Laser Data and LRT 3800 Laser Radio Terminal Series, Integrated Wireless Data Transaction for Scan–Intensive Applications", no Copyright date, Bates Stamped pp. SYM00013–00014.

Symbol Technologies Incorporated, Series 3800 Portable Terminal User's Guide, Copyright 1992, Bates Stamped pp. SYM00015–00016.

Symbol Technologies Incorporated, "User's Guide Cradle Base Unit 3865", Copyright 1991, Bates Stamped pp. SYM00047–00052.

Symbol Technologies Incorporated, "Spread Spectrum Technology, Monograph 7", Fred P. Heiman, Jun. 1991, Bates Stamped pp. SYM00235–00254.

Symbol Technologies Incorporated, "Plain Talk About Spectrum One™", Copyright 1991, Bates Stamped pp. SYM00255–00298.

"*Lotus Sees Software Integration Rise Systems & Network Integration*," Excerpt from News Brief (unknown source), Mar. 16, 1992, p. 6.

"*IBM's TouchMobile Helps Field Workers Collect Data at the Touch of a Finger*", Pr newswire Jan. 26, 1993, 20/04/00, on the Web at www.datastarweb.com, 3 pgs.

Lotus Notes User's Guide, (1989), cover pg., copyright pg. pp. iii–ix, pp. 1–1 to 1–4, pp. 9–1 to 9–17.

"*TouchMobile Solution for Data Capture and Communication*", IBM, Jan. 1993, 13 pgs.

IBM TouchMobile Information and Planning Guide, IBM, Mar. 1993, cover pg., copyright pg., pp. iii–vii, pp. 1 to 11, 2 comment pgs., 2 ending pgs.

"*Mobile Communications*", Informa Publishing Group, Pic., Jul. 29, 1993, 3 pgs. (unnumbered).

"*Apple Reports Strong Early Newton Sales*", United Press International, Sep. 2, 1993, 2 pgs. (unnumbered).

"*The EO 440 and EO 880, Paradigms for Personal Communications*", Smart Computing—editorial, vol. 4 issue 9, Sep. 1993, Internet article, copyright 2001, pgs. Numbered 1–4.

Documents pgs. Numbered 442–445 with pg. leading "*Using the EO as a Fax and EO Phone*", (unknown source document).

Pages of "AT&T EO Personal Communicator The Digital Nomad's Guide," Copyright © 1993, bates No. KY005340–5348.

Rainer Thonnes, Deposition, pp. 1–284, dated Mar. 29, 2005.

"Ailing EO Cuts Workforce in Half," The San Francisco Chronicle, Mar. 10, 1994, numbered PX39–1 to –2.

"AT&t pulls the plug on high–tech EO," The San Francisco Chronicle, Jul. 28, 1994, numbered PX39–3 to –4.

"At&T pulls plug on ambitious EO pen–computing business," Business Journal, San Jose, Aug. 1, 1994, numbered PX39–5 to –6.

Facsimile from Mr. Robb to Mr. Ibbet re microprocessor, etc., Garry D. Robb, dated Sep. 12, 1988, bates No. KYO007130–7146.

Automated Service System, R. Thonnes or J. Johnstone, dated Dec. 14, 1988, bates No. KYO007147–7148.

Automated Service System—A Progress Report, R. Thonnes, dated Jun. 2, 1989, bates No. KYO007151–7153.

Automated Service System, R. Thonnes or J. Johnstone, dated Dec. 14, 1988, bates No. KYO007149–7150.

Barcode Reader, J. Johnstone, dated Sep. 15, 1989, bates No. KYO007154–7155.

"Winfair launches two–way bar code reader," Glasgow Herald, Scotland, dated Aug. 25, 1992, bates No. KYO006926–6927; KYO008809; EX09–169.

Notes from Rainer Thonnes to Paul Doran re modifications and barcodes, Mar. 9, 1995, bates No. DQ01304–1308.

"AT&T EO 440 Personal Communicator available in Phone Centers," dated Jun. 30, 1993 and Jul. 3, 2001, bates No. EX30, BFI 001705–06.

"Personal digital assistants win a hand,"Computer Line, dated Sep. 28, 1993, numbered EX30–368–69.

Business, San Diego Tribune, dated Sep. 17, 1993, numbered EX30–370–71.

Copyright Certificate of Registration "AT&T EO Personal Communicator: The Digital Nomad's Guide," dated Jul. 5, 1994, numbered EX31–372–373.

Pages of "AT&T EO Personal Communicator The Digital Nomad's Guide," Copyright © 1993, numbered, EX32, EX32–374 to –395; KYO005340–5342.

Behind the Wheel of the First Zoomer and Newton PDAs, Byte, Sep. 1993, bates No. EX33, KYO005919–5921.

Advertisement, Casio Zoomer, Los Angeles Times, Oct. 10, 1993, bates No. EX34–399 to –401, KYO007390–91.

"The Wireless Factor," Byte, Oct. 1993, bates No. KYO005890.

"EO's Personal Communicator Ushers In a New Era," Byte, Mar. 1993, bates No. KYO005917.

"State of the Art Client/Server Frees Data," Byte, Jun. 1993, bates No. KYO005918.

"PDAs Arrive But Aren't Quite Here Yet," Byte, Oct. 1993, bates No. KYO005898–900.

"Some Computer Science Issues in Ubiquitous Computing," pp. 75–85, Communications of the ACM, Jul. 1993, bates No. KYO009071–82.

Excerpts of "IBM's Personal Computer," Que Corporation, Copyright © 1982, bates No. KYO009116–21.

"The Complete Error Free System to Save Your Company Time and Money", Winfair Systems (Scotland) Limited, 1992, bates No. EX35–402–403; DQ00914–15; DQ00916–17; DQ02417–18; DQ02409–10; AT000003–4.

Letter from Office of the Chief Advisor to the States, States of Jersey, Oct. 26, 1993, bates No. DQ02149–50.

Business plan, RHS/BTS/DataQuill, bates No. DQ01969–2011.

Memo., Communication Protocol Revised Specification of DataQuill/Computer, DataQuill, R. Thonnes, Apr. 2, 1992, bates No. DQ00331–34; DQ02405–06.

DataQuill System I Serial and Modem Versions User Manual, DataQuill Limited, bates No. DQ02330–59.

Dataquill User Manual, partial, bates No. DQ00544–57.

Type Examination Certificate No. BABT/95/2886, British Approvals Board for Telecommunications, dated Aug. 21, 1995, bates No. DQ02242–44.

Production Quality Assurance Approval No. 0736, British Approvals Board for Telecommunications, dated Jul. 31, 1995, bates No. DQ02246–47, 48.

DataQuill Patent Protected System, DataQuill Ltd., 1995, bates No. DQ03393–94.

"Barcode pens keep stock of business," Sunday Times, Jun. 18, 1995, bates No. DQ01159.

"Worth Watching," Della Bradshaw, Financial Times, dated Aug. 4, 1994, bates No. DQ00377.

"Surprise AOL Wins," Fortune, dated Mar. 30, 1998, bates No. DQ00071–79.

Invoice re Consultancy Services of Dr R Thonnes, Department of Computer Science—Apr. & May 1993, dated Jul. 22, 1993, bates No. DQ00092.

The Bar Code Color Book, Symbology Inc., Table 4 continued, Feb. 2, 1989, bates No. DQ01034–39.

UPC Check Digit Calculation [etc.], Symbology Ltd, © Copyright 1991, bates No. DQ01040–46.

PENpal, Reader Software for the Datawand Barcode, bates No. DQ01056.

Telxon Application Story, Telxon Limited, bates No. DQ01760–62.

Fax transmission, Telxon Limited, dated Jul. 7, 1993, bates No. DQ01759.

Text systems, Text Systems Ltd, Sep. 28, 1993, bates No. DQ01889–94.

SDT Nouveau terminal de saisie de donnees, Symbol Technologies Inc., 1990, bates No. DQ01895–96.

PDT Plus Portable Data Collection Terminal, Symbol Technologies Inc., 1990, bates No. DQ1897–98.

"The pen is mightier . . . ", Automatic I.D. News Europe, Jun. 1995, bates No. DQ02291–92.

Bar Code Symbologies, pp. 11–18, 27–28, bates No. DQ02419–26, DQ02443–44.

Telxon Portable 24–Column Microprinter, Telxon Limited, © Copyright 1984, bates No. DQ02451–52.

"The Global System for Mobile Communication," M. Mouly, Copyright © 1992, excerpts, cover pages, pp. 67–71.

Photograph, the "Dataquill" in action, Winfair Systems, bates No. ORK000001–2 (produced by Jan Orkisz).

Notes re "Scan Tech. Jun. 23", bates No. ORK000003.

Memo., Winfair Systems (Scotland) Limited, Feb. 26, 28, 1992, bates No. ORK000004–9.

Memo., Winfair Systems (Scotland) Limited, 1992, bates No. ORK000010–16.

Dataquill projected sales for 1992, Winfair Systems (Scotland) Limited, 1992, bates No. ORK00017.

Meeting agenda, Winfair Systems (Scotland) Limited, Aug. 3, 1992, bates No. ORK000018.

Notes, Winfair Systems (Scotland) Limited, bates No. ORK000019–20.

Minutes of meeting held, Winfair Systems (Scotland) Limited, Jul. 14, 1992, bates No. ORK000021–22.

Dataquill specification, Winfair Systems (Scotland) Limited, bates No. ORK000023.

Letter to Winfair Systems (Scotland) Ltd. from Jan K. Orkisz, Winfair Systems (Scotland) Limited, Sep. 7, 1992, bates No. ORK000024.

Overdraft guarantee, Winfair Systems (Scotland) Limited, Mar. 2, 1992, produced by Jan Orkisz.

Share Certificate, Winfair Systems (Scotland) Limited, May 28, 1992, bates No. AT000001.

1988 CCITT Blue Book, www.nmedia.net/docs/ccitt/1988, Feb. 9, 2005, bates No. KYO005562–67.

Matrix Bar Code Symbologies, www.aimglobal.org/aim-store/matrixsymbologies.htm, Mar. 23, 2005, bates No. KYO005672–74.

"Sharp's Non–Newtonian PDA," Byte, dated Oct. 1993, bates No. KYO005884–89.

"The future of pen computing," Byte, dated Mar. 1992, bates No. KYO005894, pp. 115–116, 118.

"Ease of use is relative," Byte, dated Oct. 1993, bates No. KYO005901–04.

"Rough Gems: first pen systems show promise, lack refinement," Byte, dated Apr. 1992, bates No. KYO005905–10.

What's New Systems, Byte, dated Jan. 1992, bates No. KYO005897.

Dataquill 1 Prototype, Winfair Systems Ltd., bates No. AT000005.

Memo., Requirements for Cherry International, Winfair Systems Ltd., bates No. AT000006–07.

Tait to Grange Galleries, Winfair Systems Ltd., Jul. 27, 1992, bates No. AT000008–09.

Item Systems fax to Winfair Systems Ltd., Jun. 17, 1992, bates No. AT000010.

Fax from Jan Orkisz, Winfair Systems, Jun. 19, 1992, bates No. AT000011.

Brief Specification of the DataQuill, R. Thonnes, 1995 or 1996, bates No. DQ02407.

Memo. re DataQuill specification, dated Sep. 10, 1993, bates No. DQ00094–97.

Note from R. Thonnes to G. Robb, dated Oct. 19, 1993, bates No. DQ02088.

Gupta carving niche in PC LAN development; local area network; Company Profile, Software Magazine, vol. 13; No. 4; p. 118, dated Mar. 1993.

Modeling transaction integrity: how CASE tools illustrate the relationships between transactions and data; computer–aided software engineering; Application Stretegies; Tutorial, DBMS, vol. 6; No. 1; p. 62, dated Jan. 1993.

Using stored procedures and triggers; Application Strategies; Tutorial, DBMS, vol. 5; No. 10; p. 66, dated Sep. 1992.

The goal: a real network; how the testing methodology for the servers was created; includes related article on Structured Query Language Statements; What's the Right Size?, Corporate Computing, vol. 1; No. 1; p. 133, dated Jun. 1992.

The future of pen computing, Part 2, Byte, dated Apr. 1992, bates No. KYO005891–93.

Wireless Mobile Communications, Byte, Feb. 1993, pp. 147–154, bates No. KYO009061–67.

*DataQuill Ltd.* v. *Kyocera Wireless Corp.*, United States District Court for the Southern District of California, Certificate of translation of JP 1 314462, dated Dec. 19, 1989 produced by Kyocera Wireless, dated Apr. 20, 2005, bates No. KYO009043.

Telnet protocol specification, Network Working Group, dated May 1983, bates No. KYO009044–60.

Responsive Office Environments, Communications of the ACM, dated Jul. 1993, pp. 84–85, bates No. KYO009071–72.

Some Computer Science issues in Ubiquitous Computing, Communications of the ACM, dated Jul. 1993, pp. 75–84, bates No. KYO009073–82.

*DataQuill Ltd.* v. *Kyocera Wireless Corp.*, United States District Court for the Southern District of California, Photographs produced by Kyocera Wireless Corp., bates No. KYO009234–53.

One chip to bind all cell phone functions, CNET News.com, dated May 4, 2005, bates No. KYO009236.

The Single Chip Cellphone—Not just talk anymore, www.abiresearch.com/products/insight, dated Feb. 28, 2005, bates No. KYO009237–38.

Qualcomm announces single chip Mobile Station Modem ASIC, Business Wire, Inc., Business Wire, dated Mar. 2, 1993.

Firmware for Dataquill hand held bar code reader unit, R. Thonnes, Univ. of Edinburgh, ver. Jan. 8, 1992, KYO007016–66; ex. D–71.

U.S. Appl. No. 08/111,531, copy dated Dec. 23, 2004, bates No. KYO006748–80.

Communications get personal, Byte, dated Feb. 1993, bates No. KYO005911–16, pp. 169–170, 172, 174, 176–177.

Handwritten notes, dated Apr. 26, 1993 [RT0000003; DX 1952].

Letter from G. Robb to R. Thonnes re return of EPROM OTP; Fax message from Thonnes to Callaghan re contacts in Paisley, dated Jun. 8, 1993 [RT000004–RT000005; DX 1953].

Fax message from R. Thonnes to Don Anderson (ATC Systems), dated Jan. 29, 1996 [RT000006–RT000006; DX 1954].

Letter from P.W. Michel to R. Thonnes, dated Jan. 26, 1996 [RT000008; DX 1955].

Handwritten notes and drawings, dated Feb. 1, 1995 [RT000009–RT000010; DX 1956].

Portions of draft article with handwritten notes, dated Feb. 29, 1995 [RT000023–RT000026; DX 1958].

Letter from G. Robb to R. Thonnes with attached article by John Vellam, dated Mar. 3, 1995 [RT000027–RT000032; DX 1959].

Fax from G. Robb to R. Thonnes with handwritten notes, dated Jul. 26, 1995 [RT000033–RT00034; DX 1960].

Fax from Doran to Thonnes with attached fax from Simon Taylor to Doran (Jul. 12, 1995) re modem data throughput, dated Jul. 17, 1995 [RT000035–RT000038; DX 1961].

Abstract re the Address Decoding Scheme used in the DataQuill Barcode Reader Pen, R. Thonnes, Nov. 1995 [RT000039–RT00040; DX 1962].

Schematic of DataQuill CPU board, RWT, dated Feb. 1, 1995 [RT000041–RT000043; DX 1963].

Delivery/shipping form for Pen Motherboard, ATCS, dated Jan. 9, 1995 [RT000044; DX 1964].

Fax message from R. Thonnes to Don Anderson ATCS, dated Sep. 6, 1995 [RT000045; DX 1965].

Fax message from G. Robb to R. Thonnes re questions from marketing department, DataQuill Ltd., dated Jul. 11, 1995 [RT000046; DX 1966].

Fax message from R. Thonnes to Jim Campbell, dated Aug. 29, 1995 [RT000047; DX 1967].

Memorandum, dated Aug. 1995 [RT000049; DX 1968].

List of Setups for Rockwell RC2324ACE Modem, dated Aug. 29, 1995 [RT000050; DX 1969].

Fax message from G. Robb to R. Thonnes sending modem settings on DQ, dated Aug. 3, 1995 [RT000051–RT000052; DX 1970].

Letter from R. Thonnes to Reg Brailey, dated May 25, 1995 [RT000057–RT000058; DX 1971].

Fax from R. Thonnes to P. Doran, DataQuill Ltd., dated Apr. 25, 1995 [RT000059; DX 1972].

Fax from P. Doran to R. Thonnes to Doran, dated Jan. 27, 1995 [RT000060–RT000065; DX 1973].

Specification of DataQuill Computer Communications Protocol, DataQuill Ltd., R. Thonnes, dated Apr. 2, 1992 as revised in Feb. 1, 1995 [RT000066–RT000069; DX 1974].

Note from F. Callaghan to R. Thonnes with attached letter from instaspect, DataQuill Ltd., dated Apr. 27, 1995 [RT000070–RT000071; DX 1975].

Iceland (foods) sample bar codes, Instaspect Ltd., dated May 3, 1995 [RT000072–RT000074; DX 1976].

Parts list for DataQuill CPU Board, DataQuill Ltd., dated Jan. 13, 1995 [RT000075–RT000076; DX 1977].

Letter from R. Thonnes to P. Doran, dated Mar. 9, 1995 [RT000077–RT000078; DX 1978].

Fax message from R Brailey to D. Anderson, ATCS, R. Thonnes re circuit diagram & short on C9, dated Feb. 27, 1995 [RT000079–RT000082; DX1979].

Fax message from P. Doran to R. Thonnes re problems, dated Feb. 15, 1995 [RT000083–RT000084; DX 1980].

Letter from G. Robb to R. Thonnes, dated Feb. 16, 1995 [RT000085; DX 1981].

Letter from Kim Robb to R. Thonnes, undated [RT000086; DX 1982].

Artwork / Media dispatch note, Photo Circuits art work, dated Jan. 20, 1995 [RT000087; DX 1983].

Fax message from R. Brailey to R. Thonnes re.REM G. Robb Wand PCB Rev. B 1995 MODS, dated Jan. 23, 1995 [RT000088–RT000096; DX 1984].

Brief Specification of the DataQuill, DataQuill Ltd., dated Jan. 23, 1995 [RT000097; DX 1985].

Message to Jim from PCD Ltd., dated May 29, 1991 [RT000098–RT000103; DX 1986].

Modem XTALS and Associated Capacitors, dated Jul. 8, 1991 [RT0000104; DX 1987].

Parts list for modem version three, dated Sep. 17, 1992 [RT000112–RT000114; DX 1988].

Document: "*DataQuill* v. *Kyocera*, Oversized Document, Feb. 12, 1991 Handheld Unit V2B Barcode Reader sheet 1 of 2 schematic drawing" [RT000115; DX 1989].

Document: "*DataQuill* v. *Kyocera*, Oversized Document: Barcode Reader Modem Card V3 sheet 1 of 3 schematic drawing" [RT000116; DX 1990].

Document: "*DataQuill* v. *Kyocera*, Oversized Document: Barcode Reader Modem Card V3 sheet 2 of 3 schematic drawings" [RT000117; DX 1991].

Document: "*DataQuill* v. *Kyocera*, Oversized Document: Barcode Reader Modem Card Line Interface sheet 3 of 3 schematic drawing" [RT000118; DX 1992].

Document: "*DataQuill* v. *Kyocera*, Oversized Document: Shematic Drawing" [RT000119; DX 1993].

The Potential Market for the DataQuill, prepared by CIT Research for Highlands and Islands Enterprise, dated Feb. 14, 1994 [DQ01003–DQ01026; DX 1694].

Diary notes, G. Robb, dated variously from May 1992 to Sep. 1995 [Def's Ex. 109 (Robb); GR006–GR0115].

Letter from Garry D. Robb to Franklin Wooifson re correspondence, DataQuill Ltd., dated Sep. 8, 1993 [DX 1653; DQ00330].

Magic Cap, *Magic Cap Means Communication*, General Magic Inc., © 1994, pp. 1–56, plus cover and two end pages.

*Motorola's Envoy Personal Wireless Communicator lets you organize your life from almost anywhere . . . with no strings attached.*, Motorola, Inc., © 1994, two pages.

*The Macro Wireless Communicator keeps you in touch, even when you're out of reach*, Motorola, Inc., © 1994, two pages.

*Simon Module Communications Made Simple*, BellSouth, (c) 1993, 11 pages.

The GSM System for Mobile Communications A comprehensive overview of the European Digital Cellular Systems, Cell & Sys. Correspondence, © 1992, 3 cover pages, pp. 56–59, 550–565.

Lieske, Dana, "The EO 440 and EO 880 Mobile Computing Sep. 1993–vol. 4 Issue 9," Smart Computing, 3 pages, Copyright® 2006.

Imielinski, T., et al., "Mobile Wireless Computing: Solutions and Challenges in Data Management," Dept. of Computer Science, Rutgers University, 37 pages, dated.

Sheng, S., "A Portable Multimedia Terminal for Personal Communications," IEEE Communication Magazine, Jun. 22, 1992.

"Vannevar Bush—As we may think—The Atlantic Monthly, Jul. 1945", duchier@ps.uni–sb.de, Bates Nos. RIMDQ0072616–634, printout undated.

J. Arnold, "France's Minitel: 20 years young", http://news.bbc.co.uk/2/hi/business/3012769.stm, Bates Nos. RIMDQ0072635–638, May 14, 2003.

J. Birnbaum, "Toward the domestication of microelectronics", Communications of the ACM, vol. 28, No. 11, pp. 1225–1235, Bates Nos. RIMDQ0072639–649, © 1985.

"Innovation", http://www.eguide.asso.fr/uk/guide/connaitre/culture/, Bates No. RIMDQ0072659, printout updated.

"Sharp PC–6220. (notebook computer)(evaluation) Compute! Issue 133/ Sep. 1991/ p. 45", Bates Nos. RIMDQ0072660–662, printout undated.

"Milestones in the development of the internet and its significance for education", http://www.originami.com/sp/milestones.htm, pates 1, 2, Bates Nos. RIMDQ0072663–664, printout undated.

"RIM history", www.rim.com, pp. 1–7, Bates Nos. RIMDQ0072665–671, Research in Motion Limited, © 2004, printout undated.

"Motorola adds Newton technology to mobile data repertoire—Apple Computer Inc Mobile Phone News, Apr. 12, 1983", http://www.looksmartphones.com/p/articles/mi_m3457/is_n14—v11/ai_ . . . , pp. 1, 2, Bates Nos. RIMDQ0072672–673, Gale Group, Copyright 2004, printout undated.

"First–generation PDAs' options, prices and marketing approaches differ–personal digital assistants Mobile Phone News, Aug. 30, 1993", http://www.looksmartphones.com/p/articles/mi_m3457/is_n14_v11/ai_ . . . , pp. 1, 2, Bates Nos. RIMDQ0072674–0072675, Copyright PBI Media 1993, Gale Group, Copyright 2004, printout undated.

"Plugged in Sep. 1993 vol. 4 Issue 9 PDAs The newest assistants for a mobile society", http://www.smartcomputing.com/editorial/article.asp?article=articles/19 . . . , pp. 1 to 4, Bates Nos. RIMDQ0072680–683, Sandhills Publishing Company U.S.A., © 2006, printout undated.

"MobileMath quick reference The newton math assistant", Bates Nos. RIMDQ 0072847–848, MobileSoft Corporation, © 1993.

"Newton fax modem handbook", Bates Nos. RIMDQ0072849–864, Apple Computer, Inc., © 1993.

C. Lu, "A small revolution Newton has arrived at long last", Macworld, pp. 102–105, Sep. 1993, Bates Nos. RIMDQ0081338–341.

L. Press, "Dynabook revisited—Portable computers past, present and future", Communications of the ACM, vol. 35, No. 3, pp. 25–30, 32, Bates Nos. RIMDQ0081342–348.

S. Loken, "Information technology resources assessment", Information and Computing Science Division Lawrence Berkley Laboratory, Bates Nos. RIMDQ0081349–415, Jan. 1993.

C. Barr, "Pen PCs", PC Magazine, Nov. 10, 1992, pp. 175–203, Bates Nos. RIMDQ0081416–433.

Duchamp, Feiner, Maguire, "Software technology for wireless mobile computing", IEEE Network Magazine, Nov. 1991, pp. 12–18, Bates Nos. RIMDQ0081434–440, © 1991.

E. Torgan, "New & Improved", PC Magazine, May 12, 1992, p. 59, Bates No. RIMDQ0082406.

M. Soviero, "Your world according to Newton", Popular Science, Sep. 1992, pp. 45–49, Bates Nos. RIMDQ0082407–411.

"The PC gets more personal", Byte, Jul. 1992, pp. 128–138, Bates Nos. RIMDQ0082412–421.

"Grid systems releases the palmpad wearable pen computer Mar. 23, 1992 From Issue No. 1886", http://www.cbr-online.com/article_cg_print.asp?guid=AA91FF24–97 . . . , Bates No. RIMDQ0082422, Computer Business Review & CBRonline.com, © 2007, printout Jun. 12, 2007.

"Novice notes Each month Jul. 1992, vol. 3, Issue 7", http://www.smartcomputing/com/editorial/article.asp?article=articles . . . , pp. 1, 2 Bates Nos. RIMDQ0082423–424, printout Jun. 12, 2007.

"Grid dresses up pen computer—Grid systems corp.'s Palm-PAD—Product announcement", http://findarticles/com/p/articles/mi_m0NEW/is_1992_March_20/ai . . . , pp. 1, 2, Bates Nos. RIMDQ0082425–426, Findarticles, Copyright 2007, printout Jun. 12, 2007.

M. Weiser, "Computer for the 21st century", Mobile Computing and Communication Review, vol. 3, No. 3, pp. 3–11, Bates Nos. RIMDQ0082427–435, Copyright 1991.

"DrawPad technical drawing tool", Bates Nos. RIMDQ0082787–800, Starcore, document undated.

"DynoNotePad", Bates Nos. RIMDQ0082801–813, Portfolio Software, Inc., © 1994, cover pages, pp. 1–20.

"MessagePad handbook", Bates Nos. RIMDQ0082814–931, Apple Computer, Inc., © 1993, cover pages, pp. 1–223, end pages.

"MessagePad setup guide", Bates Nos. RIMDQ0082932–949, Apple Computer, Inc., © 1993, cover pages, pp. 1–26.

"Newton connection kit for Macintosh user's guide", Bates Nos. RIMDQ0082590–029, Apple Computer, Inc., © 1993, cover pages, pp. 1–71, end pages.

File history pages of 6,009,399, Bates Nos. RIMDQ0072680–820.

Sheng, Chandrakasan, Brodersen, "A portable multimedia terminal", IEEE Communications Magazine, Dec. 1992, pp. 64–75, Bates Nos. RIMDQ0082394–405, IEEE, © 1992.

"Personal computer in the year 2000", Bates No. RIMDQ0072650, document undated.

Mel, Omohundro, Robison, Skiena, Thearling, Young, Wolfram, "Tablet: Personal computer in the year 2000", ACM, vol. 31, No. 6, pp. 639–646, Bates Nos. RIMDQ0072651–658, © 1988.

Imielinski, T., et al., "Mobile Wireless Computing: Solutions and Challenges in Data Management," Rutgers University, Jan. 1993, report cover page with business card, report cover page, pp. 1–37, back cover page.

Imielinski, T., et al., "Mobile Wireless Computing: Solutions and Challenges in Data Management," Rutgers University, Jan. 1993, RIMDQ 08325–73, and 1 page sheet RIMDQ 08374, produced by Rim with RIMDQ 08325–73.

"AT&T EO Personal Communicator The Digital Nomad's Guide," copyright © 1993, RIMDQ 083275–551, see also document C67.

"The Official Guide to the Prodigy Service," © 1991, RIMDQ 084125–526, see also document C142.

"Teklogix 32 Bit Terminal User Manual," copyright 1993, Teklogix Inc., Missisauga, Ont., Bates Nos. RIMDQ0089999–90118.

"7000 series Teklogix," RIMDQ 0090119–124.

Published patent application US2007/0194127, Bates Nos. RIMDQ 0090283–307.

Stieglitz, "Industry Dynamics and Types of Market Convergence," First Draft, dated May 9, 2002, Bates Nos. RIMDQ0091160–200.

Company documents, Winfair Systems, 1992 and later, RIMDQ 0097194–234.

"Special Report, Your Electronic Future," Newsweek, Jun. 6, 1994, DQ01829–86.

S. Alagar et al., Tolerating Mobile Support Station Failures, pp. 1–12, RIMDQ 0109788–109799, undated.

B. Badrinath, Impact of Mobility on Distributed Computations, Operating Systems Review, 8 pages, RIMDQ 0107344–107351, Apr. 1993.

Collection of Euro–Log documents, European Logistics Commmunication Services, Bates Nos. RIMDQ0055493–498, source/country unknown, documents undated.

Forman & Zahorjan, "Computing Milieux, The Challenge of Mobile Computing", IEEE [no vol. no.], © 1994, Bates Nos. RIMDQ0057331–340.

"Bell South, IBM unveil personal communicator phone Mobile Phone News, Nov. 8, 1993", http://www.looksmart-phones.com/p/articles/mi_m3457/is_n43_v11/ai_ . . . , pp, 1, 2, Bates Nos. RIMDQ0057550–0057551.

"IBM plans to ship Simon put on hold for time being—hand–help personal communicator Mobile Phone News, Apr. 4, 1994", http://www.findarticles.com/p/articles/mi_m3457/is_n14_v12/ai_14973288, pp. 1, 2, Bates No. RIMDQ0057552–0057553, FindArticles, © 2006.

"BellSouth puts Simon on the shelves: personal communicator five months late—BellSouth Cellular Corp—Product Announcement Mobile Phone News, Aug. 22, 1994", http://www.findarticles.com/p/articles/mi_m3457/is_n14_v12/ai_15770310, pp. 1, 2, Bates No. RIMDQ0057569–0057570, Gale Group, Copyright 2004.

"Simonizing the PDA Dec. 1994/ Reviews/ Simonzing the PDA BellSouth's communicative Simon is a milestone in the evolution of the PDA", http://www.byte.com/art/9412/sec11/art3.htm, pp. 1, 2, Bates No. RIMDQ0057571–0057574, CMP Media LLC, © 2005.

Noble and Satyanarayanan, "A Research Status Report on Adaptation for Mobile Data Access", School of Computer Science, Bates No. RIMDQ0057662–0057667, document undated.

Kumar and Satyanarayanan, "Flexible and Safe Resolution of File Conflicts", Carnegie Mellon University, Bates No. RIMDQ0057676–0057687, document undated.

"Teklogix: Overview History" http://web.archive.org/web/19980201192354/teklogix.com/history.htm, pp. 1–3, Bates Nos. RIMDQ0057903–0057905.

M. Satyanarayanan, "14. Distributed File Systems", pp. 360–381, Bates No. RIMDQ0058687–0058698, document undated.

R. Alonso and H. Korth, "Database System Issues in Nomadic Computing", Matsushita Information Technology Laboratory, Bates No. RIMDQ0058812–0058820, document undated.

Skopp and Kaiser, "Disconnected Operation in a Multi–User Software Environment", Columbia University Department of Computer Science, Bates Nos. RIMDQ0058940–0058947, dated Aug. 1993.

Skopp,—MS Thesis Proposal—"Process Centered Software Development on Mobile Hosts", Department of Computer Science Columbia University, Bates Nos. RIMDQ0058948–0058970, dated Oct. 11, 1993.

Baecker, Nastos, Posner, Mawby, "The User–centred Iterative Design of Collaborative Writing Software", ACM, Bates Nos. RIMDQ0059088–0059095, © 1993.

Ellis and Gibbs, "Concurrency Control in Groupware Systems", ACM, Bates Nos. RIMDQ0059096–0059104, © 1989.

Greenberg and Marwood, "Real Time Groupware as a Distributed System: Concurrency Control", ACM Press, Bates Nos. RIMDQ0059105–0059116, Proceedings of the ACM CSCW Conference on Computer Supported Cooperative Work, North Carolina, dated Oct. 22–26, 1994.

Sohlenkamp and Chwelos, "Integrating Communication, Cooperation, and Awareness: The DIVA Virtual Office Environment", ACM, Bates Nos. RIMDQ0059117–0059129, CSCW 94–10/94, NC [North Carolina], dated "Oct. 1994", © 1994.

Nelson, Welch, Ousterhout, "Caching in the Sprite Network File System", Computer Science Division Department of Electrical Engineering and Computer Sciences University of California, Bates Nos. RIMDQ0059130–0059164, document undated.

Walker, Popek, English, Kline, Thiel, "The LOCUS Distributed Operating System", ACM, Bates Nos. RIMDQ0059165–0059186, © 1983.

Huston, Honeyman, "Disconnected Operation for AFS", CITI Technical Report 93-3, Bates Nos. RIMDQ0059187–0059196, dated Jun. 19, 1993.

Satyanarayanan, Kistler, Kumar, Okasaki, Siegel, Steere, "Coda: A Highly Available File System for a Distributed Workstation Environment", IEEE Transactions on Computers, vol. 39, No. 4, Apr. 1990, pp. 447–459, Bates Nos. RIMDQ0059197–0059209, © 1990.

Satyanarayanan, "Coda: A Highly Available File System for a Distributed Workstation Environment", cover, pp. 1–3, i, Bates Nos. RIMDQ0059210–0059214, document undated.

Satyanarayanan, "Scalable, Secure, and Highly Available Distributed File Access", IEEE, pp. 9–20, end page, Bates Nos. RIMDQ0059215–0059226, dated May 1990, © 1990.

Kistler and Satyanarayanan, "Disconnected Operation in the Coda File System", ACM Transactions on Computer Systems, vol. 10, No. 1, Feb. 1992, pp. 3–25, Bates Nos. RIMDQ0059227–0059249, © 1992.

Kistler, "Disconnected Operation in a Distributed File System", Submitted in partial fulfillment of the requirements for the degree of Doctor of Philosophy, Bates Nos. RIMDQ0059432–0059699, Carnegie Mellon University, dated May 1993.

VTT PrintAccess PrintAccess matrix code reader status, Bates Nos. RIMDQ0059765, VTT © 2006.

VTT PrintAccess PrintAccess matrix code reader software, Bates Nos. RIMDQ0059766, VTT © 2006.

"Tekscan Radio–Linked Systems", Teklogix, Inc., Bates Nos. RIMDQ0057906–0057908, 6/89/5E.

"Territorial Control", Teklogix, Bates Nos. RIMDQ0057909–912, document undated.

"Tekscan 7015 'Portable' Terminal", Teklogix, Inc., Bates Nos. RIMDQ0057913–914, © 1988.

"Tecscan 9011 'MiniBase' radio link controller", Teklogix, Inc., Bates Nos. RIMDQ0057915–916, © 1989.

Warehousing 89, Material Handling Engineering, Bates Nos. RIMDQ0057917–920, © 1989.

Tekscan 8030 Series mobile "Vehicle–mounted" terminal, Teklogix, Inc., Bates Nos. RIMDQ0057921–924, © 1989.

Mobile Wireless Computing: Solutions and Challenges in Data Management, http://citeseer.ist.psu.edu/imielenski93mobile.html, 3 pages, dated Dec. 18, 2006.

Imielinski, T., et al., "Mobile Wireless Computing: Solutions and Challenges in Data Management," Technical Report, Rutgers DCS–TR–296/WINLAB TR–49, Feb. 1993.

Maki, Ken, The AT&T EO Travel Guide, 1993.

Lieske, Dana, "The EO 440 and EO 880,"0 Smart Computing, vol. 4, Issue 9, Sep. 1993.

Sheng, S., "A Portable Multimedia Terminal for Personal Communications," IEEE Communication Magazine, Jun. 22, 1992.

"Scan Tech UK, NEC Birmingham, Jun. 16–18, 1992, Conference Proceedings, A,"; R. Long, "The Use of Issue–Specific Bar Codes for Sortation of Magazine, Periodical and Newspaper Returns," Solent News Distributors Ltd, document undated; M. Hardy, "Case Study 1: UK's First Port Control Radio Data Transmission System in Dock Straddle Carriers," Belgravium Ltd, Bates Nos. RIMDQ 0098145–146, document undated, Bates Nos. RIMDQ 0098142–151.

"Scan Tech UK, NEC Birmingham, Jun. 16–18, 1992, Conference Proceedings, B,"; S. Blackmore, "Portable Data Collection: A Strategic Technology," Symlex, document undated; C. Williets, "Portable Data Collection—Trends and Developments in Processing and Computer Products," Mars Electronics International, document undated; B. Inall, "Data Entry Options for Portable Computers," IBS Radix, document undated; J. Dover, "Communications Options for Portable Data Capture Units," Symbol Technologies UK Ltd, document undated; R. Crabtree, "Portable Data Capture—Applications Opportunities," Kings Town Photocodes Ltd, document undated; Bates Nos. RIMDQ 0098152–165.

"Scan Tech UK, NEC Birmingham, Jun. 16–18, 1992, Conference Proceedings, E," document undated; R. Evans, "The Supplementary Coding Standards," ANA, document undated; J. Critoph, "EAN–128, Production and Scanning," Symbol Technologies, document undated; W. Satterthwaite, "Pallet Labels and Supplementary Coding," Pedigree Petfoods/Mars Group, document undated; Bates Nos. RIMDQ 0098166–196.

"Scan Tech UK, NEC Birmingham, Jun. 16–18, 1992, Conference Proceedings, F"; T. Hankins and M. Brittain, "Software Tools for 'Fastrak' Implementation of Automatic Data Capture Using Portable Terminals," Alpha–Numeric Systems Plc, document undated; D. Peacock, "PDC in British Gas PLC North Eastern Warehousing," British Gas Plc North Eastern, document undated; J. Keegan, "Total Supply Chain Management Within Health Care Supplies," Health Care Supplies, document undated; Bates Nos. RIMDQ 0098197–204.

"Scan Tech UK, NEC Birmingham, Jun. 16–18, 1992, Conference Proceedings, G"; A. Scorer, "Wide Area Data Capture with Particular Emphasis on the Temperature–Controlled Distribution Sector," Securicor Datatrak Ltd, document undated; "EDI in Distribution and Transport," document undated; P. Whitlock, "Delivering Solutions for Parcels Delivery," Securicor Omega Express Ltd, document undated; "Video Case Study: Down the Line Bar Coding in the Supply Chain," document undated; Bates Nos. RIMDQ 0098205–222.

"Scan Tech UK, NEC Birmingham, Jun. 16–18, 1992, Conference Proceedings, I"; S. Jackson, "Inductive Identification System," Pepperl & Fuchs Ltd, document undated; P. Kibler, "Chips with Everything—The Datatag System," Yamaha, document undated; B. Williams, "RFID: The Issue is Standardisation," The Enterprise Consultancy, document undated; W. Holland, "Capture Data and Thieves with R.F.I.D.," Smart Tag Systems Inc., document undated; Bates Nos. RIMDQ 0098223–236.

"Scan Tech UK, NEC Birmingham, Jun. 16–18, 1992, Conference Proceedings, K"; M. Hiscox, "Radio Frequency Data Communications (RFDC)," Lex Industrial Systems Ltd, document undated; J. Bental, "Mobile Data in Automatic Identification," RAM Mobile Data Ltd, document undated; S. Kerry, "Vendor Selection and Project Management–Radio Frequency Data Communications," Symbol Technologies Europe, document undated; J. Tipping, "RF/DC in Action," Process Computing Ltd, document undated; Bates Nos. RIMDQ 0098237–252.

"Scan Tech UK, NEC Birmingham, Jun. 16–18, 1992, Conference Proceedings, M"; J. Trueman, "The Use of Bar Coding Within W. H. Smith," W H Smith Ltd, document undated; M. Gathercole, "Warehouse Efficiency Gains from Bar Code Technology," Tiptree Book Services, document undated; R. Webber, "Getting It Right," Oxford University Press, document undated; B. Parratt, "PDF 417 in the Book Trade," Penguin Books, document undated; Bates Nos. RIMDQ 0098253–261.

"Scan Tech UK, NEC Birmingham, Jun. 16–18, 1992, Conference Proceedings, N"; A. Furness, "Technological Change and Emergent Opportunities in Automatic Identification," Electronic Engineering Group, document undated; R. Noyau, "High Coercivity Magnetic Strip Cards," Electronic Engineering Group, document undated; N. Weston, "Managing New Technology," Strategic Renewal Group, document undated; D. O'Dea, "The Dotcode—An Alternative Identification System," Electronic Automation Ltd, document undated; S. Hancock, "A Neural Network System: Applications in Pattern Recognition," Neural Technologies Limited, document undated; Bates Nos. RIMDQ 0098262–281.

"Scan Tech UK, NEC Birmingham, Jun. 16–18, 1992, Conference Proceedings, O"; T. Dunn, "Bureau Services in Relation to Auto ID," ESP Security Print, document undated; B. Levin, "Quality Improvements in Industrial Ink Jet Bar Coding," Elmjet Limited, document undated; A. Walter, "Guidelines for Effective Implementation of Label–Based Auto ID Systems," Avery Dennison, document undated; D. Jones, "P.S.A. Protecting Your Investment," Printronix (UK), document undated; G. Cunningham, "Anti–Counterfeiting System Developed by Stampiton Microtrace," Stampiton Microtrace, document undated; P. Manser, "Patient Case Notes: A Suitable Case for Treatment," Royal Brompton National Heart and Lung Hospitals SHA, document undated; Bates Nos. RIMDQ 0098282–296.

"IBM 9075 PCRadio, A rugged handheld system for wireless communications and control," International Business Machines, copyright 1992, Bates Nos. RIMDQ 0098297–300.

"IBM Canada Sells Wireless Data Network to Bell–Ardis: Announces Availability of New PCRadio, Montreal, Feb. 4, 1992," Bates No. RIMDQ 0098301.

A. Alber, "Interactive Computer Systems, Videotex and Multimedia," Plenum Press, copyright 1993, public version, Bates Nos. RIMDQ 0103511–952.

"TMS320C4x User's Guide, 1991 Digital Signal Processing Products," Texas Instruments Incorporated, copyright 1991, Bates Nos. RIMDQ 0103953–4817.

Cover and table of contents of Industrial Engineering magazine, Institute of Industrial Engineers, copyright 1992, T. Miller, "More than just listening to the customer, Industrial Engineering, Jan. 92, " Bates Nos. RIMDQ 0106379–82.

Cover and table of contents of Controls & Systems magazine, Penton Publishing Inc., copyright 1991, R. Eckles, "Move data fast with RF data communication, Controls & Systems, Jun. 1992," Bates Nos. RIMDQ 0106383–387.

Cover and table of contents of Quality Progress magazine, American Society for Quality Control, Inc., copyright 1993, K. Wacker, "Uncommon common sense, Quality Progress, Jul. 1993," pp. 97–98, 100, "The Role of the forecasting TQC team, Quality Progress, Jul. 1993," p. 99, Bates Nos. RIMDQ 0106388–93.

"Intel Product Guide", Intel Corporation, copyright 1989, public version, Bates Nos. RIMDQ 0107116–294.

Cover and table of contents of Operating Systems Review magazine, Association for Computing Machinery Special Interest Group on Operating Systems, document dated Apr. 1993, Badrinath et al., "Impact of mobility on distributed computations," document undated, Bates Nos. RIMDQ 0107344–351.

"CCD The Solid State Imaging Technology," Fairchild USA CCD Division, copyright 1981, Bates Nos. RIMDQ 0107440–603.

"Scan Tech UK, NEC Birmingham, Jun. 16–18, 1992, Conference Proceedings, D"; H. Bendell, "Production Control," S B Electronic Systems Limited, document undated; S. Greasley, "Tough Environments—Tougher Bar Codes," RM Scantag, document undated; G. Hammond, "Business Excellence: Issues Not Acronyms," MRP Ltd, document undated; K. Ridgway, "The Use of Auto Identification in a Manufacturing Environment," Department of Mechanical and Process Engineering, document undated; J. Plimmer, "Quality Improvements in W.I.P. Information," Kenrick & Jefferson, document undated; Bates No. RIMDQ 0108233–246.

"Scan Tech UK, NEC Birmingham, Jun. 16–18, 1992, Conference Proceedings, L"; Bates No. RIMDQ 0108247–257.

"Scan Tech UK, NEC Birmingham, Jun. 16–18, 1992, Conference Proceedings, H"; P. Chartier, "The Integration of Bar Coding and EDI," Praxis Consultants, document undated; P. Barbier, "Odette and EDI," BPCC Numeric Arts Ltd, document undated; Bates No. RIMDQ 0108258–273.

"Advanced Micro Devices, Flash Memory Products 1992/1993 Data Book/Handbook," copyright 1992, Bates Nos. RIMDQ 0108461–9008.

Documents of Jan Orkisz, 64 pages, Bates Nos. OKK001–064.

The Herald, Scotland, Aug. 25, 1992, Bates Nos. RIMDQ 0083030–75.

C.J. Date, "An Introduction to Database Systems," excerpts, Copyright 1977, Bates Nos. RIMDQ 110694–751.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 32, 47, 61 and 62 are determined to be patentable as amended.

Claims 2, 4–31, 33–46 and 48–60, dependent on an amended claim, are determined to be patentable.

1. A data entry system comprising a hand held data entry unit, said hand held unit comprising:
    a reading sensor for sensing commands and/or data and for producing input signals in response to said sensed commands and/or data;
    rewritable storage *remotely* programmable with [information relating to] selectable items *from a catalogue of merchandise, wherein said selectable items each correspond to and identify an item of merchandise from a catalogue of merchandise which item is available for shopping and for ordering to purchase by a user via operation of said hand held unit;*
    a controller connected to receive and process said input signals from said sensor, said controller being arranged to respond to said commands to control said hand held unit and to said data to select a said item;
    a display screen for displaying a user readable representation of said commands and displaying information relating to said item from said rewritable storage;
    a telecommunications interface for telephonic transmission of information relating to a selected item or items from said storage to a remote processing center via a telecommunications network and for telephonic reception of information relating to said selectable items from said remote processing center to said storage via said telecommunications network, wherein said telecommunications interface is a telecommunications line interface integral to said hand held unit and directly connects said hand-held unit to said telecommunications network; and
    a carrier for a plurality of data and/or command codes for association with means for displaying a plurality of selectable items, wherein said carrier carries a plurality of codes, each for a respective one of a plurality of natural language and/or numeric characters and a plurality of commands for controlling operation of said data entry or merchandising system, each code being associated with a visual representation of the corresponding natural language or numeric character or command and/or of a graphical representation thereof;
    *wherein said hand held unit is operable for a user to make shopping selections from said display screen to select and to initiate shopping orders to purchase one or more items of merchandise for a user via said remote processing center,*
    *wherein said one or more selected items is selected individually from a list of user selectable items of a catalogue of merchandise by user input via said reading sensor sensing data and/or command codes of said carrier for a plurality of data and/or command codes,*
    *wherein said controller is arranged to respond to data sensed by said reading sensor to select a said individual item, and wherein a shopping order is initiated via transmitting one or more shopping selections from said rewritable storage to said remote processing center.*

3. A portable hand held computer, wherein said hand held computer is capable of use by a user as a data entry device and as a portable wireless telephone for voice transmission and reception, said hand held computer comprising:
    memory, wherein said memory is operable for retaining information input by the user, operable for retaining downloaded information, and operable for retaining information for updating downloaded information previously retained in said memory;
    a manually operable key switch for input of information;
    a display interface comprising a touch sensitive screen, wherein said display interface is
        operable to display user commands,
        operable to display information retained by said memory, and
        operable to display a list of user selectable items comprising merchandisable items, and to selectively display information relating to one or more of said items;
    an antenna;
    a rechargeable power supply;
    a sensor operable to sense and capture data wherein said sensor is a camera;
    a wireless telecommunications interface operable directly to connect said hand held computer via said antenna to a wireless telecommunications network and operable for transmission and reception of voice, data, and information, wherein said wireless telecommunications interface is operable to transmit data captured by said sensor;
    an optical interface operable to establish an optical datalink for the transmission and reception of information from and to said hand held computer;
    a controller coupled to said display interface, key switch, memory, rechargeable power supply, optical interface, sensor, and wireless telecommunications interface; and
    a speaker and a microphone configuring said hand held computer for use as a telephone handset;
    wherein said display interface, antenna, key switch, rechargeable power supply, wireless telecommunications interface, memory, controller, optical interface, sensor, speaker, and microphone comprise a self-contained assembly; and,
    wherein said hand held computer is operable:
        to download from a remote processing center via said antenna and at least said wireless telecommunications network [information relating to one or more] *a list of user selectable items from a catalogue of merchandisable items, wherein a said list of items is for retention in said memory and wherein each of said user selectable items corresponds to and identifies a merchandisable item which is available for shopping and ordering to purchase by a user via operation of said hand held computer;* to transmit data relating to one or more of said merchandisable items from said memory to said remote processing center via said antenna and at least said wireless telecommunications network, and to download information relating to one or more of said merchandisable items from said remote processing center via said antenna and at least said wireless telecommunications network in response to a said transmission of data;

to download, via said antenna and at least said wireless telecommunications network in response to entry of a user command, information from said remote processing center for retention in said memory to update information previously retained in said memory for one or more of said merchandisable items; and as a portable wireless telephone for voice reception and transmission;

wherein further, said hand held computer is operable for a user to make shopping selections from a said list to select one or more merchandisable items, and to initiate shopping orders to purchase one or more merchandisable items for a user via said remote processing center, wherein:

(i) said one or more selected items is selected individually from a said list of user selectable items by user input via said touch sensitive screen sensing data, wherein (ii) said data sensed is coded data of a plurality of coded data, wherein said plurality of coded data is associated with said user selectable items and wherein each coded data of said plurality of coded data corresponds to an individual item of said user selectable items, (iii) said controller is arranged to respond to said data sensed by said touch sensitive screen to select a said individual item, and (iv) a shopping order is initiated via transmission of data corresponding to said one or more selected items from said memory to said remote processing center.

32. A portable hand held computer, wherein said hand held computer is capable of use by a user as a data entry device and configured to be held in one hand for operable use as a portable wireless telephone for voice transmission and reception, said hand held computer comprising:

memory, wherein said memory is operable for retaining information in response to input by the user, operable for retaining downloaded information, and operable for retaining information for updating downloaded information previously retained in said memory;

a manually operable key switch for input of information;

a display interface comprising a touch sensitive screen, wherein said display interface is operable to display user commands, operable to display informatin retained by said memory, and operable to display a list of user selectable items comprising merchandisable items, and to selectively display information relating to one or more of said items; an antenna;

a rechargeable power supply;

a wireless telecommunications interface operable directly to connect via said antenna to a wireless telecommunications network and operable for transmission and reception of voice, data, and information;

a controller coupled to said display interface, key switch, memory, rechargeable power supply, and wireless telecommunications interface;

a speaker and a microphone permitting said hand held computer to be used as a telephone handset;

wherein said display interface, antenna, key switch, rechargeable power supply, wireless telecommunications interface, memory, controller, speaker, and microphone comprises a self-contained assembly; and wherein said hand held computer is operable:

to download from a remote processing center via said antenna and at least said wireless telecommunications network [information relating to one or more] *a list of user selectable items from a catalogue of* merchandisable items, *wherein a said list of items is* for retention in said memory *and wherein each of said user selectable items corresponds to and identifies a merchandisable item which is available for shopping and ordering to purchase by a user via operation of said hand held computer*;

to transmit data relating to one or more of said merchandisable items from said memory to said remote processing center via said antenna and at least said wireless telecommunications network, and to download information relating to one or more said merchandisable items from said remote processing center in response to a said transmission of data;

to receive a request from said remote processing center to the user to input user identification information for utilization by said remote processing center; and as a portable wireless telephone for voice reception and transmission;

wherein further, said hand held computer is operable for a user to make shopping selections from a said list to select one or more merchandisable items, and to initiate shopping orders to purchase one or more merchandisable items for a user via said remote processing center, wherein:

(i) said one or more selected items is selected individually from a said list of user selectable items by user input via said touch sensitive screen sensing data, wherein (ii) said data sensed is coded data of a plurality of coded data, wherein said plurality of coded data is associated with said user selectable items and wherein each coded data of said plurality of coded data corresponds to an individual item of said user selectable items, (iii) said controller is arranged to respond to said data sensed by said touch sensitive screen to select a said individual item, and (iv) a shopping order is initiated via transmisison of data corresponding to said one or more selected items from said memory to said remote processing center.

47. A portable hand held computer, wherein said hand held computer is capable of use by a user as a data entry device and configured to be held in one hand for operable use as a portable wireless telephone for voice transmission and reception, said hand held computer comprising:

memory, wherein said memory is operable for retaining data or information in response to input by the user, operable for retaining downloaded information, and operable for retaining information for updating downloaded information previously retained in said memory;

a manually operable key switch for input of information;

a display interface, wherein said display interface is operable to display user commands, operable to display information retained by said memory, and operable to display a list of user selectable items comprising merchandisable items, and to selectively display information relating to one or more of said items;
an antenna;
a rechargeable power supply;
a sensor operable for sensing user commands or data;
a wireless telecommunications interface operable directly to connect via said antenna to a wireless telecommunications network and operable for transmission and reception of voice or data, wherein said wireless telecommunications interface is operable to transmit data captured by said sensor;
a controller coupled to said display interface, key switch, memory, rechargeable power supply, sensor, and wireless telecommunications interface; and,
a speaker and a microphone permitting said hand held computer to be used as a telephone handset;
wherein said display interface, antenna, key switch, rechargeable power supply, wireless telecommunications interface, memory, controller, sensor, speaker, and microphone comprise a self-contained assembly; and
wherein said hand held computer is operable:
to download from a remote processing center via said antenna and at least said wireless telecommunications network [information relating to one or more] *a list of user selectable items from a catalogue of* merchandisable items, *wherein a said list of items is* for retention in said memory *and wherein each of said user selectable items corresponds to and identifies a merchandisable item which is available for shopping and ordering to purchase by a user via operation of said hand held computer*;
to transmit data relating to one or more of said merchandisable items from said memory to said remote processing center via said antenna and at least said wireless telecommunications network; and
to download information relating to one or more of said merchandisable items from said remote processing center via said antenna and at least said wireless telecommunications network in response to a said transmission of data;
to receive a request from said remote processing center to the user to input user identification information for utilization by said remote processing center; and
as a portable wireless telephone for voice reception and transmission;
*wherein further, said hand held computer is operable for a user to make shopping selections from a said list to select one or more merchandisable items, and to initiate shopping orders to purchase one or more merchandisable items for a user via said remote processing center, wherein:*
*(i) said one or more selected items is selected individually from a said list of user selectable items by user input via said sensor sensing data, wherein*
*(ii) said data sensed is coded data of a plurality of coded data, wherein said plurality of coded data is associated with said user selectable items and wherein each coded data of said plurality of coded data corresponds to an individual item of said user selectable items,*
*(ii) said controller is arranged to respond to said data sensed by said sensor to select a said individual item, and*
*(iv) a shopping order is initiated via transmission of data corresponding to said one or more selected items from said memory to said remote processing center.*

61. A portable hand held computer, wherein said hand held computer is capable of use by a user as a data entry device and configured to be held in one hand for operable use as a portable cellular telephone for voice transmission and reception, said hand held computer comprising:
memory, wherein said memory is operable for retaining data or information in response to input by the user, operable for retaining downloaded information, and operable for retaining information for updating downloaded information previously retained in said memory;
a manually operable key switch for input of information;
a display interface, wherein said display interface is
operable to display user commands,
operable to display information retained by said memory, and
operable to display a list of user selectable items comprising merchandisable items, and to selectively display information relating to one or more of said items;
an antenna;
a rechargeable power supply;
a sensor operable for sensing user commands or data;
a wireless telecommunications interface operable directly to connect via said antenna to a wireless telecommunications network and operable for transmission and reception of voice or data, wherein said wireless telecommunications interface is operable to transmit data captured by said sensor, and is a cellular telephone interface;
a controller coupled to said display interface, key switch, memory, rechargeable power supply, sensor, and wireless telecommunications interface; and,
a speaker and a microphone permitting said hand held computer to be used as a telephone handset;
wherein said display interface, antenna, key switch, rechargeable power supply, wireless telecommunications interface, memory, controller, sensor, speaker, and microphone comprise a self-contained assembly; and
wherein said hand held computer is operable:
to download from a remote processing center via said antenna and at least said wireless telecommunications network [information relating to one or more] *a list of user selectable items from a catalogue of* merchandisable items, *wherein a said list of items is* for retention in said memory *and wherein each of said user selectable items corresponds to and identifies a merchandisable item which is available for shopping and ordering to purchase by a user via operation of said hand held computer*;
to transmit data relating to one or more of said merchandisable items from said memory to said remote processing center via said antenna and at least said wireless telecommunications network, and to download information relating to one or more of said merchandisable items from said remote processing center via said antenna and at least said wireless telecommunications network in response to a said transmission of data;
to download, via said antenna and at least said wireless telecommunications network in response to entry of a user command, information from said remote processing center for retention in said memory to update information previously retained in said memory for one or more of said merchandisable items;
to receive a request from said remote processing center to the user to input user identification information for utilization by said remote processing center; and as a portable cellular telephone for voice reception and transmission;

wherein further, said hand held computer is operable for a user to make shopping selections from a said list to select one or more merchandisable items, and to initiate shopping orders to purchase one or more merchandisable items for a user via said remote processing center, wherein:
  (i) said one or more selected items is selected individually from a said list of user selectable items by user input via said sensor sensing data, wherein
  (ii) said data sensed is coded data of a plurality of coded data, wherein said plurality of coded data is associated with said user selectable items and wherein each coded data of said pluralty of coded data corresponds to an individual item of said user selectable items,
  (ii) said controller is arranged to respond to said data sensed by said sensor to select a said individual item, and
  (iv) a shopping order is initiated via transmission of data corresponding to said one or more selected items from said memory to said remote processing center.

62. A portable hand held computer operable as a data entry device and a portable wireless telephone by a user, comprising:
  memory, wherein said memory is operable for retaining data or information in response to input by the user, operable for retaining dowloaded data or information, and operable for retaining data or information for updating downloaded data or information previously retained in said memory;
  a manually operable key switch for input of information;
  a display interface, wherein said display interface is
    operable to display user commands,
    operable to display information retained by said memory, and
    operable to display a list of user selectable items comprising merchandisable items, and to selectively display information relating to one [cc] or more of said items;
  an antenna;
  a rechargeable power supply;
  a reading sensor operable for sensing commands and/or data;
  a sensor operable to sense and capture data wherein said sensor is a camera;
  a wireless telecommunications interface operable directly to connect via said antenna to a wireless telecommunications network and operable for transmission and reception of voice or data, wherein said wireless telecommunications interface is operable to transmit data captured by said sensor via said antenna;
  a controller coupled to said display interface, key switch, memory, rechargeable power supply, sensor, and wireless telecommunications interface;

wherein said hand held computer is operable using said wireless telecommunications interface to download from a remote processing center [information relating to one or more of] said user selectable items of said list for retention in said memory, by utilizing at least said wireless telecommunications network, and wherein each of said user selectable items is from a catalogue of merchandisable items and corresponds to and identifies a merchandisable item which is available for shopping and ordering to purchase by a user via operation of said hand held computer, said hand held computer is operable using said wireless telecommunications interface to transmit data or information relating to one or more of said user selectable items from said memory to said remote processing center and to download information relating to one or more of said items from said remote processing center in response to a said transmission, said hand held computer using said wireless telecommunications interface also is operable in response to entry of a user command to download information from said remote processing center for retention in said memory to update information previously retained in said memory for one or more of said items, and said hand held computer is operable as a portable wireless telephone;
  wherein said display interface, antenna, key switch, rechargeable power supply, wireless telecommunications interface, memory, controller, and sensor comprise a self-contained assembly; and wherein said assembly includes a speaker and a microphone permitting said hand held computer to be used as a telephone handset;

wherein further, said hand held computer is operable for a user to make shopping selections from a said list to select one or more merchandisable items, and to initiate shopping orders to purchase one or more merchandisable items for a user via said remote processing center, wherein:
  (i) said one or more selected items is selected individually from a said list of user selectable items by user input via said reading sensor sensing data, wherein
  (ii) said data sensed is coded data of a plurality of coded data, wherein said plurality of coded data is associated with said user selectable items and wherein each coded data of said plurality of coded data corresponds to an individual item of said user selectable items,
  (ii) said controller is arranged to respond to said data sensed by said reading sensor to select a said individual item, and
  (iv) a shopping order is initiated via transmission of data corresponding to said one or more selected items from said memory to said remote processing center.

\* \* \* \* \*